(12) United States Patent
McCall et al.

(10) Patent No.: US 11,036,360 B2
(45) Date of Patent: Jun. 15, 2021

(54) GRAPHICAL USER INTERFACE OBJECT MATCHING

(71) Applicant: salesforce.com, inc., San Francisco, CA (US)

(72) Inventors: Daniel McCall, San Rafael, CA (US); Sheena Lee, Oakland, CA (US); Annie Abrahamian, La Crescenta, CA (US); David Klein, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 45 days.

(21) Appl. No.: 16/221,093

(22) Filed: Dec. 14, 2018

(65) Prior Publication Data
US 2020/0097139 A1  Mar. 26, 2020

Related U.S. Application Data

(60) Provisional application No. 62/735,496, filed on Sep. 24, 2018.

(51) Int. Cl.
*G06F 3/01* (2006.01)
*G06F 3/0482* (2013.01)
(Continued)

(52) U.S. Cl.
CPC ............ *G06F 3/0482* (2013.01); *G06F 3/017* (2013.01); *G06F 3/0483* (2013.01); *G06F 3/04812* (2013.01); *G06F 3/04817* (2013.01)

(58) Field of Classification Search
CPC .... G06F 3/0482; G06F 3/017; G06F 3/04812; G06F 3/04817; G06F 3/0483
See application file for complete search history.

(56) References Cited

U.S. PATENT DOCUMENTS 8,091,037 B2  1/2012  Bicker et al.
8,468,117 B1  6/2013  Chasman et al.
(Continued)

FOREIGN PATENT DOCUMENTS

WO  WO-2014084863 A1 *  6/2014  ............. G06F 9/451

OTHER PUBLICATIONS

"Menus (Design Basics)", Windows Dev Center, published on May 31, 2018 to https://docs.microsoft.com/en-us/windows/win32/uxguide/cmd-menus (Year: 2018).*
(Continued)

*Primary Examiner* — Shourjo Dasgupta
(74) *Attorney, Agent, or Firm* — Sterne, Kessler, Goldstein & Fox P.L.L.C.

(57) ABSTRACT

Disclosed herein are system, method, and computer program product embodiments for unifying graphical user interface (GUI) displays across different device types. In an embodiment, a unification system may convert various GUI view appearing on, for example, a desktop device into a GUI view on a mobile device. Both devices may be accessing the same application and/or may use a cloud computing platform to access the application. The unification system may aid in reproducing GUI modifications performed on one user device onto other user devices. In this manner, the unification system may maintain a consistent look-and-feel for a user across different computing device type.

15 Claims, 33 Drawing Sheets

(51) Int. Cl.
*G06F 3/0481* (2013.01)
*G06F 3/0483* (2013.01)

(56) References Cited

U.S. PATENT DOCUMENTS

| | | | |
|---|---|---|---|
| 9,088,457 | B1 | 7/2015 | Johnson |
| 9,098,497 | B1 | 8/2015 | Brette et al. |
| 9,575,629 | B1 | 2/2017 | Hansen et al. |
| 9,607,332 | B1 | 3/2017 | Nazarov et al. |
| 10,318,034 | B1* | 6/2019 | Hauenstein ......... G06F 3/04842 |
| 10,551,995 | B1 | 2/2020 | Ho et al. |
| 10,664,126 | B2* | 5/2020 | Roos ................... G06F 15/16 |
| 2002/0077823 | A1 | 6/2002 | Fox et al. |
| 2002/0184610 | A1 | 12/2002 | Chong et al. |
| 2004/0061713 | A1* | 4/2004 | Jennings ............... H04L 67/34 715/700 |
| 2006/0195510 | A1* | 8/2006 | McNally ............... H04W 99/00 709/203 |
| 2007/0130541 | A1* | 6/2007 | Louch ................ G06F 3/04817 715/804 |
| 2009/0248730 | A1* | 10/2009 | Burns .................. G06F 16/972 |
| 2009/0307631 | A1* | 12/2009 | Kim ..................... G06F 3/0416 715/830 |
| 2010/0031167 | A1 | 2/2010 | Roytmann |
| 2012/0131495 | A1 | 5/2012 | Goossens et al. |
| 2012/0278725 | A1* | 11/2012 | Gordon .............. H04N 21/4627 715/738 |
| 2013/0055147 | A1 | 2/2013 | Vasudev et al. |
| 2013/0325807 | A1* | 12/2013 | Sokolov ............... G06F 16/178 707/638 |
| 2014/0028572 | A1* | 1/2014 | St. Clair .............. G06F 3/0488 345/173 |
| 2014/0033136 | A1* | 1/2014 | St. Clair ............ G06F 3/04883 715/863 |
| 2014/0109002 | A1 | 4/2014 | Kimball et al. |
| 2014/0157163 | A1 | 6/2014 | Strutin-Belinoff et al. |
| 2014/0164179 | A1 | 6/2014 | Geisinger et al. |
| 2014/0189574 | A1 | 7/2014 | Stallings et al. |
| 2014/0250419 | A1 | 9/2014 | Ivmark et al. |
| 2015/0020010 | A1 | 1/2015 | Hale et al. |
| 2015/0135069 | A1 | 5/2015 | Circlaeys et al. |
| 2015/0135104 | A1 | 5/2015 | Osterhoff et al. |
| 2015/0153951 | A1 | 6/2015 | Kim et al. |
| 2015/0277748 | A1 | 10/2015 | Shin |
| 2015/0309715 | A1 | 10/2015 | Higa et al. |
| 2016/0048295 | A1* | 2/2016 | Mao ................... G06F 3/04817 715/719 |
| 2016/0154644 | A1 | 6/2016 | Chhawchharia et al. |
| 2017/0060812 | A1* | 3/2017 | Williams ............. G06F 40/106 |
| 2017/0068406 | A1 | 3/2017 | Mark |
| 2017/0083711 | A1* | 3/2017 | Hemaraj ................ G06F 3/167 |
| 2017/0221371 | A1* | 8/2017 | Yang .................... G06T 19/006 |
| 2018/0103137 | A1* | 4/2018 | Reddy ..................... H04M 1/27 |
| 2018/0107689 | A1 | 4/2018 | Grossman et al. |
| 2018/0108069 | A1 | 4/2018 | Zedell et al. |
| 2018/0121470 | A1 | 5/2018 | Grossman et al. |
| 2018/0129396 | A1 | 5/2018 | Buckley et al. |
| 2018/0181378 | A1 | 6/2018 | Bakman |
| 2018/0260195 | A1 | 9/2018 | Govindaraj |
| 2018/0329586 | A1 | 11/2018 | Sundstrom et al. |
| 2019/0014205 | A1 | 1/2019 | Miloseski et al. |
| 2019/0050925 | A1 | 2/2019 | Hodge et al. |
| 2019/0129727 | A1 | 5/2019 | Bovet |

OTHER PUBLICATIONS

David Isbitski, "Announcing List Events and Two-Way Sync with Alexa Lists", published on Sep. 6, 2017 to https://developer.amazon.com/blogs/alexa/post/c6d07607-3499-4266-bd59-a49c9ce02616/announcing-list-events-and-two-way-sync-for-alexa-lists, retrieved on Jan. 6, 2020 (Year: 2017).*
Extended European Search Report for European Application No. 19199092.8, dated Jan. 2, 2020, 8 pages.
Embarcadero Technologies: "FireUI Mobile Previews offering a live preview at a glance", Apr. 25, 2016 (Apr. 25, 2016), p. 1, XP054980046, Retrieved from the Internet: URL: https://www.youtube.com/watch?v—D-CnrFdKM5M [retrieved on Dec. 12, 2019]. 1 page.
Anonymous: "Git Integration in the IDE-RAD Studio", Feb. 18, 2018 (Feb. 18, 2018), XP055652423, Retrieved from the Internet: URL: https://web.archive.org/web/20180218002026/http://docwiki.embarcadero.com/RADStudio/Tokyo/en/Git__Integration_in_the_IDE [retrieved on Dec. 12, 2019], 3 pages.
Bootstrap Studio: "Creating a Website with Bootstrap Studio (Tutorial)", Youtube, Aug. 17, 2016 (Aug. 17, 2016), p. 1, XP054979963, Retrieved from the Internet: URL:http://www.youtube.com/watch?v=10SwsoYNkVc [retrieved on Nov. 29, 2019].
Nick Babich, "Basic Patterns for Mobile Navigation: Pros and Cons", published in May 2017 to https://www.smashingmagazine.com/2017/05/basic-patterns-mobile-navigation/, retrieved Jan. 29, 2021 (Year: 2017).

* cited by examiner

1200E 1245A 1245B 1245C 1245D 1245E 1250

Console | Home | Opportunities ▼ | Test | Post | News | Groups ▼ | People ▼ | Accounts ▼ | Dashboards ▼ | More ▼ | _ ☐ X 🔍 Search Latest Posts ▼    🔍 Search This Feed

Employee Referral Program – Michael Smith
Hi, I referred someone for the Software Position. I am trying to add the resume to the referral. What should I do?
👍 Like   💬 Comment   ↪ Share
   Write a comment...

Expense Help Desk – Jamie Rosenthal
Expense Help desk – I'm trying to submit my expenses and made a few errors in my submission. Can someone please help?
👍 Like   💬 Comment   ↪ Share
   Write a comment...

*Items to Approve*
No approval requests need your attention right now.

*Recent Records*
▌▌ Robert D'Anjou
▌▌ Lupe Flores
📄 The Grocery Company
◯ Marketing Activities
▌▌ Emily Benson

*Insights*
Leadership changes

FIG. 12E

GRAPHICAL USER INTERFACE OBJECT MATCHING

CROSS-REFERENCE TO RELATED APPLICATIONS

This application claims the benefit of U.S. Provisional Application No. 62/735,496 filed on Sep. 24, 2018, which is hereby incorporated by reference in its entirety.

This application is further related to U.S. patent application Ser. No. 16/221,075, filed Dec. 14, 2018, entitled "Desktop and Mobile Graphical User Interface Unification", to U.S. patent application Ser. No. 16/221,090, filed Dec. 14, 2018, entitled "Application Builder", to U.S. patent application Ser. No. 16/221,097, filed Dec. 14, 2018, entitled "Graphical User Interface Divided Navigation", and to U.S. patent application Ser. No. 16/221,102, filed Dec. 14, 2018, entitled "Graphical User Interface Management for Different Applications" all of which are hereby incorporated by reference in their entireties.

BACKGROUND

As users continue to rely on computer and software, their reliance and interactions with a user interface (UI) or a graphical user interface (GUI) also increase. These interactions may include manipulating buttons or icons on a GUI to execute software commands or to navigate to different views. Users also are beginning to expect a full-featured desktop GUI experience to be mirrored onto a mobile GUI experience, despite limitations with the mobile form factor. While developers have attempted to provide this mirrored capability, the applications developed and supported typically have fixed GUI configurations. For example, many application GUIs include fixed buttons or icons. This fixed nature may lead to inefficiencies in navigation as users navigate through and access various GUI components on a desktop computing device and/or on a mobile computing device. Further, modifications made on the desktop computing device may not be reproduced in the mobile computing device and vice versa.

BRIEF DESCRIPTION OF THE DRAWINGS

The accompanying drawings are incorporated herein and form a part of the specification.

FIG. 12E depicts a block diagram of a GUI displaying a page including an added tab object, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
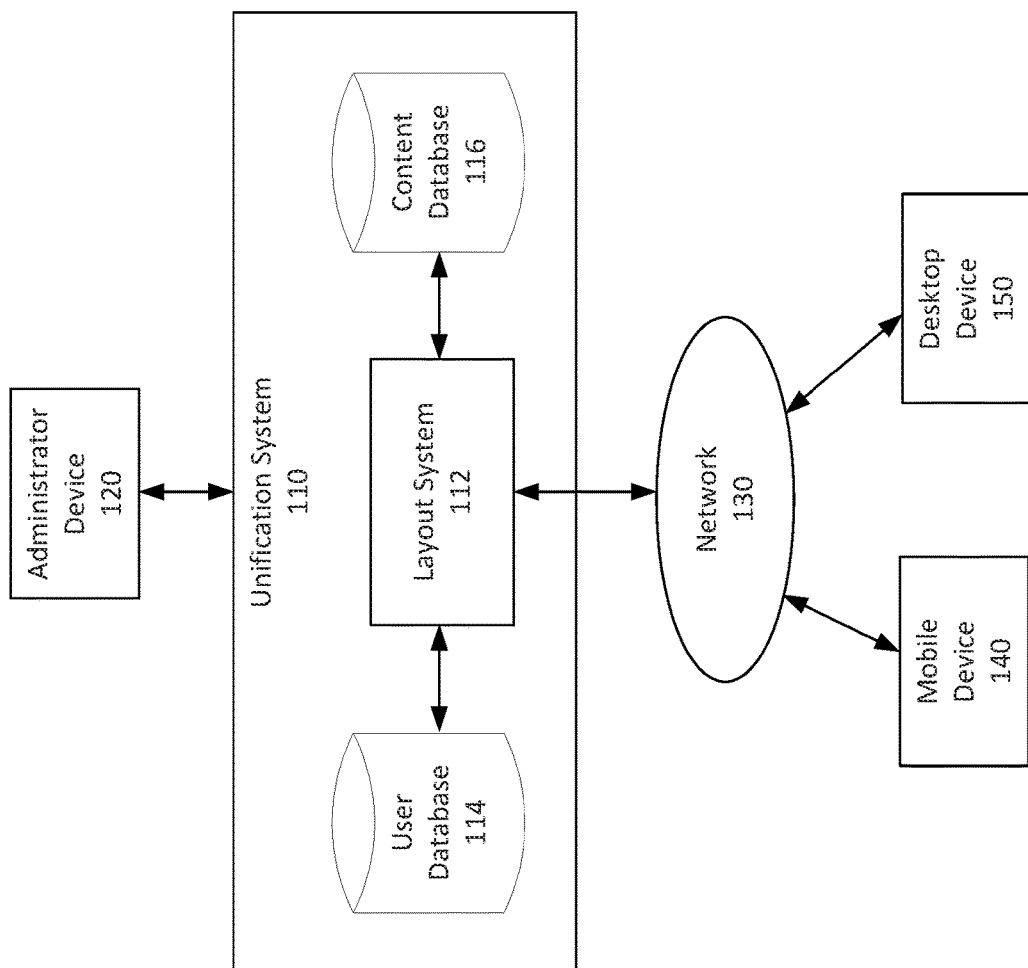
FIG. 1 depicts a block diagram of a computing environment, according to some embodiments.

Provided herein are system, apparatus, device, method and/or computer program product embodiments, and/or combinations and sub-combinations thereof, for unifying graphical user interface (GUI) views, components, usage, and control between different computing devices.

Unification of GUI views may refer to configuring a GUI appearing on a mobile computing device to correspond to a GUI appearing on a desktop computing device. While the following description may describe this type of computing environment, the embodiments described may also extend to any configuration of computing devices.

In an embodiment, a unification system may support the unification of GUI views. This unification may refer to generating a GUI on a mobile device that corresponds to a GUI on a desktop device. The unification, however, may extend to other computing device configurations. When a user creates and/or manipulates the GUI as displayed on the desktop device, a central system may control the GUI display on the mobile device to also reflect the manipulation. The central system may be a unification system as described below.

The unification system may not only control the content of applications manipulated by computing devices, but also alter GUI objects to generate a mobile GUI that corresponds to a desktop GUI. In an embodiment, the unification system may use a sequential component tagging process to tag different GUI data portions. The sequential tagging process may allow for GUI components arranged horizontally and/or arranged in a combination of vertical and horizontal locations on a desktop GUI to be rearranged into a vertical order for the mobile GUI. This configuration may result in a more comfortable viewing experience for a user using a mobile device to view the content of an underlying application having a corresponding desktop view. While the desktop view may include a more horizontally configured layout due to the use of a computer screen, the mobile view may organize the same components in a vertically configured layout. A user may be able to scroll through the GUI components and interact with the same application in a more intuitive manner via the mobile layout.

In this manner, a user may use either a desktop GUI or a mobile GUI to access the same application. The unification system may instantiate a particular GUI based on the device accessing the application. Further, the manipulation of the GUI in one device may be replicated in the other device. Beyond the change in underlying application content (such as data and/or records), a user may edit the GUI objects of a particular GUI view on the desktop GUI. For example, a user may move or add a tab to a list of tabs on the desktop GUI. The unification system may produce this modification in the mobile GUI. In this manner, when the user views the mobile GUI, the unification system may instantiate a mobile version including the modification. Based on this configuration, the user may personalize a desktop GUI, and the unification system may adjust the mobile GUI to include the personalization.

The unification system may also include controls for an administrator to manage access to applications and/or to configure GUI views. For example, the unification system may provide an application builder GUI that an administrator (or a user having permissions) may use to manipulate GUI objects. The application builder may include an interchangeable desktop and mobile view and may allow an administrator to add and/or remove GUI components. For example, an administrator may use a gallery of components with a drag-and-drop gesture to add a GUI component to a desktop or mobile GUI. The unification system may then arrange the GUI component for the other corresponding GUI. In this manner, the administrator may quickly generate multiple GUIs that may be applied to different devices using the unification system.

The application builder may also allow an administrator to control various aspects of each GUI component. For example, the administrator may modify GUI objects within a GUI component. Further, the administrator may distinguish GUI component views between the desktop GUI and the mobile GUI. For example, the administrator may use a visibility filter to identify particular GUI component as visible on desktop GUI but not visible on the mobile application. This customization may still unify the desktop and mobile GUIs while still maintaining a desired independence in the visualization. Using either the desktop or mobile GUI may still allow manipulation of the same underlying application being viewed by the GUIs.

In addition to translating a desktop GUI to a mobile GUI, the unification system may also provide mobile GUI controls that may aid in the accessibility of the mobile version of the desktop GUI. For example, the unification system may provide a framework for switching between applications, a navigation menu, and/or cursor control.

In the mobile application, like the desktop application, a user may interact with a GUI to switch between different applications. When the unification system detects this command, the unification system may replace GUI components of the currently displayed application with GUI components of the selected application. In an embodiment, the unification system may maintain the same framework used so that the user may maintain familiarity with the location of GUI objects. While the particular contents, commands, and/or navigation options may change according to a selected application, the unification system may maintain a common framework between selected applications. In this manner, the unification system may support user access to multiple applications as well as customization of GUI views within the applications and across different devices.

When navigating through an application, the application may include different objects or categories. These objects may be tabs in a desktop view and/or may be represented by GUI buttons. Interacting with these objects may allow a user to navigate to different elements of an application. When using a desktop to navigate through these objects, the desktop GUI may display the objects due to the large amount of available GUI space relative to the mobile GUI. This same view, however, may not be available in the mobile version due to screen size restrictions.

In response to the difference in screen sizes, the unification system may generate a navigation menu with a corresponding navigation button. The navigation menu may correspond to the objects of the application seen in the desktop GUI view. In an embodiment, these objects may remain hidden to conserve space on the mobile view. Using the navigation button, a user may navigate to a corresponding GUI object. Using a menu gesture on the navigation button (e.g., a long-press) may display the navigation menu. The user may then select an object from the navigation menu to navigate to the particular object. This selection may also update the navigation button to reflect the selected object. In this manner, the navigation button may reflect the most recently selected object so that a user can quickly return to the selected object.

Using the navigation button and navigation menu may allow a user to navigate through an application using a mobile GUI in a manner similar to the navigation on a desktop GUI. By instantiating the mobile GUI to include the same objects as the desktop GUI, the unification system may unify these views and allow a user to perform the same actions on either GUI. Further, by allowing the users to customize the objects on the desktop GUI as well as reproducing the customization on the mobile GUI, the user is able to preserve desired configurations and navigate the application in a unified manner. If a user moves an object from a first location to a second location on the desktop GUI, the unification system may also adjust the navigation menu to reflect the change in object location.

In addition to the change of desktop objects, the unification system may also provide controls on the mobile GUI for navigating through components of the mobile GUI. For example, the mobile GUI may include an interface for gesture controls. The gesture controls may allow for divided navigation. A user may use a portion of the GUI in a particular manner to select a different portion of the GUI. For example, a user may perform a gesture (e.g., a long press) on the bottom half of the mobile GUI. This bottom half may be more comfortable if a user is holding a mobile device with one hand and may also aid in accessibility. After performing the gesture, GUI may display a cursor on another portion of the GUI (e.g., the top half). The user may then move the cursor using the gesture on the bottom half of the mobile GUI. In this manner, the user may control a second portion of the GUI using the first portion of the GUI.

Through the implementation of these embodiment, the unification system may generate various GUIs for accessing one or more applications. These applications may exist, for example, on a cloud computing platform. In an embodiment, the cloud computing platform may be a multitenant system. A user may then access, customize, and/or manipulate these GUIs from different computing devices while the unification system may transmit instructions to computing devices to maintain a unified appearance. These instructions may command the computing devices to render a GUI in a particular manner. As this disclosure will explain below, the unification system may provide centralized management of the applications as well as the GUI generation to preserve continuity between computing devices such as a desktop and a mobile device. Users making changes on one device may expect to view the changes on the other device based on the management of the unification system. In this manner, users may more efficiently interact with applications across different platforms and preserved personalization across different platform GUIs.

These features of example embodiments will now be discussed in greater detail with respect to the corresponding figures.

FIG. 1 depicts a block diagram of a computing environment 100, according to some embodiments. Computing environment 100 may represent a computing network allowing user devices to communicate and interact with programs and/or applications. In an embodiment, computing environment 100 may facilitate cloud computing operations for user devices. The user devices may use Internet browsers and/or installed programs to access the cloud-hosted applications and/or data.

Computing environment 100 may include unification system 110. Unification system 110 may be implemented using one or more processors, memory, databases, servers, routers, modems, antennae and/or hardware or software that may be configured to generate one or more GUIs and/or receive GUI interaction information from mobile device 140 and/or desktop device 150. Unification system 110 may be implemented using computer system 1800 described with reference to FIG. 18. Unification system 110 may implemented in a computing network, such as, for example, a cloud computing platform and/or a software as a service platform. In an embodiment, unification system 110 may provide the GUI instantiation elements for a cloud computing platform hosting Internet applications and/or records. In some embodiments, unification system 110 may also host elements of the Internet applications and/or records. In either configuration, unification system 110 may support multiple users and/or multiple user devices corresponding to each of the multiple users.

Unification system 110 may communicate with mobile device 140, desktop device 150, and/or administrator device 120. Collectively, these devices may be referred to as user devices. User devices may be, for example, desktop computers, laptop computers, tablets, phones, smartphones, and/or other computing devices. Mobile device 140 may refer to tablets, phone, and/or smartphones while desktop device 150 may refer to desktop computers or laptop computers. These user device configurations, however, are not limited to these specific embodiments.

The user devices may access the applications via the Internet using a locally installed program and/or an Internet browser. As the user devices access the applications, unification system 110 may act as an intermediary and instantiate the GUI views allowing the users to display the GUIs on the user devices and manipulate GUI objects. The user devices may then send the commands to unification system 110 for processing to control the hosted applications. In an embodiment, mobile device 140, desktop device 150, and/or administrator device 120 may communicate with unification system 110 using network 130.

Network 130 may be a network capable of transmitting information either in a wired or wireless manner and may be, for example, the Internet, a Local Area Network, or a Wide Area Network. Network 130 may utilize a network protocol, such as, for example, a hypertext transfer protocol (HTTP), a TCP/IP protocol, Ethernet, or an asynchronous transfer mode. In an embodiment, network 130 facilitates communications between the user devices and unification system 110. Unification system 110 may instantiate GUIs that may be displayed on the user devices. Instantiation may include transmitting and/or sending GUI commands to the user devices to cause the user device to generate a GUI specified by unification system 110. The process of instantiation may include transmitting and/or sending commands to manipulate program code and/or data stored locally on a user device. The GUI commands may cause the user devices to generate and/or display GUIs according to the instructions provided in the GUI commands. Through the instantiation, users may view generated GUIs and send commands to unification system 110 via network 130.

Unification system 110 may also communicate with administrator device 120. Administrator device 120 may be a user device configured to grant administrator controls over the content, applications, and/or GUI functions accessible by a user using mobile device 140 and/or desktop device 150. Using administrator device 120, an administrator may configure the applications and/or records accessible to a user. An administrator may also manage multiple users via commands sent to unification system 110. Administrator device 120 may be implemented in cloud computing platform that is executing unification system 110. In an embodiment, administrator device 120 may communicate with unification system 110 via network 130.

Based on these interactions, unification system 110 may instantiate GUIs and/or maintain GUI information to aid in the generation of GUIs on user devices. To instantiate a GUI, unification system 110 may include layout system 112, user database 114, and/or content database 116. Layout system 112 may be one or more processors, servers, routers, modems, antennae and/or hardware or software that may be configured to generate one or more GUIs and/or receive GUI interaction information from mobile device 140 and/or desktop device 150. Layout system 112 may receive requests from the user devices and may form commands based on programmed rules to generate a requested GUI.

Layout system 112 may utilize information stored in user database 114 and/or content database 116 in conjunction with request data received from mobile device 140 and/or desktop device 150 to instantiate a GUI. User database 114 may be memory that includes information related to user preferences. User database 114 may also include administrator configurations for particular applications and/or permissions assigned by an administrator. Content database 116 may include page and/or record data related to applications. In an embodiment, content database 116 may be located within unification system 110 and/or within a cloud computing platform executing cloud applications. Content database 116 may include the record and/or data associated with an underlying application that a user may manipulate using an instantiated GUI.

In an embodiment, unification system 110 may use a single metadata definition to define a data page of an application. Rather than having two separate data versions of an application for execution on the mobile device 140 and desktop device 150, unification system 110 may store a single record or page definition representing the application page in content database 116. In an embodiment, this single page definition may represent an application configuration for a particular user and may be used regardless of whether the user is accessing the application on mobile device 140 or desktop device 150. When unification system 110 receives an access request from a user device, layout system 112 may determine the device type being accessed. Unification system 110 may make this determination independent of whether the access comes from a natively installed application or from an Internet browser.

For example, layout system 112 may receive an access request from mobile device 140 for a particular application. Based on the device type, layout system 112 may retrieve the single application page definition from content database 116. The single application page definition may include the particular user GUI customization or personalization parameters set by the user. This customization and/or personalization metadata may be stored within the page definition. In response to the request, layout system 112 may then utilize the metadata to instantiate the GUI. In an embodiment, layout system 112 may use portions of the metadata corresponding to the requesting device type. In an embodiment, layout system 112 may supply transformation commands based on the stored metadata to instantiate the GUI. In this manner, the GUI generation for mobile device 140 and/or desktop device 150 may be completed using a single stored data definition with a conversion of the data definition depending on the device type of the access request.

As will be described further below with reference to the figures displaying GUI embodiments, unification system 110 may generate different desktop and mobile GUIs that may share a common page definition. By accessing this common page definition, unification system 110 may generate GUIs on different devices as well as reproduce modifications made to the GUIs from one device to another.

In an embodiment, the stored data definition may include metadata including component sequencing. Component sequencing may indicate the location placement of GUI components that may be shared among the desktop GUI and mobile GUI. Using this process may allow for the arrangement of GUI components. When creating or designing an application page, unification system 110 may automatically generate sequencing information and store the sequencing information in the page definition. In this manner, when unification system 110 receives a request from a particular device, unification system 110 may access the page definition and instantiate the corresponding GUI using the sequencing metadata. An embodiment of this sequencing is further described with reference to FIG. 4.

To briefly illustrate a non-limiting example of this sequencing, a developer or administrator may first design a page having several GUI components. For example, the developer may use a desktop to design a page having components similar to that embodiment depicted in FIG. 2D. Unification system 110 may then assign a sequential numbering to the components of the GUI. If the GUI includes horizontal locations, unification system 110 may assign numbers in, for example, a left to right manner. Using this sequential numbering, unification system 110 may generate a mobile GUI including elements from the desktop GUI. Unification system 110 may order the GUI components vertically corresponding to the sequence numbering. In this manner, unification system 110 may store a particular record to efficiently invoke elements for instantiating a mobile GUI that corresponds to the desktop GUI and maintains a similar look and feel. Unification system 110 may convert horizontally arranged GUI components in a vertical manner that may yield a more comfortable viewing experience on mobile device 140.

Similarly, if a user reorders a component using mobile device 140, unification system 110 may receive a reordering command from mobile device 140. Unification system 110 may then update the stored definition with the updated sequential ordering. Unification system 110 may reassign the set of assigned values. When unification system 110 receives a request from desktop device 150, unification system 110 may use the updated or reassigned ordering in instantiating the desktop GUI. In this manner, unification system 110 may unify the GUI views between different devices and different device types. In an embodiment, unification system 110 may also preserve differences between views. For example, unification system 110 may store a particular ordering for a mobile view while storing a different ordering for a desktop view. An administrator or user may specify this difference using commands sent to unification system 110.

In addition to instantiating a GUI for user usage across different devices, unification system 110 may also provide administrator controls. Administrator device 120 may specify application permissions and/or corresponding GUI permissions for users. Unification system 110 may store this information in content database 116 and in the definitions corresponding to the pages to block and/or permit user access depending on the permissions.

As will be further described below with respect to FIG. 5-FIG. 8, unification system 110 may also instantiate an application builder. The application builder may allow a user and/or an administrator develop a particular GUI and/or page views of an application. These GUIs and/or page views may be default views that may also be editable by users. The application builder may include an interchangeable desktop and mobile view and may allow an administrator to add and/or remove GUI components. For example, an administrator may use a gallery of components with a drag-and-drop gesture to add a GUI component to a desktop or mobile GUI.

Unification system 110 may then arrange the GUI component for the other corresponding GUI. In this manner, the administrator may quickly generate multiple GUIs that may be applied to different devices using unification system 110.

As will be further described below with respect to FIG. 9-FIG. 13, unification system 110 may also instantiate mobile GUIs including a navigation button and/or a navigation menu. The navigation menu may include objects that correspond to desktop objects. Mobile device 140 may display the navigation button and/or navigation menu and may allow a user to quickly navigate to different portions of an application using the GUI objects. Users may also modify the arrangement of the GUI objects. Unification system 110 may modify the arrangement of mobile GUI objects in response to a change in the arrangement of the desktop GUI objects.

As will be further described below with respect to FIG. 14A-FIG. 15, unification system 110 may also generate a cursor on a GUI display. This cursor may allow a user to manipulate a portion of the GUI without directly interacting with the portion. For example, if the GUI is displayed on mobile device 140, the user may press on the bottom half of the GUI to cause a cursor to appear on the top portion. In this manner, unification system 110 may instantiate a mobile GUI that includes accessibility elements and allows a user to access the top portion of a GUI while controlling the bottom portion of the GUI.

As will be further described below with respect to FIG. 16A-FIG. 17, unification system 110 may also facilitate switching between different applications and providing updated GUIs depending on the selected application. In this manner, unification system 110 may provide a framework to implement different applications and application types while maintaining a unification of the GUIs instantiated on mobile device 140 and desktop device 150. Unification system may also load different applications developed by different parties and maintain a consistent layout for each application.

The operation of unification system 110 will now be described with respect to the GUI displays instantiated by unification system 110 as well as corresponding flowcharts illustrating corresponding processes.

Sequential Arrangement of Desktop and Mobile GUIs

Figure 2A:
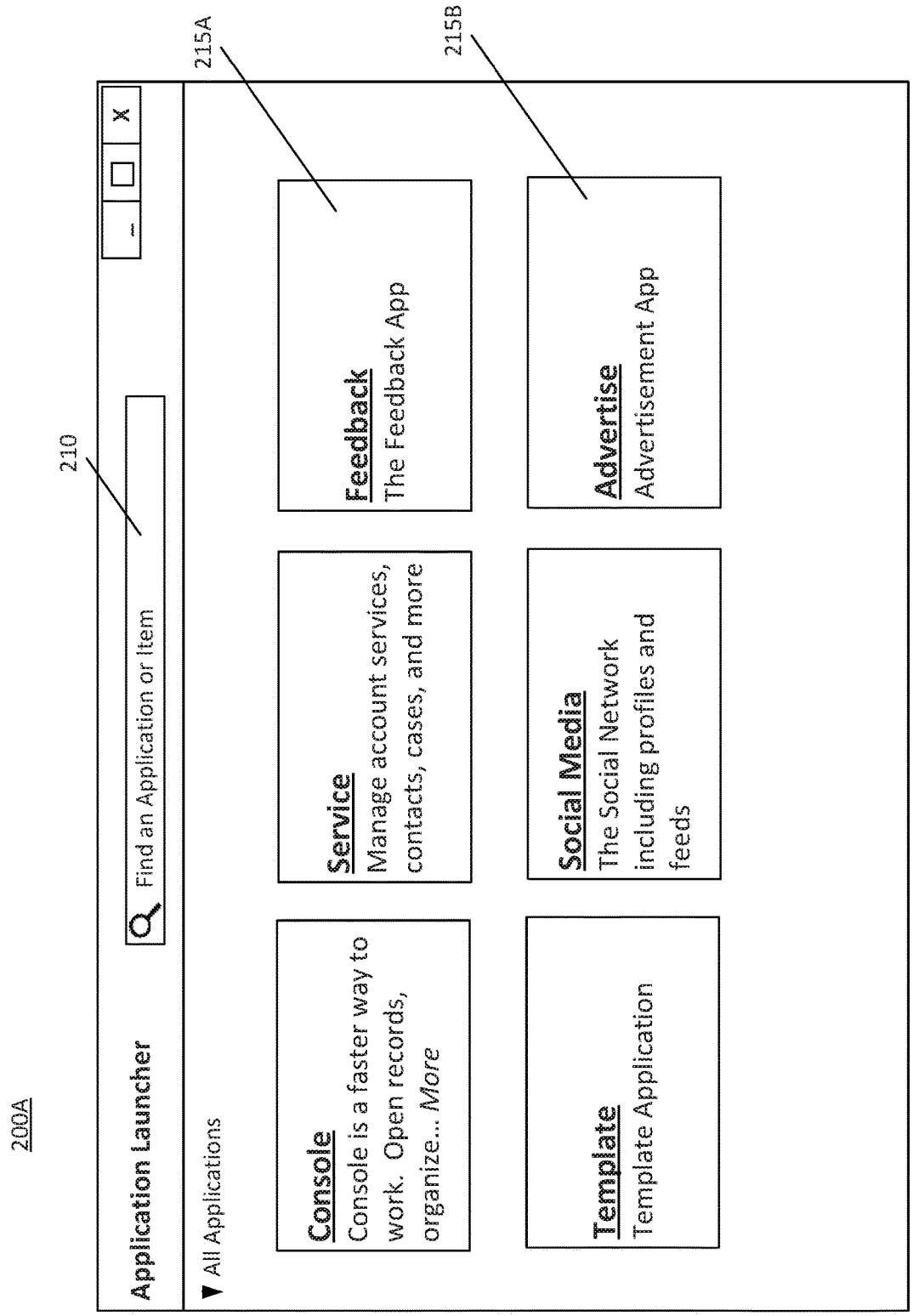
FIG. 2A depicts a block diagram of a graphical user interface (GUI) displaying an application selection page, according to some embodiments.

FIG. 2A depicts a block diagram of a graphical user interface (GUI) 200A displaying an application selection page, according to some embodiments. GUI 200A may be instantiated by unification system 110. In an embodiment, unification system 110 may instantiate GUI 200A to be displayed on desktop device 150. Unification system 110 may instantiate GUI 200A in response to receiving a request from desktop device 150. The request may include user information, such as, for example, log-in credentials or a session token. The request may also include data indicating the device type initiating the request and/or whether the request was made from a locally installed application or an Internet browser. Using the request, unification system 110 may instantiate GUI 200A and/or send commands to desktop device 150 to display GUI 200A. The requests and/or commands may be exchanged via an API used by unification system 110 and desktop device 150.

In an embodiment, unification system 110 may instantiate GUI 200A to be displayed in response to a log-on or a power on request. GUI 200A may be a home page for a cloud computing platform allowing a user to select an application. Different applications may be supported by the cloud computing platform. These applications may be pre-programmed into the cloud computing platform, may be created by an administrator using the cloud computing platform, and/or may be retrieved from an application exchange or marketplace. These applications will be further described with reference to FIG. 16A-FIG. 17.

GUI 200A may display application buttons 215 allowing a user to select an application. The display application buttons 215 may correspond to applications permitted according to user account information. For example, an administrator may designate particular applications to be accessible to a user. This user permission information may be stored in user database 114. When unification system 110 receives a request from a user device, layout system 112 may consult this permission information to determine the applications available for the user and which application buttons 215 to display on GUI 200A. The permission information may also indicate particular GUI components available for the user. Unification system 110 may display the applications selected by an administrator and/or by the user.

A user may make a gesture to select an application button 215. For example, if GUI 200A is displayed on a desktop monitor or display screen, the user may use a cursor with a hardware input peripheral to make the selection. If the display screen includes touchscreen functionality, the user may select the particular application button 215 by touching the screen. Desktop device 150 may process the selection locally to determine the following action or GUI screen and/or send this selection to unification system 110.

GUI 200A may also include a search bar 210. Search bar 210 may allow a user to search for a particular application. In an embodiment, search bar 210 may also allow a user to search for items within a particular application. Using application buttons 215 and/or search bar 210, a user may select an application and explore elements of the selected application.

Figure 2B:
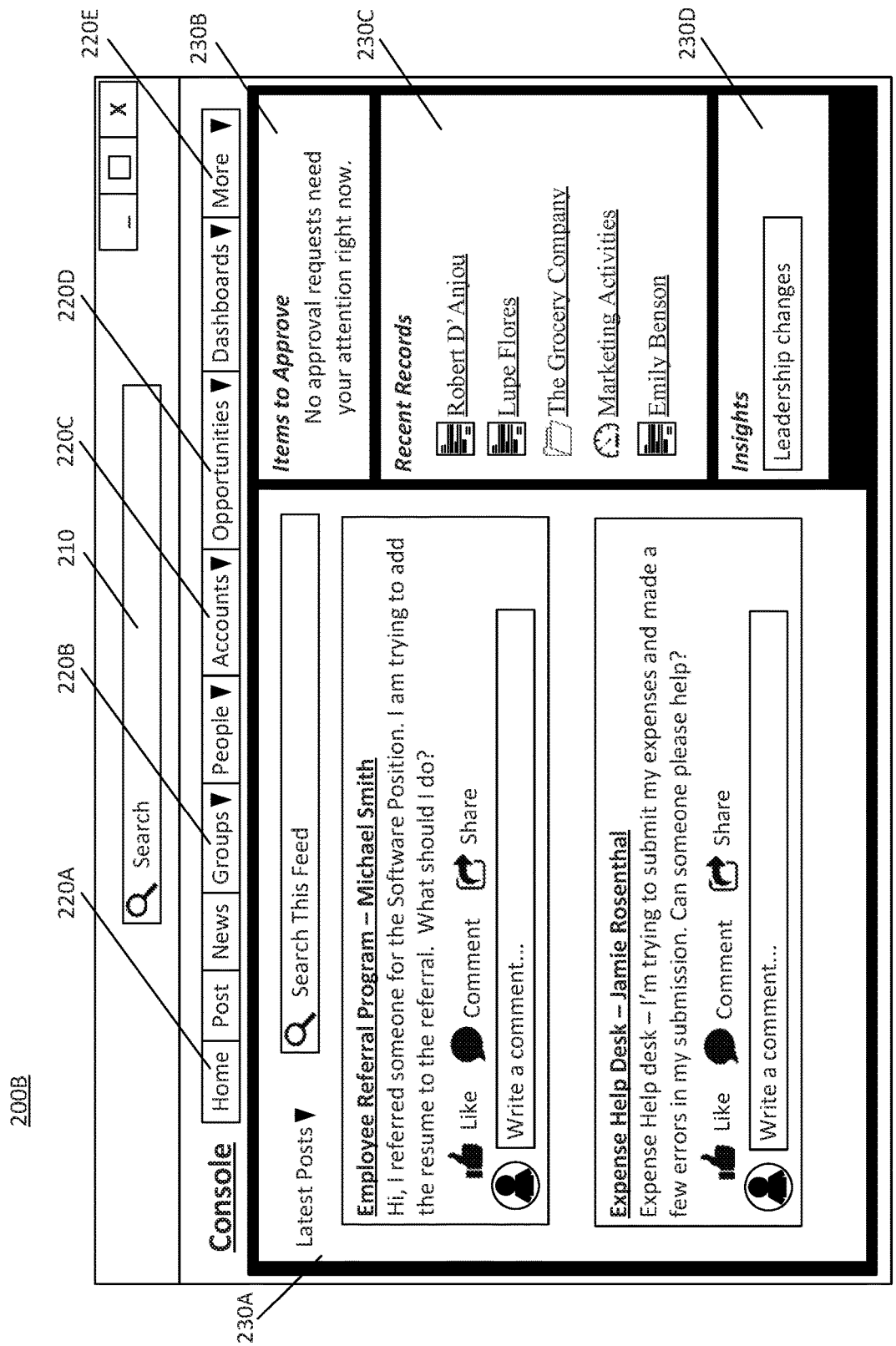
FIG. 2B depicts a block diagram of a GUI displaying an application home page, according to some embodiments.

FIG. 2B depicts a block diagram of a GUI 200B displaying an application home page, according to some embodiments. Desktop device 150 may display GUI 200B in response to a selection of application button 215. Desktop device 150 may generate GUI 200B based on locally stored rules or commands. In an embodiment, unification system 110 may instantiate GUI 200B after receiving the selection data from desktop device 150.

GUI 200B may display an application home page. An application home page may allow a user to interact with a selected application. The application home page may include one or more GUI components that may include different commands and/or data. For example, GUI 200B may include a search bar 210, objects 220, and/or application components 230.

Search bar 210 from GUI 200B may be similar to and/or the same as search bar 210 as displayed on GUI 200A. A user may use search bar 210 to navigate between applications and/or to retrieve items within a selected application. As the user navigates through different page views and/or components of the application, search bar 210 may persist on the display screen so the user may navigate throughout the application.

In addition to search bar 210, GUI 200B may include objects 220. Objects 220 may represent different page views of the application. Objects 220 may also persist on the display screen as the user interacts with objects 220 and/or navigates through the application. In an embodiment, objects 220 may be represented as tabs on GUI 200B, but may also be represented by other GUI buttons. Objects 220 may also include collapsed or grouped options. Grouped objects 220 may be expanded to view hidden buttons. As will be further described below with reference to FIG. 12A-FIG. 12F, objects 220 may be edited and/or customized by a user.

Interacting with an object 220 may access different page views of the application. The objects 220 may depend on the functionality provided by the application. The application may include different data record portions and/or executable program code. Selecting an object 220 may display these data records and/or executable program code for user interaction and/or manipulation. GUI 200B may also include these data records and/or executable program code as application components 230.

Application components 230 may include different portions of GUI 200B displaying data records and/or executable program code. GUI 200B may display these application components and/or may allow the user to interact with the application components 230 to interact with the underlying application. In an embodiment, the application may be a data management application and may include a posting component 230A. Posting component 230A may allow a user to submit text and/or files to the application. GUI 200B may also include other components allowing a user to view records, update or modify records, generate files such as documents, spreadsheets, or presentations, send approval commands, and/or connect to external programs or other programs managed by a cloud computing platform. When viewing GUI 200B, a user may interact with available application components 230 and/or navigate to other elements of the application using objects 220. For example, a user may select object 220C by using a cursor command or gesture. In response to receiving this command, desktop device 150 and/or unification system 110 may instantiate GUI 200C as depicted in FIG. 2C.

Figure 2C:
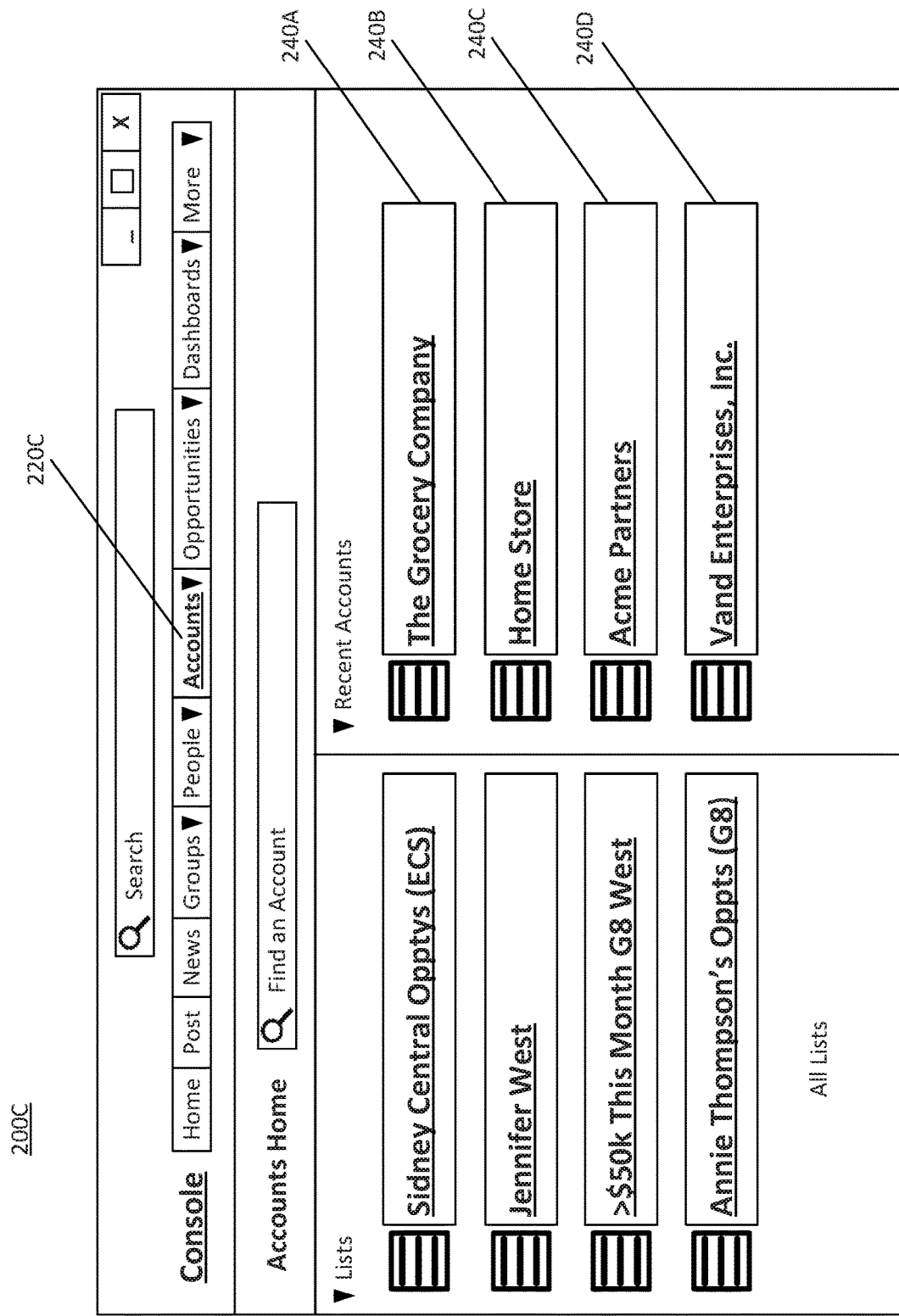
FIG. 2C depicts a block diagram of a GUI displaying an object home page, according to some embodiments.

FIG. 2C depicts a block diagram of a GUI 200C displaying an object home page, according to some embodiments. GUI 200C may include objects 220 and/or search bar 210 which may persist even after an object 220 selection. The object home page may correspond to a selected object 220. In an embodiment, an object home page may display grouped and/or collapsed objects 240. The object home page may be, for example, an intermediary application page allowing a user to navigate between grouped and/or collapsed objects 240. If a user selects one of the grouped and/or collapsed objects 240 as shown in GUI 200C, the user may access a record page as depicted in GUI 200D and in FIG. 2D.

In an embodiment, the user may access the record page from GUI 200B and/or GUI 200C. For example, if a user selects an object 220 from GUI 200B that is not grouped, unification system 110 may instantiate GUI 200D to display a record page corresponding to the selected object. In contrast, if a user selects an object 220 having multiple object choices such as object 220C, unification system 110 may generate the object home page shown in GUI 200C. The object home page may include grouped and/or collapsed objects 240. The user may select a grouped and/or collapsed object 240 to access the corresponding record page.

Additionally, grouped and/or collapsed objects 240 may be accessed from GUI 200B. For example, when accessing object 220C from GUI 200B, GUI 200B may display a menu including grouped and/or collapsed objects 240. A user may then select a grouped and/or collapsed object 240 from this menu to access the record page.

Figure 2D:
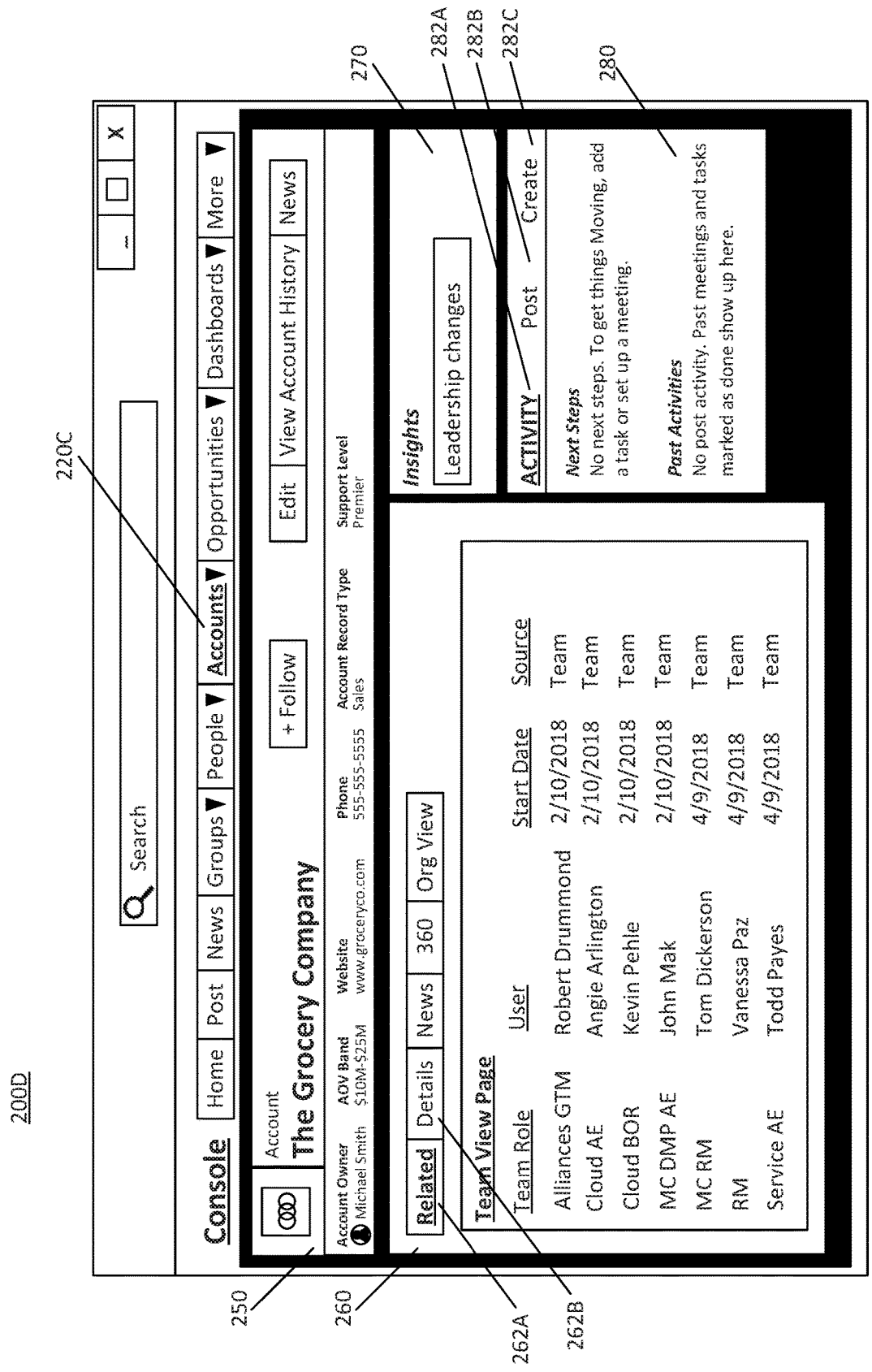
FIG. 2D depicts a block diagram of a GUI displaying a record page, according to some embodiments

FIG. 2D depicts a block diagram of a GUI 200D displaying a record page, according to some embodiments. A record page may be a particular application page having components similar to application components 230. For example, a record page may be a particular account such as "The Grocery Company" that specifies an instance of an "Account" under the "Accounts" object. The components in GUI 200D may include data records and/or executable program code. For example, a header component 250 may include data record information and/or GUI buttons allowing a user to interact with header component 250. Similarly, an information component 260 may include record data and/or may allow a user to view and/or navigate through data records. Information component 260 may include components such as tab components 262. Tab components 262 may allow a user to navigate through different data records as grouped by the different tab components 262.

The record page may also include a messaging component 270. Messaging component 270 may retrieve data records linked to communications. For example, administrator device 120 may supply news and/or other communications related to the particular record page, user, and/or organization.

The record page may also include program component 280. Program component 270 may include one or more program tabs 282. Program tabs 282 may allow for the selection of different portions of executable program code. For example, program tab 282A may include an activity monitor. The activity monitor may track tasks for a user and/or tasks related to the particular record page.

Program component 280 may also include program tab 282B allowing a user to post information. For example, the user may post information related to the record page. Unification system 110 may accept data received from desktop device 150 and may correlate post data with the record page. In an embodiment, unification system 110 may pass this information to a cloud computing program executing the application and processing application data.

Program component 280 may also include program tab 282C allowing a user to create a file. The file may be stored on a cloud computing platform and/or may execute program code for creating a file. The file may be, for example, a word processing file, a spreadsheet file, a presentation, an image, an audio file, a video file, and/or another data file. Creating the file using GUI 200D may allow the user to correlate the file with the record page displayed. Unification system 110 may facilitate this correlation with the underlying application. In this manner, a user may utilize program component 280 and/or GUI 200D to interact with a record page of the application.

In an embodiment, FIG. 2A-FIG. 2D may correspond to GUI examples displayed on desktop device 150. Unification system 110 may instantiate these GUI examples and may allow a user to access an application. Unification system 110 may also instantiate corresponding GUIs on mobile device 140. These mobile GUIs are described in the embodiments discussed below with respect to FIG. 3A-FIG. 3D.

Figure 3A:
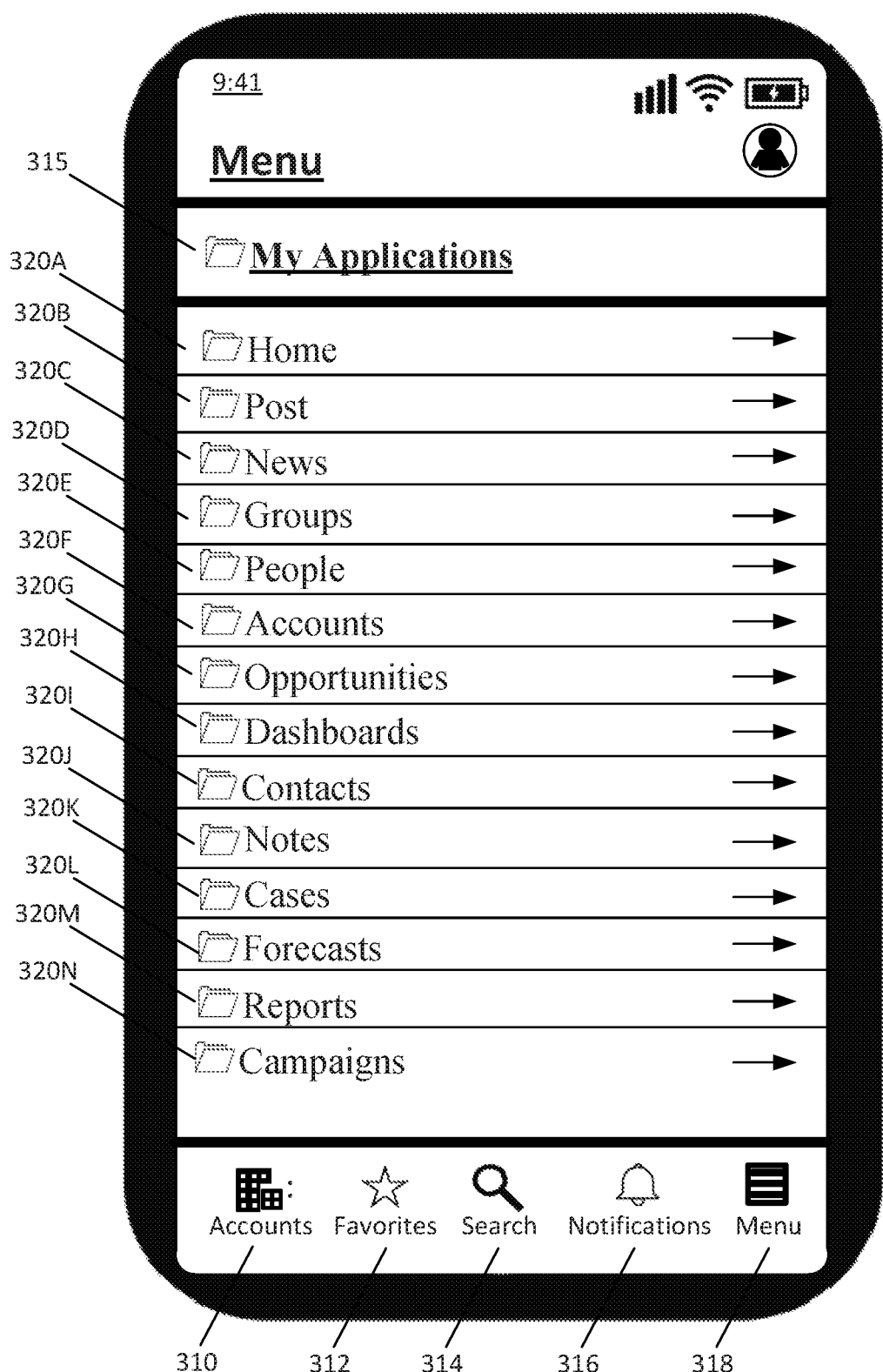
FIG. 3A depicts a block diagram of a GUI displaying a mobile application menu page, according to some embodiments.

FIG. 3A depicts a block diagram of a GUI 300A displaying a mobile application menu page, according to some embodiments. GUI 300A may be instantiated by unification system 110. In an embodiment, unification system 110 may instantiate GUI 300A to be displayed on mobile device 140. Unification system 110 may instantiate GUI 300A in response to receiving a request from mobile device 140. The request may include user information, such as, for example, log-in credentials or a session token. The request may also include data indicating the device type initiating the request and/or whether the request was made from a locally installed application or an Internet browser. Using the request, unification system 110 may instantiate GUI 300A and/or send commands to mobile device 140 to display GUI 300A. The requests and/or commands may be exchanged via an API used by unification system 110 and mobile device 140.

GUI 300A may depict a mobile application menu page. The mobile application menu page may correspond to GUI 200B as depicted in FIG. 2B. GUI 300A may represent a selected application as displayed on mobile device 140. GUI 300A may include application menu button 315 to select another application. Selecting application menu button 315 may cause mobile device 140 to display GUI 1600B and a mobile application selection page 1605 as depicted in FIG. 16B.

GUI 300A may also include objects 320. Objects 320 may correspond to objects 220 from the desktop GUI. Selecting objects 320 may allow a user to navigate through different pages of the application. Accessing these objects may access the single definition of a page as managed by unification system 110 and/or a cloud computing platform. Similar to accessing objects 220, when a user selects an object 320, mobile device 140 may display GUI 300B or GUI 300C depending on whether the selected object 320 includes grouped objects.

Figure 3B:
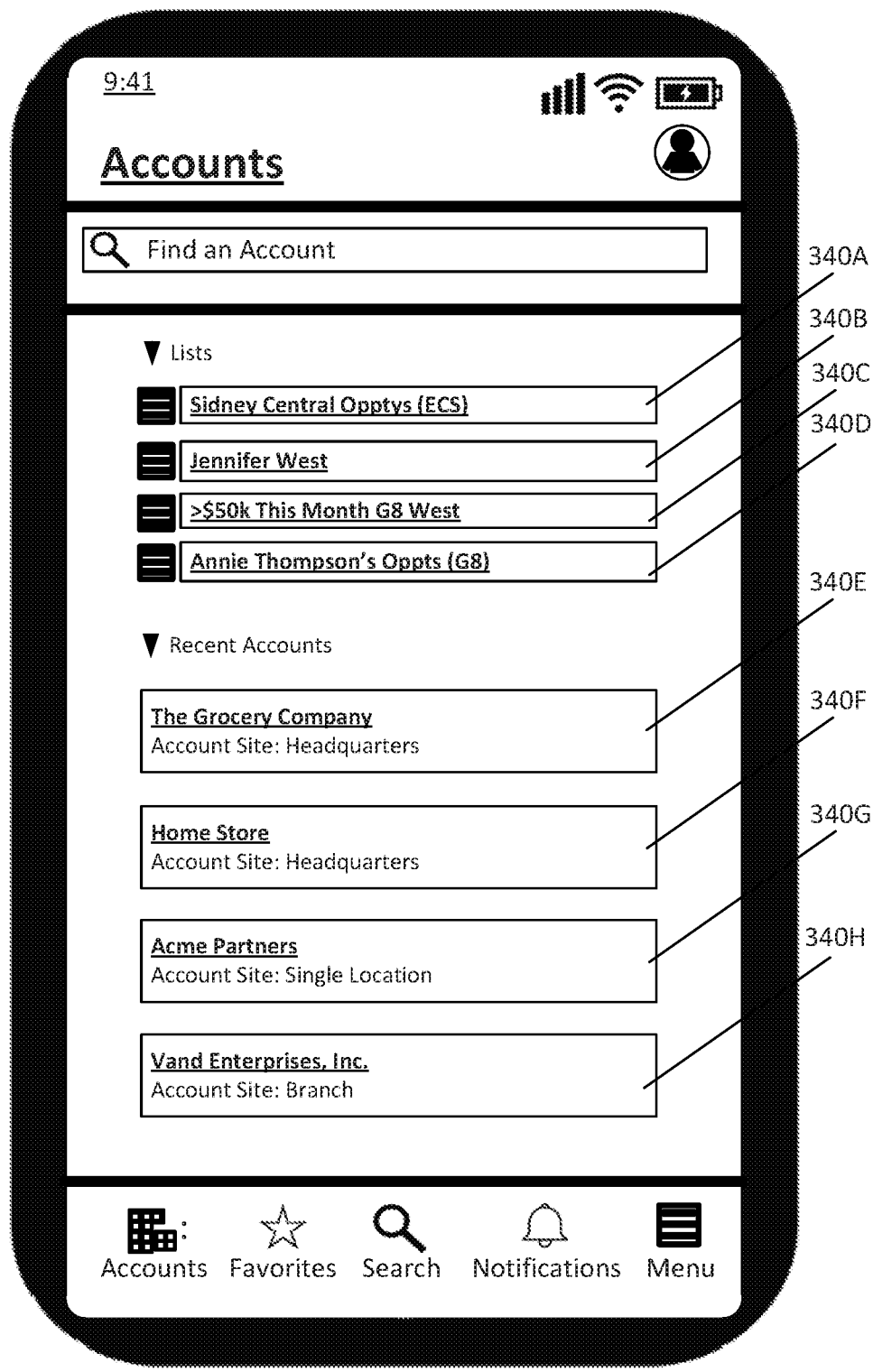
FIG. 3B depicts a block diagram of a GUI displaying a mobile object home page, according to some embodiments.

For example, if the selected object 320 includes grouped objects, unification system 110 may instantiate GUI 300B. FIG. 3B depicts a block diagram of a GUI 300B displaying a mobile object home page, according to some embodiments. From GUI 300B, a user may select a grouped and/or collapsed object 340 to access a record page. In this manner, GUI 300B may be similar to GUI 200C for the desktop viewing.

If mobile device 140 is displaying GUI 300A and a user selects an object 320 that does not include grouped or collapsed objects, unification system 110 may instantiate GUI 300C directly to display a record page corresponding to the object 320. In this manner, interactions with objects 320 and/or grouped and/or collapsed objects 340 may allow a user to reach a record page as displayed in GUI 300C.

In addition to object navigation, GUI 300A may include various mobile buttons 310-318 that allow navigation through GUIs displayed on mobile device 140. Mobile buttons 310-318 may persist and may appear as the user navigates to different pages of the application as displayed on mobile device 140. Mobile buttons 310-318 may include navigation button 310, favorites button 312, search button 314, notifications button 316, and/or menu button 318. Navigation button 310 may allow quick navigation to different objects of an application and may reveal a navigation menu including one or more objects 320. Navigation button 310 will be described in further detail with reference to FIG. 9-FIG. 13.

Favorites button 312 may indicate record pages and/or objects 320 that have been marked as a favorite. Selecting favorites button 312 may generate a GUI displaying the marked favorites.

Search button 314 may allow for searching of objects and/or records related to the underlying application. Selecting search button 314 may reveal a search GUI including an interface that may allow a user to input search terms. Search button 314 may also be used to generate cursor controls as will further be described with reference to FIG. 14A-FIG. 15.

Notifications button 316 may allow a user to view updates related to the user. For example, if the user is mentioned in a post or an alert has been generated for a record tied to the user, the user may view the updates using notification button 316.

Menu button 318 may allow a user to display GUI 300A. For example, as a user navigates and/or interacts with different objects and/or data records, a user may wish to return to GUI 300A. For example, the user may wish to select a different object 320 and/or a different application using application menu button 315. Selecting menu button 318 may reveal GUI 300A and may allow a user to pursue the desired action.

Figure 3C:
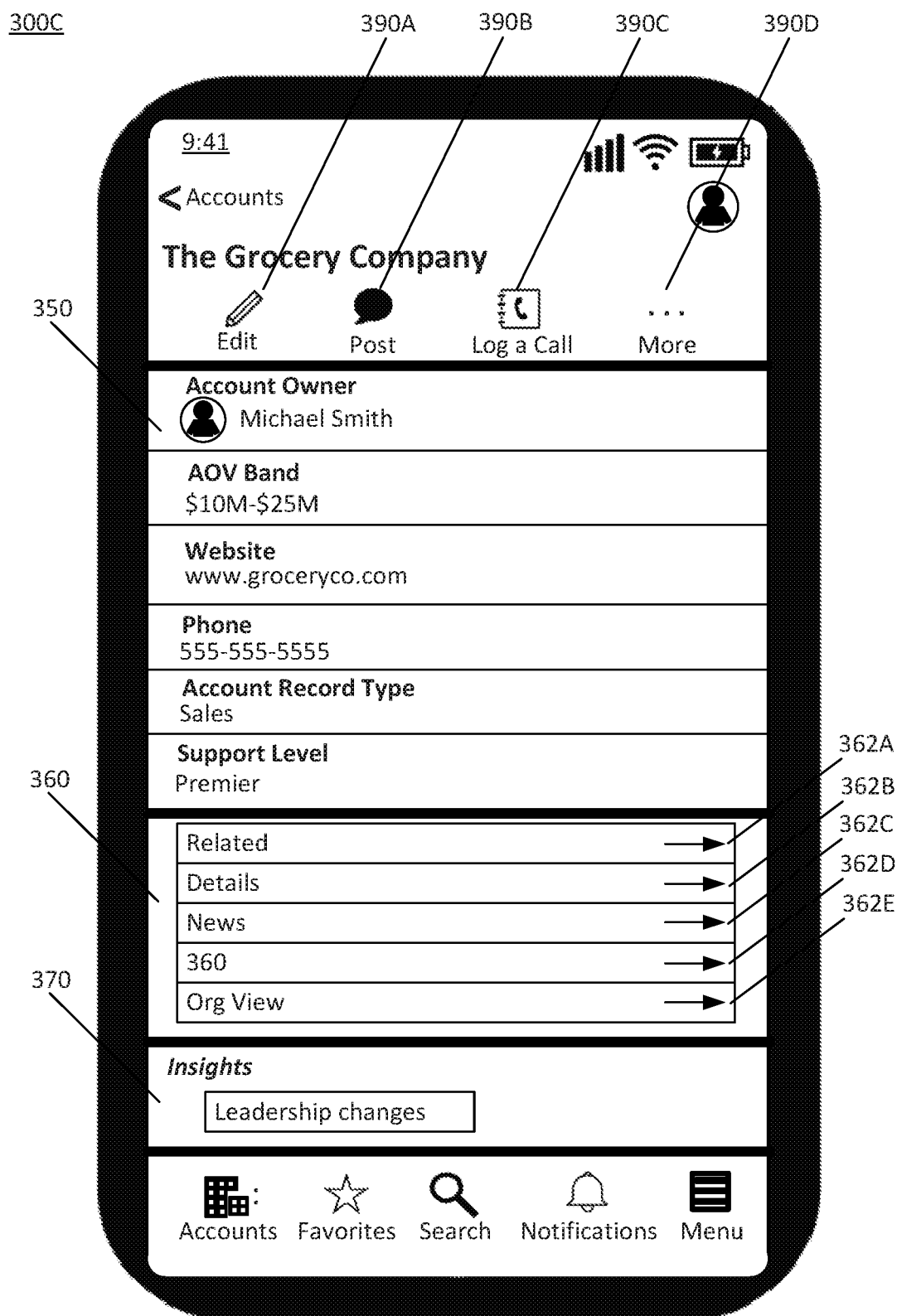
FIG. 3C depicts a block diagram of a GUI displaying a mobile record page, according to some embodiments.
Figure 3D:
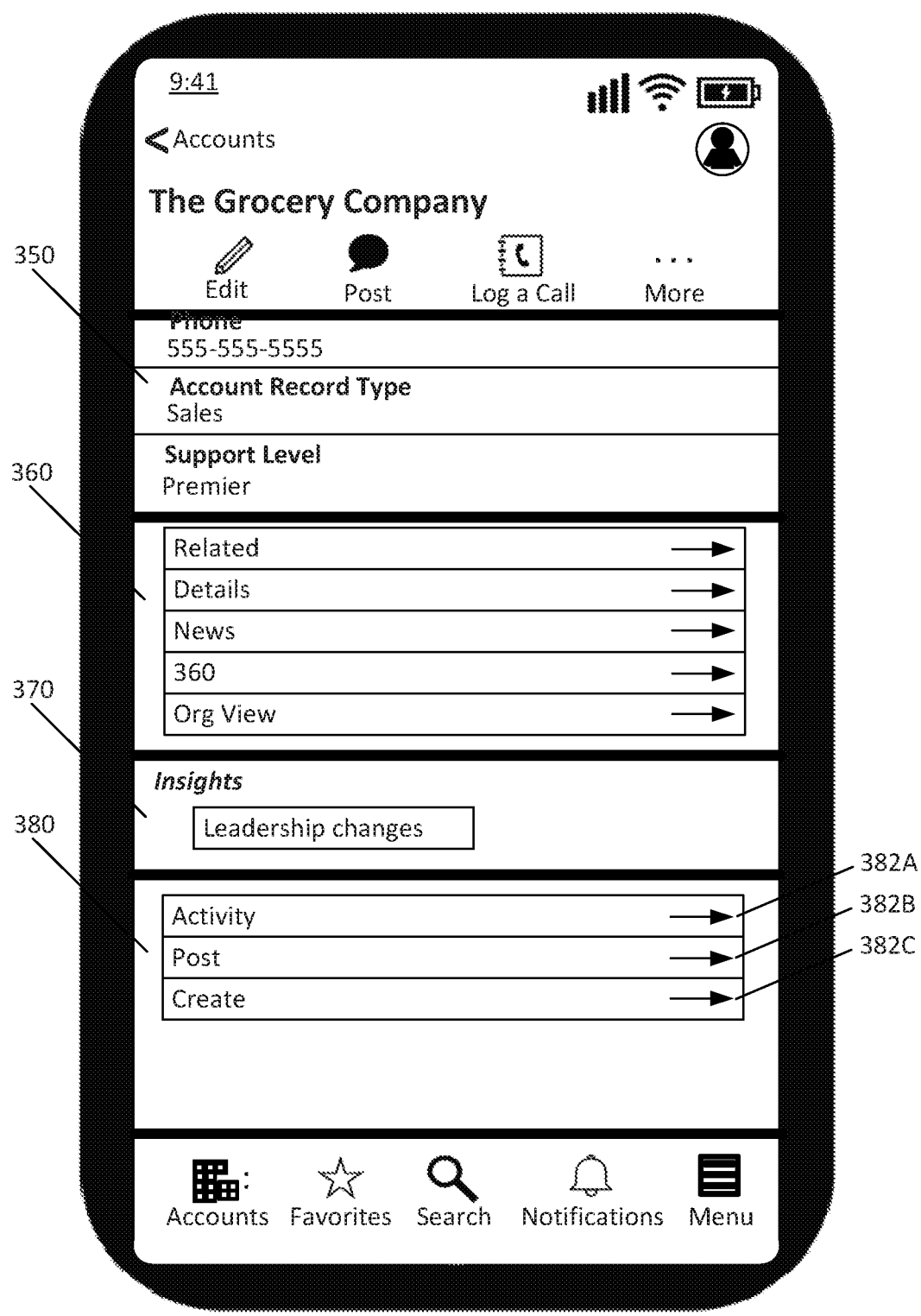
FIG. 3D depicts a block diagram of a GUI displaying a scrolled mobile record page, according to some embodiments.

After a user selects an object 320 and/or a grouped and/or collapsed object 340, unification system 110 may instantiate a mobile record page. FIG. 3C depicts a block diagram of a GUI 300C displaying a mobile record page, according to some embodiments. FIG. 3D depicts a block diagram of a GUI 300D displaying a scrolled mobile record page, according to some embodiments. The mobile record page may correspond to the record page described in GUI 200D and FIG. 2D. Unification system 110 may store a definition for this record page and may instantiate GUI 200D or GUIs 300C-300D depending on the device type accessing the record page.

Because GUIs 300C-300D may also depict the same record page as GUI 200D as shown on desktop device 150, GUIs 300C-300D may also depict the same components. For example, GUIs 300C-300D may include header component 350 corresponding to header component 250; information component 360 corresponding to information component 260; messaging component 370 corresponding to messaging component 270; and program component 380 corresponding to program component 280.

These mobile components may include similar capabilities as the desktop components. For example, information component 360 may include tab components 362 similar to tab components 262. Selecting a tab component 364 may allow a user to view the related information and/or "drill-down" to different data records. This GUI configuration may allow for a similar look-and-feel to the desktop version of the GUI with familiar tabs but may also preserve display screen space on the mobile version so that more information is display and/or accessible.

Similarly, as displayed in GUI 300D, program component 380 may include program tabs 382 that may be similar to program tabs 282. A user may use a scrolling gesture to move the mobile record page and to view program component 380. Similar to program tabs 282, a user may interact with program tabs 382 to execute particular program code corresponding to the application.

While the components between the desktop GUI version and mobile GUI version of the page may be similar and/or may include similar components, the sequencing and/or placement of the components may differ. Unification system 110 may control this sequencing so that the mobile GUI version may maintain a similar look-and-feel as the desktop version but still maintain efficient accessibility based on the smaller screen size.

To manage these components, unification system 110 may use a sequential assignment process to characterize the components. An embodiment of this sequential assignment process is further described with reference to FIG. 4.

The sequential assignment process may include analyzing the desktop GUI to identify particular GUI components of a record page. Unification system 110 may then sequentially assign a value to each GUI component even if the GUI components are in disparate locations on the GUI. For example, the GUI components may be located in different rows and/or columns and/or may include relative horizontal placements. These horizontal locations may be undesirable when the record page is displayed on mobile device 140, however, due to a vertical screen structure. In this case, unification system 110 may utilize the sequentially assigned values to instantiate a vertical organization for mobile device 140 in response to receiving a request to view the record page on mobile device 140. The vertical screen structure may allow a user to scroll through the record page vertically without needing to scroll horizontally. This structure may aid in user accessibility as well as allow a user to more quickly navigate to different portions of the record. Because the user may focus on vertical scrolling movement in one dimension, the user may avoid scrolling in the second dimension in an attempt to locate a desired GUI object.

Additionally, GUIs 300C-300D may include action buttons 390. While a user scrolls and/or navigates the record page, action buttons 390 may persist and/or may allow a user to perform an action related to the displayed record page. For example, edit button 390A may allow a user to edit data in the record page. Post button 390B may allow a user to post a comment to the record page. A comment may be a user message or note and may differ from data corresponding to the record page. For example, data may be an organization name while a comment may be a user message to another user capable of accessing the record page. Similarly, log button 390C may include a special type of post directed to logging information such as a phone call. In an embodiment, log button 390C may create a special data record for tracking information.

Action buttons 390 may also include other actions depending on the record page and/or the application. Actions buttons 390 displayed may also include more and/or less than the number of action buttons 390 displayed in FIG. 3C. Expand button 390D may also reveal other possible actions. For example, other possible actions may include generating or appending a file, generating a link, generating a new group of users, adding a new note, generating a poll, posting a question, adding a thanking note, appending a video, sending an email, and/or other actions.

To select an action, the user may click and/or press an action. In an embodiment, a user may use a scrubbing gesture along with search button 314. Search button 314 may also be used to generate cursor controls as will further be described with reference to FIG. 14A-FIG. 15. A user may scroll with the cursor using a long press. When a cursor selects an action button 390, releasing the long press may signify a selection of a particular action button 390 selected by the cursor.

Using GUIs 300C-300D, a user may navigate a record page using mobile device 140. As will be explained further below, personalization configurations made by the user on desktop device 150 may also appear in the mobile GUI version. Unification system 110 may store these configurations and retrieve them in response to a request. Unification system 110 may apply the personalization choices when generating a mobile GUI. In addition to these choices, unification system 110 may utilize a sequential component assignment process to produce the mobile.

Figure 4:
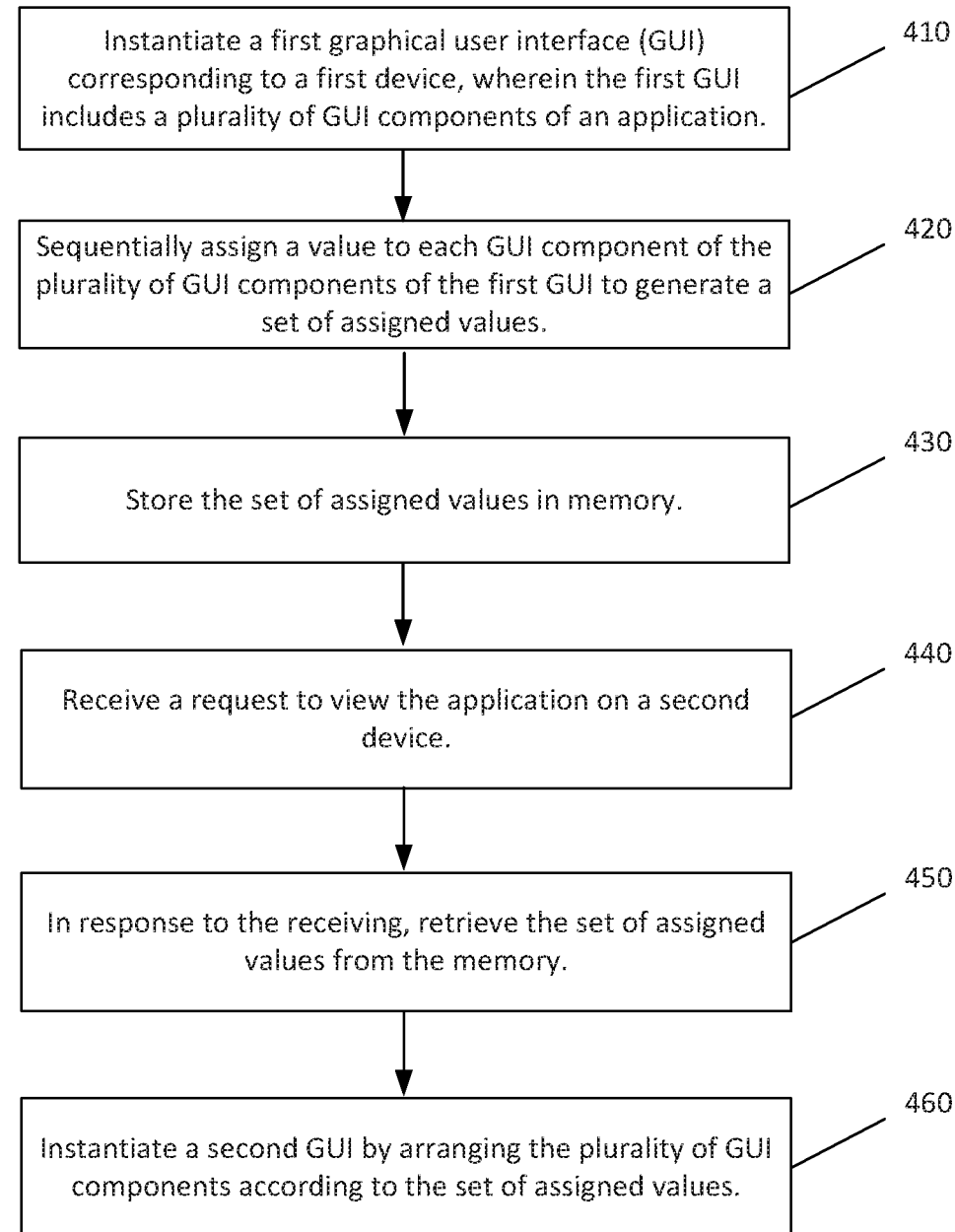
FIG. 4 depicts a flowchart illustrating a method for sequentially generating a second GUI corresponding to a first GUI, according to some embodiments.

FIG. 4 depicts a flowchart illustrating a method 400 for sequentially generating a second GUI corresponding to a first GUI, according to some embodiments. Method 400 shall be described with reference to FIG. 1; however, method 400 is not limited to that example embodiment.

In an embodiment, unification system 110 may utilize method 400 to generate a second GUI corresponding to a first GUI. The foregoing description will describe an embodiment of the execution of method 400 with respect to GUI 200D and GUIs 300C-300D, but may be applicable to any mapping GUIs. While method 400 is described with reference to unification system 110, method 400 may be executed on any computing device, such as, for example, the computer system described with reference to FIG. 18 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 410, unification system 110 may instantiate a first graphical user interface (GUI) corresponding to a first device, wherein the first GUI includes a plurality of GUI components of an application. Unification system 110 may instantiate the first GUI on desktop device 150. For example, a user, administrator, may construct the first GUI corresponding to an application. The application may be hosted by a cloud computing program and/or a networked computing system. The administrator and/or the user may develop one or more GUI views corresponding to the application. The first GUI may, for example, correspond to a record page. In an embodiment, the administrator and/or the user may use an application builder to generate the record page. An embodiment of an application builder is described with reference to FIG. 5-FIG. 8.

The record page may be displayed using the first GUI. The first GUI may represent the record page as displayed on desktop device 150. The first GUI may include a plurality of GUI components representing different access portions for the application. An example embodiment of the GUI components is described with reference to FIG. 2D and GUI 200D. An administrator and/or a user may place the components in desired locations of the first GUI. These locations may be in rows and/or columns and/or may be arbitrary. At 410, a user or administrator may modify the location of the components and unification system 110 may track the modified locations. Unification system 110 may note that first GUI creation and/or modification has been completed using, for example, an elapsed time and/or from receiving a command to save the first GUI. In an embodiment, unification system 110 may save configurations of the first GUI in a continuous and/or monitored manner without a direct command from the user. At 410, instantiation may include commanding desktop device 150 to display the first GUI and/or may include saving a configuration of the first GUI.

At 420, unification system 110 may sequentially assign a value to each GUI component of the plurality of GUI components of the first GUI to generate a set of assigned values. Referring to FIG. 2D and GUI 200D, a first GUI may include components 250-280. These components 250-280 may be arranged in an arbitrary manner and/or into rows and columns. For example, header component 250 may be arranged above information component 260, messaging component 270, and program component 280. Information component 260 may be located to the left of messaging component 270 and program component 280. Messaging component 270 may be located above program component 280.

Unification system 110 may store metadata data related to these locations. The metadata may correspond to a shared definition of the record page. This shared definition may be used to instantiate the first GUI and/or the second GUI. When storing this metadata, unification system 110 may sequentially assign a value to each component of the first GUI. For example, unification system 110 may assign a numerical value or binary code corresponding to the components based on the arrangement on the first GUI. Unification system 110 may utilize a left to right and top to bottom process of assigning the values. For example, header component 250 may be first and followed by information component 260, messaging component 270, and program component 280. Each GUI component may be assigned a sequential value. This sequential value may aid in recreating the first GUI as a second GUI to be displayed on a different device. The second device may, for example, utilize a vertical display screen and reordering the components may aid in a more accessible GUI relative to the horizontal GUI 200D displayed in FIG. 2D.

At 430, unification system 110 may store the set of assigned values in memory. As previously discussed, the assigned values may be stored as metadata in memory. Unification system 110 may store this metadata in content database 116 and/or may store the metadata externally. For example, if a cloud computing system is using unification system 110 to manage the GUI construction of an application view, the set of assigned values may be passed to the cloud computing system for storage.

In an embodiment, the set of assigned values may be stored in correspondence to the record page displayed by the first GUI. The record page may use a single definition that may be modified to include the set of assigned values. This single definition may be a data structure or record facilitated by the application. Unification system 110 may use this single definition to recreate different GUI views of the record page. For example, unification system 110 may use this single definition to generate the first GUI and/or the second GUI.

At 440, unification system 110 may receive a request to view the application on a second device. The second device may differ from the first device and/or may be a different device type. For example, the first device may be desktop device 150 while the second device may be mobile device 140. The request from the second device may be a message including log-in credentials, a session token, device information, and/or other information identifying the second device. When unification system 110 receives the request, unification system 110 may analyze this data to determine the device type. For example, at 440, unification system 110 may determine that the second device is mobile device 140. In an embodiment, unification system 110 may utilize rules and/or logic to determine that the GUI instantiation for mobile device 140 differs from the GUI instantiation for desktop device 150.

At 450, in response to receiving the request, unification system 110 may retrieve the set of assigned values from the memory. After determining the device type by checking data or metadata of the request, unification system 110 may retrieve the set of assigned values to determine the arrangement of the GUI components. If the request were received from desktop device 150, unification system 110 may arrange the GUI components in a manner similar to GUI 200D. Because the request is received from the second device, however, unification system may utilize the set of assigned values to create a different GUI.

At 460, unification system 110 may instantiate a second GUI by arranging the plurality of GUI components according to the set of assigned values. For example, after determining that the second device is mobile device 140, unification system 110 may use programmatic rules or logic to instantiate the second GUI in a manner corresponding to mobile devices. For example, unification system 110 may recognize that GUI components should be arranged vertically for mobile devices and mobile device 140 because of the vertical nature of the display screen.

In this manner, unification system 110 may instantiate GUIs 300C-300D to be displayed on mobile device 140. The particular sequence of components may correspond to the set of assigned values. This sequence may allow unification system 110 to create a similar look and feel for mobile device 140 and desktop device 150.

In this manner, using method 400 may allow unification system 110 to recreate different GUI component arrangements for different devices. Unification system 110 may store a single page definition that may be retrieved upon receiving a request from a particular device. Unification system 110 may then determine the device type and instantiate a corresponding GUI based on the device type. In this manner, the devices may share the single page definition as managed by unification system 110. The single page definition may be modified. For example, a user may modify the location of particular components using a first device. As will further be described below, a user may also modify object locations. Unification system 110 may update the single page definition to include these modifications. Unification system 110 may then consult the single page definition when instantiating new GUI views for the record page. In this manner, unification system 110 may allow for user personalization of GUI components and may also reproduce modifications or personalization choices across the different devices. While unification system 110 may also manage modified application content, allowing and tracking modification of GUI components allows users to have more flexibility and navigation access across different devices.

Application Builder

While unification system 110 may instantiate various GUI views of an application or record page depending on device type, unification system 110 may also provide an application builder. Unification system 110 may instantiate various GUI views of an application builder allowing a user and/or administrator to configure and/or create a record page for an application. While the following description may refer to administrator device 120 accessing the application builder GUIs, a user may also access and/or manipulate the application builder GUIs using desktop device 150. This functionality may depend on whether the user has been granted access by an administrator.

Figure 5:
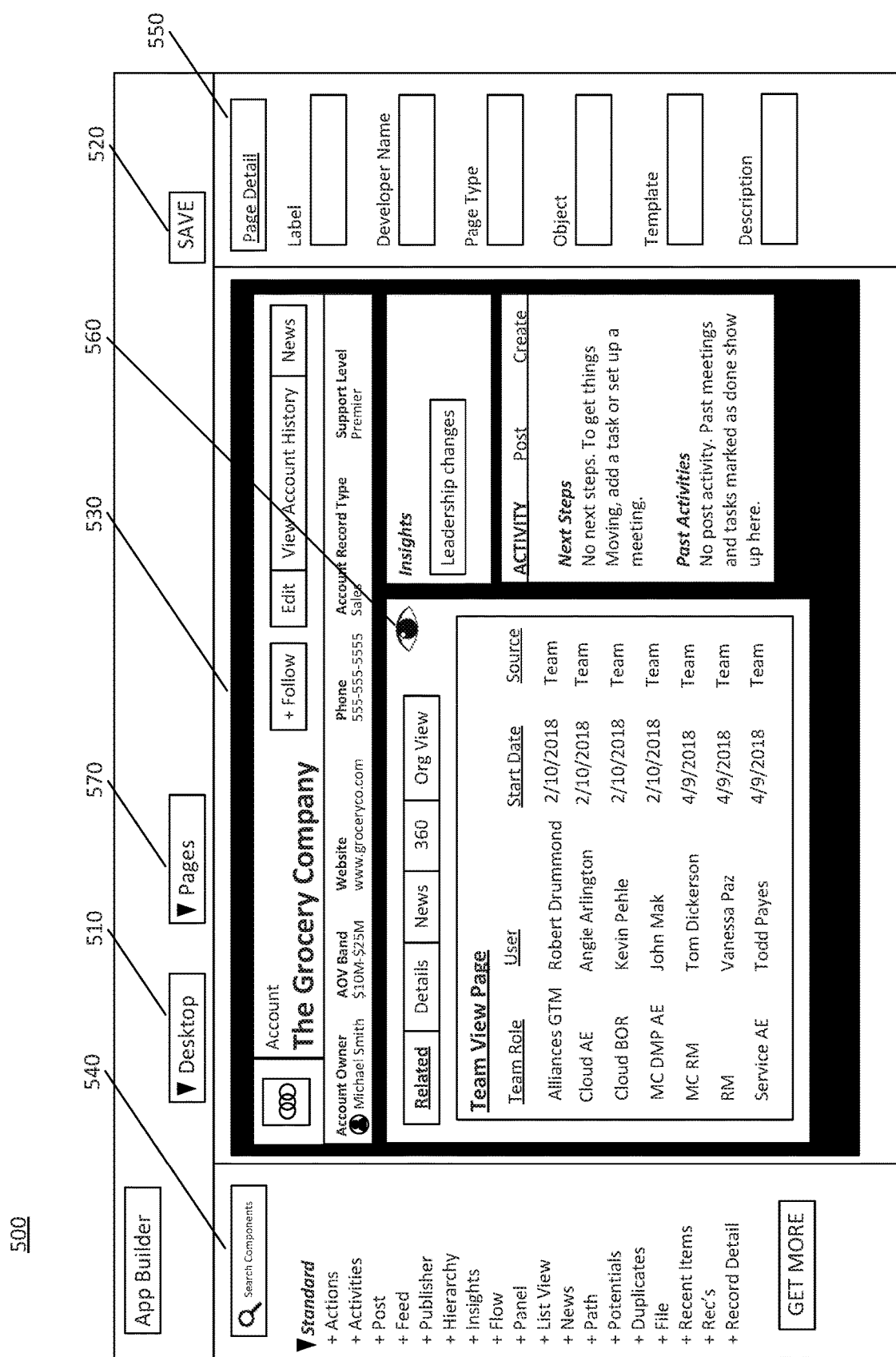
FIG. 5 depicts a block diagram of a GUI displaying an application builder, according to some embodiments.

FIG. 5 depicts a block diagram of a GUI 500 displaying an application builder, according to some embodiments. The application builder may be managed by unification system 110 and may allow an administrator to modify a record page of an application. These modifications may include GUI modifications including the particular components available for a user when accessing a record page. In an embodiment, unification system 110 may instantiate GUI 500 on administrator device 120. Administrator device 120 may accept commands and/or interactions with GUI 500. Administrator device 120 may then transmit these commands and/or interactions to unification system 110. Unification system 110 may then save these commands and/or may update a record page according to the commands. In an embodiment, unification system 110 may update a single definition data structure corresponding to the record page. Unification system 110 may use this single definition data structure when instantiating GUI views of the application and/or record page for mobile device 140 and/or desktop device 150.

GUI 500 may include different elements allowing an administrator or user to view, create, and/or modify a GUI view of a record page. For example, GUI 500 may include a device button 510, save button 520, GUI viewer 530, component panel 540, page panel 550, visibility icon 560, and/or page button 570.

Device button 510 may allow an administrator to toggle GUI views of a record. Device button 510 may be a drop-down menu and/or an icon for selecting a particular device. Device button 510 may indicate a device type, such as, for example, "desktop" or "mobile." Device button 510 may allow different categorizations based on device type, such as "desktop," "laptop," "tablet," or "phone." In an embodiment, device button 510 may allow a user to specify a particular device such as "User's Tablet ID #123." Based on the selection of device button 510, unification system 110 may modify the contents of GUI viewer 530.

GUI viewer 530 may include a preview of the GUI being created and/or modified by the application builder. GUI viewer 530 may display the GUI or record page to be displayed on, for example, desktop device 150. For example, GUI viewer 530 may display the components from GUI 200D. An administrator may interact with GUI viewer 530 to modify the components of the GUI.

The administrator may use administrator device 120 to supply commands to unification system 110. In response to the commands, unification system 110 may modify the GUI displayed in GUI viewer 530. For example, unification system 110 may modify the location of particular components. An administrator may supply a drag-and-drop command or gesture when interacting with GUI 500. In response to this command, unification system 110 may move the components to indicated locations. Further, unification system 110 may provide different layouts in terms of rows or columns or component placement. In this manner, the administrator may customize the GUI components of a record page. As will be explained below with reference to FIG. 7, an administrator may also configure elements within a GUI component using GUI viewer 530.

In addition to modifying the location of components, an administrator may also add and/or remove GUI components from a GUI. To remove a GUI component, an administrator may supply deletion command from administrator device 120 to unification system 110. This deletion command may refer to removing a GUI component but may not delete the underlying record data and/or modify the application data or executable program. Removing a GUI component may reflect a design decision and may indicate to unification system 110 that a particular component not be loaded. A user may or may not still access the component or underlying application elements using other operations.

In an embodiment, an administrator may specify a particular GUI view for a particular user. The administrator may decide to block a user from using certain application elements and/or GUI components. In this manner, unification system 110 may be configured to receive commands indicating that particular GUI components be block and may not load particular GUI components for the user to prevent the user from accessing application elements.

In addition to removing and/or blocking GUI components from a GUI, an administrator may add components. The administrator may use component panel 540 to access components. Unification system 110 may retrieve these components depending on the installed components in the cloud computing platform. Using component panel 540, a drag-and-drop gesture to move the component to GUI viewer 530 and to add a listed component to the GUI. The user may then move the added GUI component to a desired location. While GUI viewer 530 displays four components in FIG. 5, more or less components may be added. The components may also be resized by unification based on the commands provided by the administrator. Further, the added components may overflow "off-screen." In this case, unification system 110 may provide a scrolling element in GUI viewer 530 to allow a user to scroll and view the components.

While component panel 540 may include pre-loaded components from a cloud computing platform, component panel 540 may also include a button for retrieving additional components. This button may reveal an application marketplace or exchange for installing additional components. A user may also use a search bar in component panel 540 to filter and/or retrieve a particular component.

The components discussed here may correspond to GUI views and/or commands that may be utilized in an application. For example, a record may include account information that may be listed in a header component. An information component may organize the record data in a tabbed manner to allow a user to browse the stored information. Action components may allow a user to edit the record data and/or interact with the record data based on the functionality provided by the underlying application. In this manner, an administrator may define components to compose a GUI, and a user may use these components to interact with the underlying application and application record data.

In addition to editing GUI components, an administrator may also edit metadata associated with a record using page panel 550. Page panel 550 may include administrator metadata that may not be available for viewing for a user. For example, page panel 550 may allow an administrator to add a label for the GUI view, a developer name, a page type, an object description, select a template, and/or add a description. This metadata editing may be useful for a categorizing the record. For example, the metadata may specify that the particular record page is an "Account" object. Page panel 550 may then display the object information.

Page panel 550 may also allow a user to select a particular template of components to quickly build a GUI view. This template may include preselected components and/or component locations. Changing the template may also cause unification system 110 to modify the GUI to conform with the template.

Figure 7:
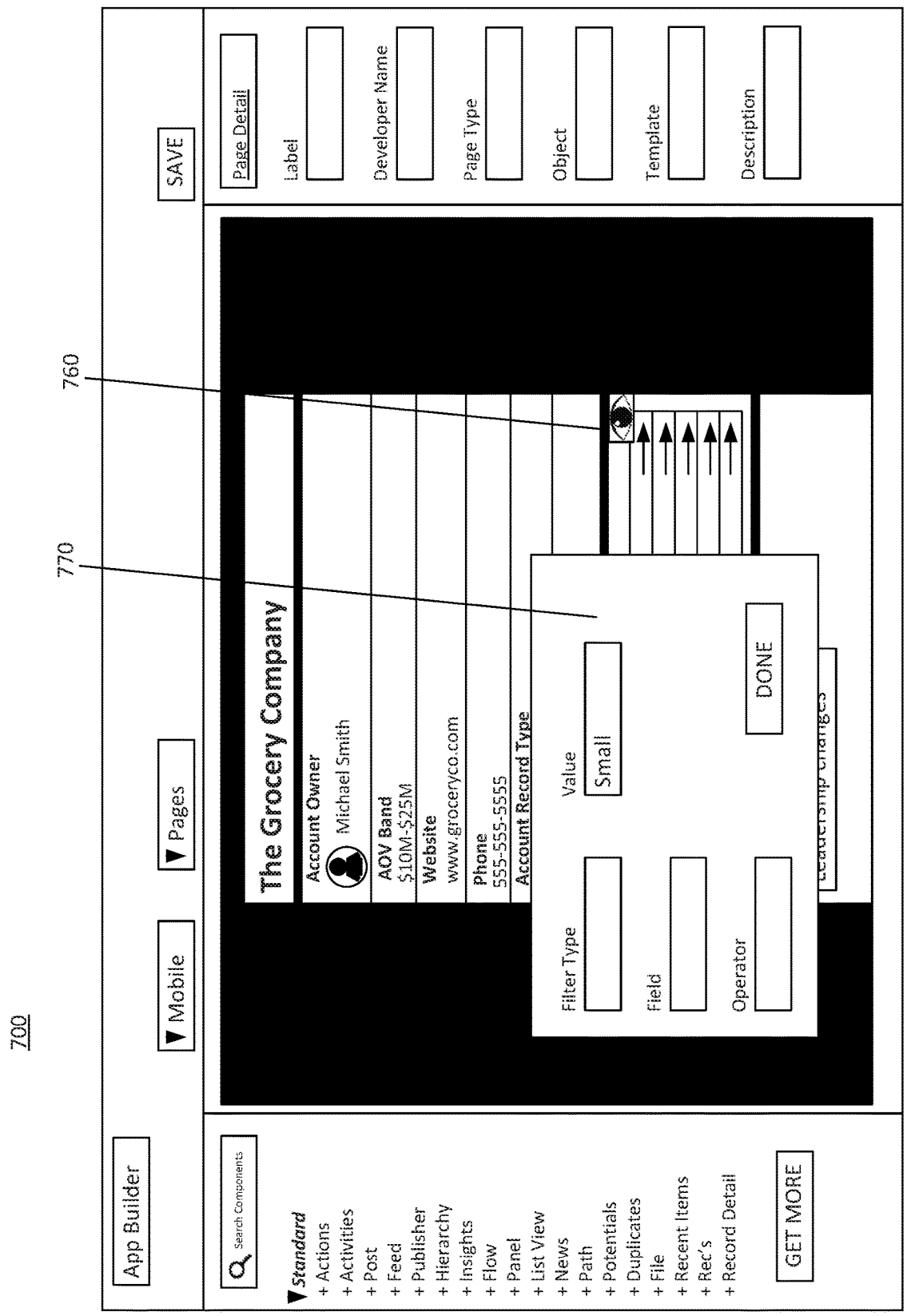
FIG. 7 depicts a block diagram of a GUI displaying an editor prompt, according to some embodiments.

As will be further discussed with respect to FIG. 7, GUI 500 may also include visibility icon 560. Visibility icon 560 may represent a GUI component that has different properties depending on the device type. For example, in one embodiment, when unification system 110 instantiates the GUI on desktop device 150, desktop device 150 may display the component having visibility icon 560. When unification system 110 instantiates the GUI on mobile device 140, however, mobile device 140 may not display the component in this embodiment. Unification system 110 may store this visibility information in the single definition for the record page. Unification system 110 may maintain these visibility elements and may allow an administrator to hide and/or show particular components depending on device type. An administrator may wish to provide the component on, for example, desktop device 150 because of the larger screen size but hide the component on mobile device 140. In this manner, the GUI display of the record page for mobile device 140 may be more aesthetically appealing depending on the administrator choices.

GUI 500 may also include a page button 570. Page button 570 may allow for quick access between record pages to allow editing of the GUI components. An administrator may use page button 570 to reveal a drop-down menu and select a particular page. Unification system 110 may then instantiate that page in GUI viewer 530 and allow the administrator to manipulate the page.

GUI 500 may also include save button 520. In response to receiving an interaction on save button 520, unification system 110 may save the GUI component configuration in the single page definition corresponding to the page. This single page definition may apply to a single user and/or more than one users depending on the configuration information provided by the administrator. For example, the administrator may configure a GUI for User A that includes a component but may configure a GUI for User B that does not include the component. Unification system 110 may maintain this configuration information. In an embodiment, if the component is available for User A, however, unification system 110 may manage the single page definition for User A and allow User A to access the component using desktop device 150 and/or mobile device 140. Modifications to the GUI component and/or application contents may be preserved for User A in the single page definition so that they may be reproduced for each user device corresponding to User A.

Figure 6:
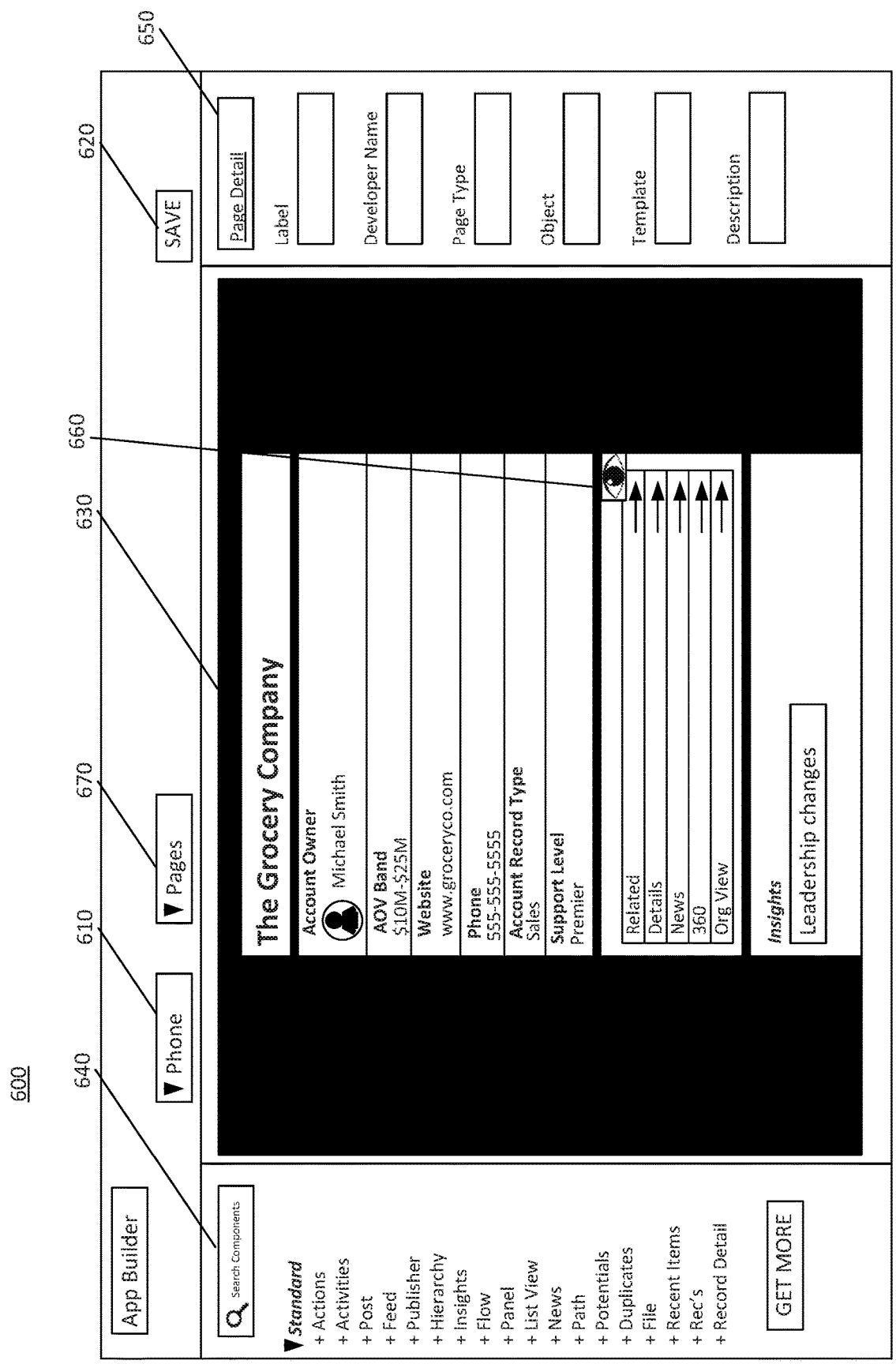
FIG. 6 depicts a block diagram of a GUI displaying a mobile application builder, according to some embodiments.

FIG. 6 depicts a block diagram of a GUI 600 displaying a mobile application builder, according to some embodiments. GUI 600 may depict a mobile view of the GUI edited in GUI viewer 530 as described with reference to FIG. 5. Unification system 110 may instantiate GUI 600 in response to receiving an interaction with device button 510. The interaction may be, for example, a click or tap switching the view to a mobile view.

GUI 600 may include elements similar to GUI 500 and that may operate in a similar manner. For example, GUI 600 may include a device button 610, save button 620, GUI viewer 630, component panel 640, page panel 650, visibility icon 660, and/or page button 670. Using device button 610 may allow a user to toggle between a mobile view as shown in GUI viewer 630 and a desktop view as shown in GUI viewer 530.

Unification system 110 may utilize the single page definition to instantiate the GUI components in GUI viewer 630. In this manner, the GUI components in GUI viewer 630 may correspond to the GUI components in GUI viewer 530. Unification system 110 may arrange these components in a sequential manner as described with reference to FIG. 4. In an embodiment, an administrator may arrange GUI components in a particular desktop layout. Unification system may then automatically generate a default mobile layout having a corresponding arrangement of GUI components. In an embodiment, an administrator or user may distinguish ordering between the desktop layout and the mobile layout. For example, an administrator or user may modify the modify layout separately from the desktop label. Unification system 110 may then store the different arrangements and use the specified arrangements when instantiating a GUI on desktop device 150 and/or mobile device 140 respectively.

Using GUI viewer 630, an administrator may modify a mobile GUI view of the record page. Similar to GUI 500, an administrator may add, remove, modify, and/or alter the components of the mobile GUI displayed in GUI viewer 630 using component panel 640 and GUI viewer 630. An administrator may also modify metadata using page panel 650. These modifications on the mobile GUI view may be preserved and may automatically be duplicated on the desktop view shown in GUI viewer 530. In this manner, the application builder may allow a user to edit both the desktop view and the mobile view of a record page. Unification system 110 may then preserve changes and automatically update the GUI views so that the edits are visible in both GUIs. Using the application builder, an administrator may quickly generate a desktop GUI and/or a corresponding mobile GUI for allowing a user to access an application and/or data records. Similarly, the administrator may generate a mobile GUI and unification system 110 may automatically produce a desktop version of the mobile GUI.

While unification system 110 may automatically organize and/or replicate GUI components for the desktop and mobile view, unification system 110 may also allow an administrator to distinguish particular components to only be visible on a particular view. For example, a user may designate a component be visible on the desktop view but not the mobile view. This component may be marked with visibility icon 660. While the component may not appear visible to an end user of the created GUI, an administrator may still see the component in GUI viewer 630 to modify the component and/or to accept the hidden aspect of the component.

In this manner, the application builder may allow an administrator to customize GUI component views. If an administrator grants permission to a user, the user may also be able to customize GUI component views. Unification system 110 may preserve these configurations across different devices and device types to instantiate the created GUI view. Unification system 110 may manage these configurations using a single definition file that is accessed regardless of the device type that is sending a request.

FIG. 7 depicts a block diagram of a GUI 700 displaying an editor prompt 770, according to some embodiments. While displayed over the mobile view, editor prompt 770 may also appear over the desktop view. Editor prompt 770 may allow an administrator to edit configurations for a particular component. For example, editor prompt 770 may allow editing of particular fields of a component. A component may include several tabs. Using editor prompt 770 may allow an administrator to modify the visible tabs.

Similarly, editor prompt 770 may allow an administrator to designate a visibility parameter for a component. As described above, an administrator may wish to reveal a component in a first GUI (e.g., for desktop device 150) but may wish to hide the component in a second GUI (e.g., for mobile device 140). Using editor prompt 770, the administrator may make this designation. A component having an adjusted visibility parameter may include visibility icon 760.

Using editor prompt 770, an administrator may define several visibility rules. For example, the administrator may create multiple device categories such as desktop, tablet, and phone. The administrator may then define visibility parameters for each of the categories. For example, a component may be visible on the phone but not on a desktop or tablet. Using editor prompt 770, an administrator may specify and/or customize these visibility parameters. Unification system 110 may then store these parameters for application when a particular GUI is instantiated.

In an embodiment, editor prompt 770 may include a drop-down menu allowing an administrator to specify the type of devices showing the particular GUI component. For example, the drop-down menu may include a "small" option, a "large" option, and/or a blank option. In an embodiment, selecting the "small" option may indicate that the GUI component should only be shown on a mobile device 140. Similarly, the "large" option may indicate that the GUI component should only be shown on the desktop device 150. The blank option may indicate that the GUI component be displayed on all devices. The drop-down menu may also include a "medium" option, which may correspond to tablet devices. In an embodiment, the editor prompt 770 may also allow an administrator to specify a negative conditions and/or select devices that hide the GUI component. Using these visibility options, an administrator may customize different GUI views across different user devices.

Figure 8:
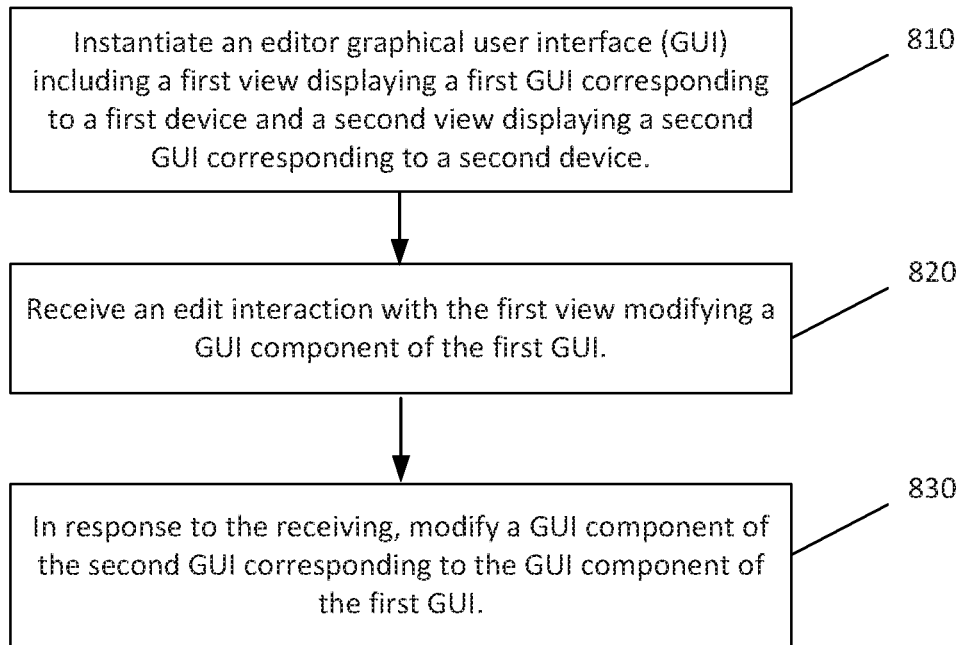
FIG. 8 depicts a flowchart illustrating a method for building a unified application, according to some embodiments.

FIG. 8 depicts a flowchart illustrating a method 800 for building a unified application, according to some embodiments. Method 800 shall be described with reference to FIG. 1; however, method 800 is not limited to that example embodiment.

In an embodiment, unification system 110 may utilize method 800 manage different GUI views of an application builder. The foregoing description will describe an embodiment of the execution of method 800 with respect to GUI 500 and GUI 600, but may be applicable to any application builder GUIs. While method 800 is described with reference to unification system 110, method 800 may be executed on any computing device, such as, for example, the computer system described with reference to FIG. 18 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 8, as will be understood by a person of ordinary skill in the art.

In an embodiment, at 810, unification system 110 may instantiate an editor GUI including a first view displaying a first GUI corresponding to a first device and a second view displaying a second GUI corresponding to a second device. The first view may be GUI 500 and/or may include GUI viewer 530. The corresponding device may be desktop device 150. Unification system 110 may identify the particular device GUI being edited and store modifications to GUI components in memory for the particular device.

The second view may be GUI 600 and/or may include GUI viewer 630. The corresponding device may be mobile device 140. Unification system 110 may allow a user or administrator to toggle between these two views to view the GUIs as they would appear when instantiated on a user device. Further, unification system 110 may instantiate the first view and the second view using a single page definition of an application or record.

At 820, unification system 110 may receive an edit interaction with the first view modifying a GUI component of the first GUI. The edit interaction may include adding a component to the first GUI, removing a component from the first GUI, changing a location of a component on the first GUI, adjusting a component parameter, adjusting a visibility parameter for a component, and/or other edits. An administrator device 120 may supply the edit interaction to unification system 110. Unification system 110 may save the configuration in the single page definition for the application or record and/or may update the first view to include the modified GUI component.

At 830, unification system 110 may, in response to the receiving, modify a GUI component of the second GUI corresponding to the GUI component of the first GUI. In an embodiment, unification system 110 may perform this modification using the single page definition. For example, when an administrator toggles to view the second GUI, the second GUI may be updated based on a modification performed on the first GUI. Unification system 110 may reproduce this modification automatically using the shared single page definition. An administrator may continue to modify elements on the second GUI, and unification system 110 may reproduce these additional modifications on the first GUI. In this manner, unification system 110 may allow component modification across different GUI views and may allow an administrator to quickly view how a potential modification on a first GUI (e.g., to be displayed on desktop device 150) may affect a second GUI (e.g., to be displayed on mobile device 140).

Navigation Button and Navigation Menu

Unification system 110 may instantiate a navigation button and/or a navigation menu. These navigation GUI elements may aid a user in navigating through different page views of an application. These GUI elements may also provide faster navigation on mobile device 140 due to their position and accessibility. A user may use the navigation button and/or navigation menu to select different application objects. Unification system 110 may also modify the navigation button and/or the objects in the navigation menu. In an embodiment, unification system 110 may identify adding, deleting, and/or moving an object on a desktop GUI view. Unification system 110 may receive these commands from desktop device 150. Unification system 110 may then alter the navigation button and/or navigation menu to maintain the same personalization. FIG. 9-FIG. 13 describe the navigation button and navigation menu.

Figure 9:
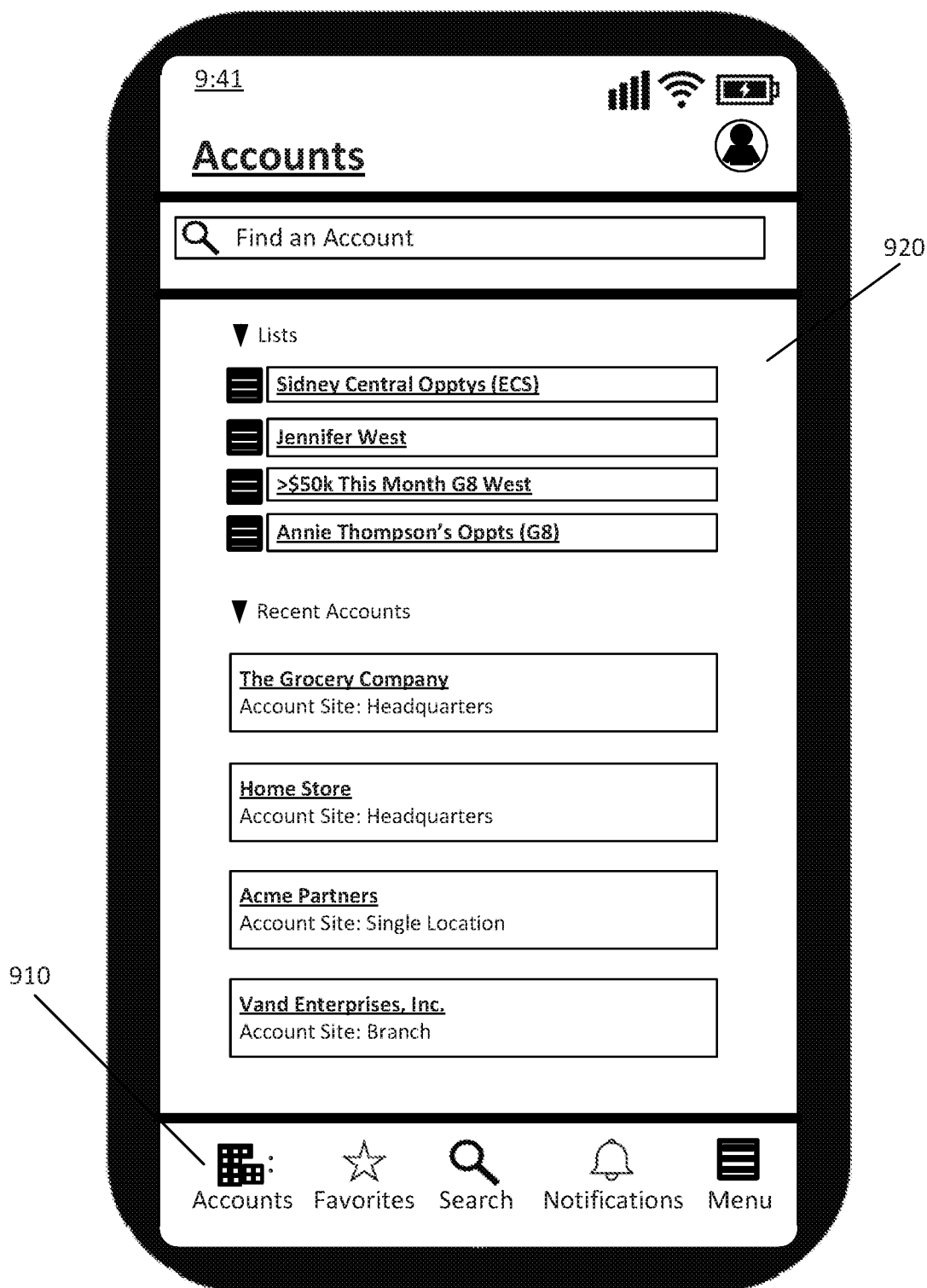
FIG. 9 depicts a block diagram of a GUI displaying a navigation button, according to some embodiments.

FIG. 9 depicts a block diagram of a GUI 900 displaying a navigation button 910, according to some embodiments. Navigation button 910 may operate in a manner similar to navigation button 310 as described with respect to FIG. 3A. Unification system 110 may instantiate GUI 900 on mobile device 140. A user viewing GUI 900 may interact with a display screen of mobile device 140 and/or other touch screen interface to submit a user interaction with navigation button 910. The user interaction may be, for example, a click or a tap on navigation button 910. Mobile device 140 may transmit this interaction to unification system 110 and/or may process the interaction locally.

In response to receiving an interaction with navigation button 910, mobile device 140 may display navigation screen 920. Navigation screen 920 may be instantiated by unification system 110 and/or may be determined internally to mobile device 140. Navigation screen 920 may correspond to the object displayed in navigation button 910. For example, if navigation button 910 represents the "Accounts" object in the underlying application, selecting navigation button 910 may display the "Accounts" home page on navigation screen 920. In this manner, if navigation button 910 changes to represent a different object, when a user selects navigation button 910, navigation screen 920 will change to represent the page for that object. This changing navigation button 910 is further described with reference to FIG. 11.

Figure 10:
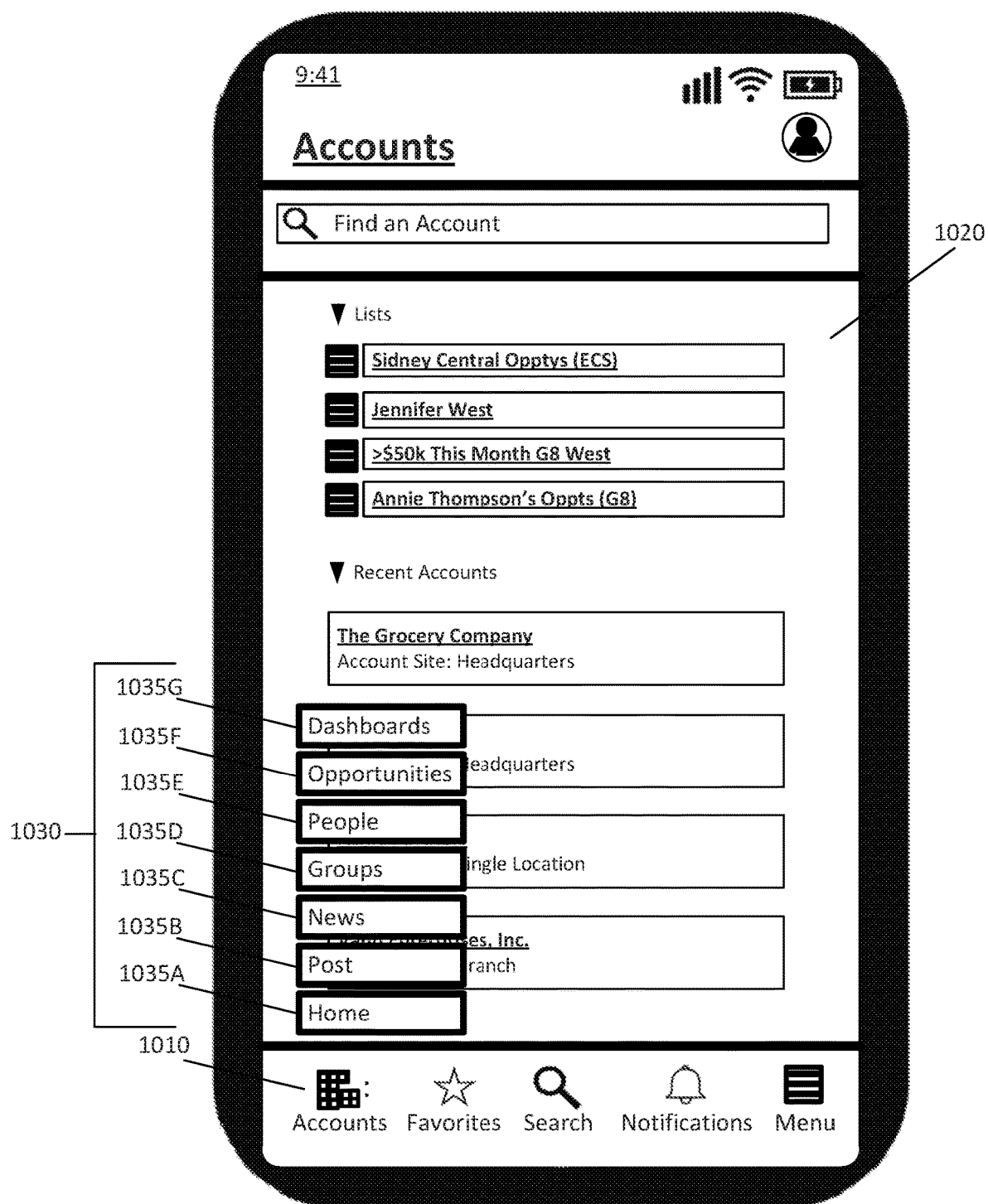
FIG. 10 depicts a block diagram of a GUI displaying a navigation menu, according to some embodiments.

FIG. 10 depicts a block diagram of a GUI 1000 displaying a navigation menu 1030, according to some embodiments. To display navigation menu 1030, a user may interact with navigation button 1010. In contrast with the interaction described with respect to FIG. 9, the interaction with navigation button 1010 may differ to reveal navigation menu 1030. For example, a user may use a long press on navigation button 1010 to reveal navigation menu 1030. A long press may be a gesture or selection that indicates contact with navigation button 1010 for longer than a predetermined amount of time or exceeds a predetermined threshold of time. Mobile device 140 may measure an elapsed time corresponding to user contact to determine whether a long press interaction has been detected. In an embodiment, an operating system operating on mobile device 140 may detect a long press, a short press, and/or other gestures. In this case, a software program executing on mobile device 140 and communicating with unification system 110 may execute a function when called by the operating system in response to detecting a particular gesture.

A short press may be an interaction with navigation button 1010 that falls below the predetermined amount of time. If a short press is detected on navigation button 1010, similar to the process described in FIG. 9, mobile device 140 may alter navigation screen 1020 to display the home page corresponding to the object current displayed in navigation button 1010. In this manner, two different gestures may be applied at navigation button 1010 reveal navigation menu 1030 and/or to navigate to the highlighted object.

Figure 11:
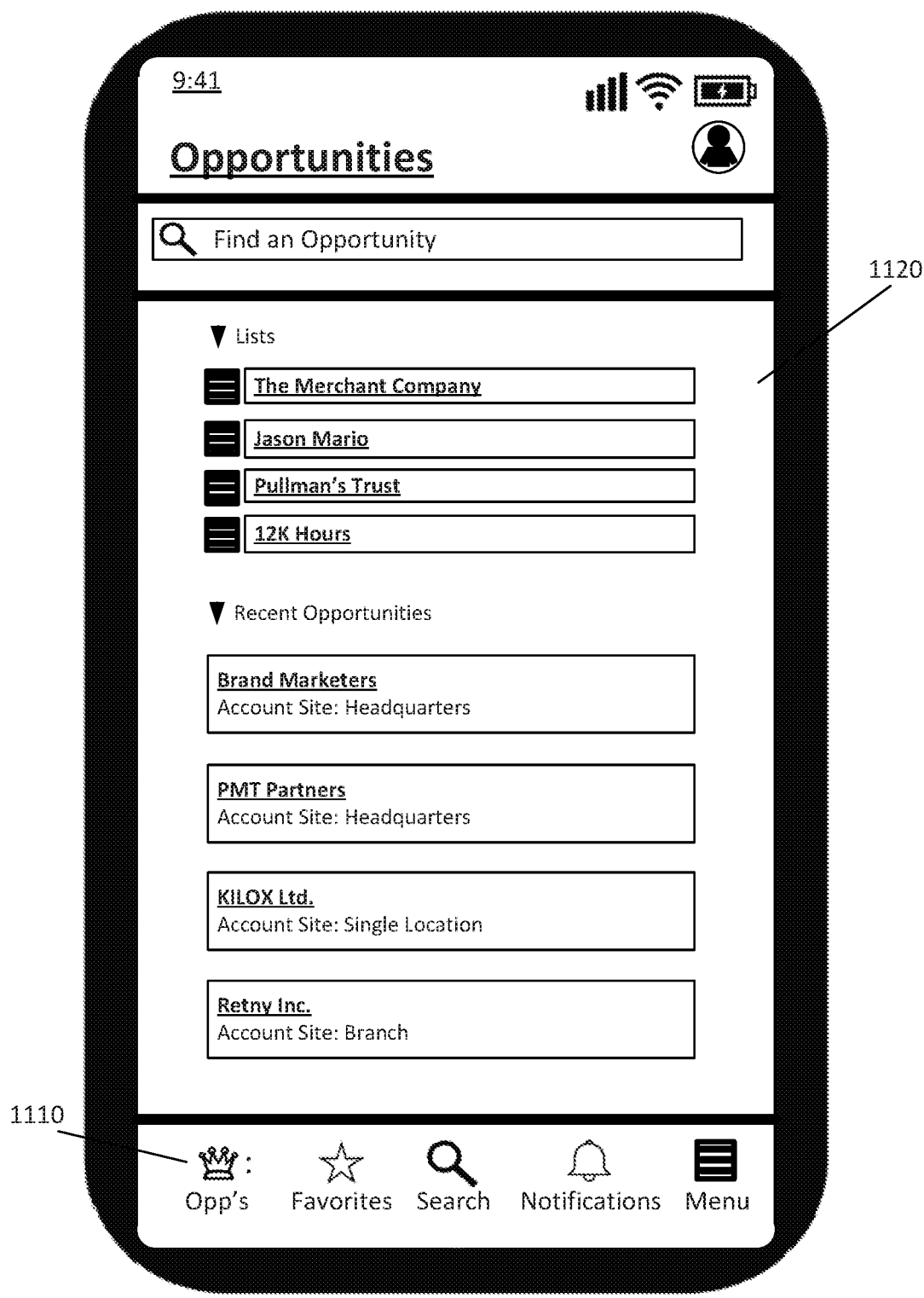
FIG. 11 depicts a block diagram of a GUI displaying an updated navigation button corresponding to a selected object, according to some embodiments.

Navigation menu 1030 may include a list of objects 1035 corresponding to an application. These objects 1035 may be similar to objects 220 as described with reference to FIG. 2B. Once navigation menu 1030 has been revealed, a user may select an object 1035 to navigate to the selected object page. In a non-limiting example, a user may select object 1035F to navigate to an "Opportunities" object. FIG. 11 depicts an embodiment of a result of this selection.

FIG. 11 depicts a block diagram of a GUI 1100 displaying an updated navigation button 1110 corresponding to a selected object, according to some embodiments. If a user selects a particular object 1035 from navigation menu 1030, unification system 110 and/or mobile device 140 may update navigation button 1010 to become navigation button 1110 and/or may update navigation screen 1020 to become navigation screen 1120.

For example, if a user selects object 1035F to navigate to an "Opportunities" object, navigation button 1110 may be updated to display an "Opportunities" icon. Similarly, navigation screen 1120 may display the "Opportunities" home page or object home page. In this manner, a user may able to use navigation menu 1030 to navigate to different objects of the application.

With updated navigation button 1110, a user may use a short press gesture to return to navigation screen 1120. If a user navigates to a different application page, selecting navigation button 1110 may reveal navigation screen. In this manner, navigation button 1110 may be updated to reflect a "most recent" choice from navigation menu 1030. Unification system 110 and/or mobile device 140 may store this selection in memory so the user may quickly navigate back to a previously selected object. A user may further update navigation button 1110 by invoking navigation menu 1030 and selecting a different object.

As will be further explained with reference to FIG. 12A-FIG. 12F, the mobile objects 1035 listed in navigation menu 1030 may correspond to tab objects 1245 as seen on the desktop version of the application GUI. In this manner, manipulation of the tab objects 1245 on desktop device 150 may result in a change in navigation menu 1030 objects and vice versa. Unification system 110 may facilitate these changes based on a single definition used for both GUIs displayed on mobile device 140 and GUIs displayed on desktop device 150.

Figure 12A:
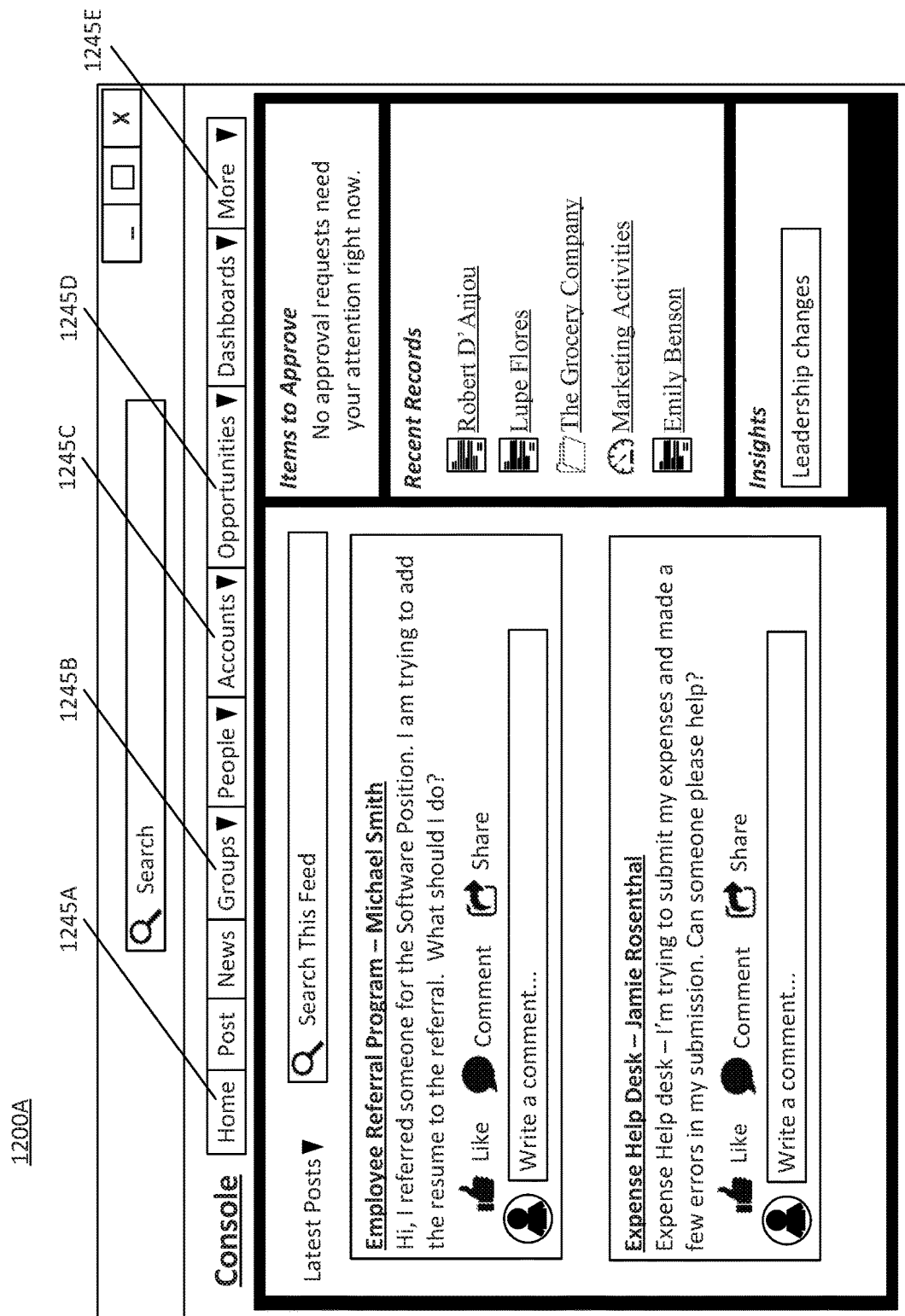
FIG. 12A depicts a block diagram of a GUI displaying a page including tab objects, according to some embodiments.

FIG. 12A depicts a block diagram of a GUI 1200A displaying a page including tab objects 1245, according to some embodiments. The tab objects 1245 may be similar to objects 220 described with reference to FIG. 2B. Unification system 110 may instantiate GUI 1200A to be displayed on desktop device 150.

Figure 12B:
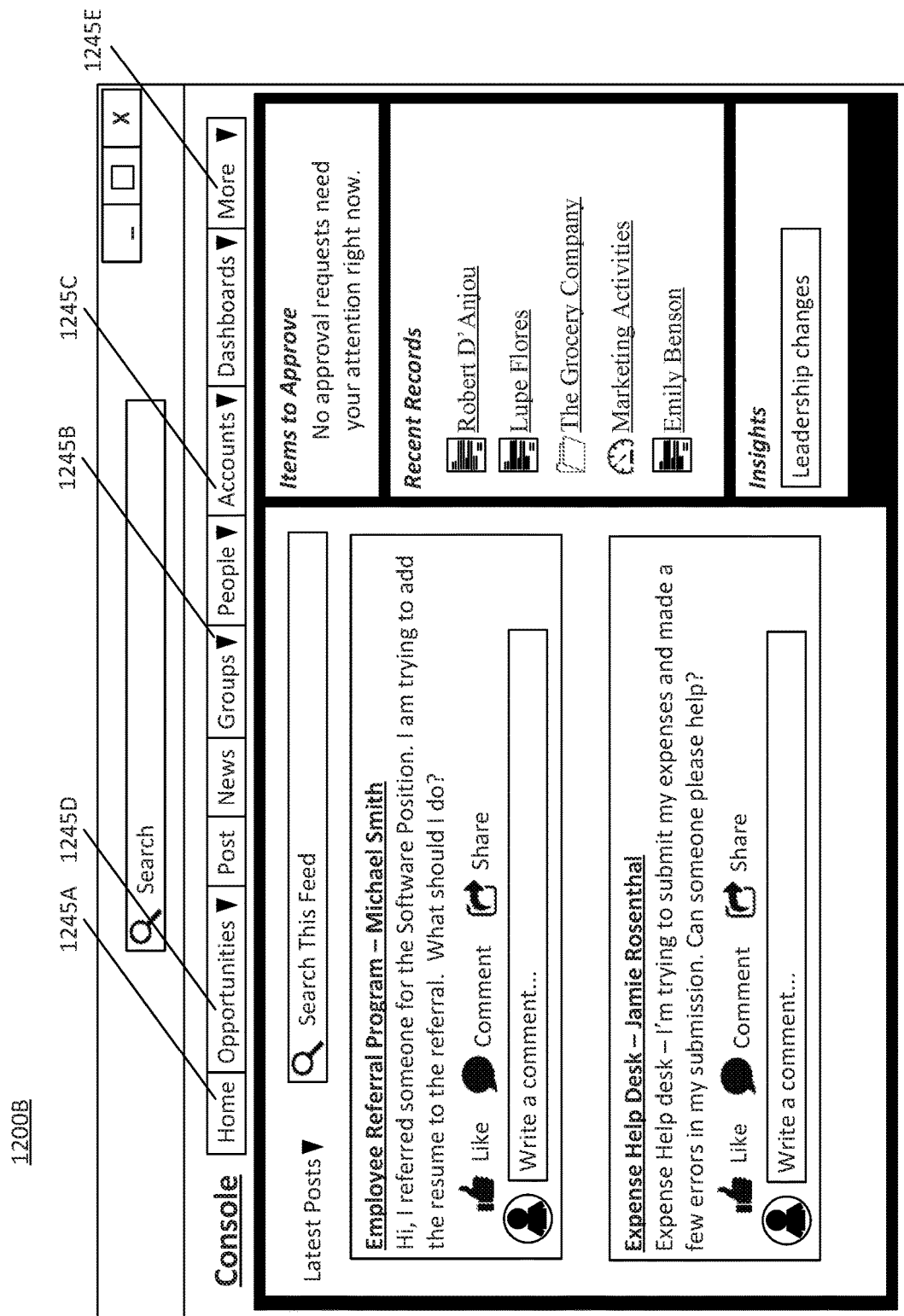
FIG. 12B depicts a block diagram of a GUI displaying tab object movement, according to some embodiments.

FIG. 12B depicts a block diagram of a GUI 1200B displaying tab object 1245 movement, according to some embodiments. Unification system 110 may instantiate GUI 1200B in response to detecting a movement interaction of tab objects 1245. For example, from GUI 1200A, a user may move tab object 1245D from between tab objects 1245C and 1245E to between tab objects 1245A and 1245B. A user may have supplied this gesture at desktop device 150. Desktop device 150 may have transmitted this modification to unification system 110. Unification system 110 may store this modification and update the ordering of the tab objects 1245. Unification system 110 may store this modification as an update to a single page definition representing the page. Further, because unification system 110 may utilize a single page definition to correlate the tab objects, unification system 110 may apply this modification when the page is accessed on mobile device 140.

Figure 12C:
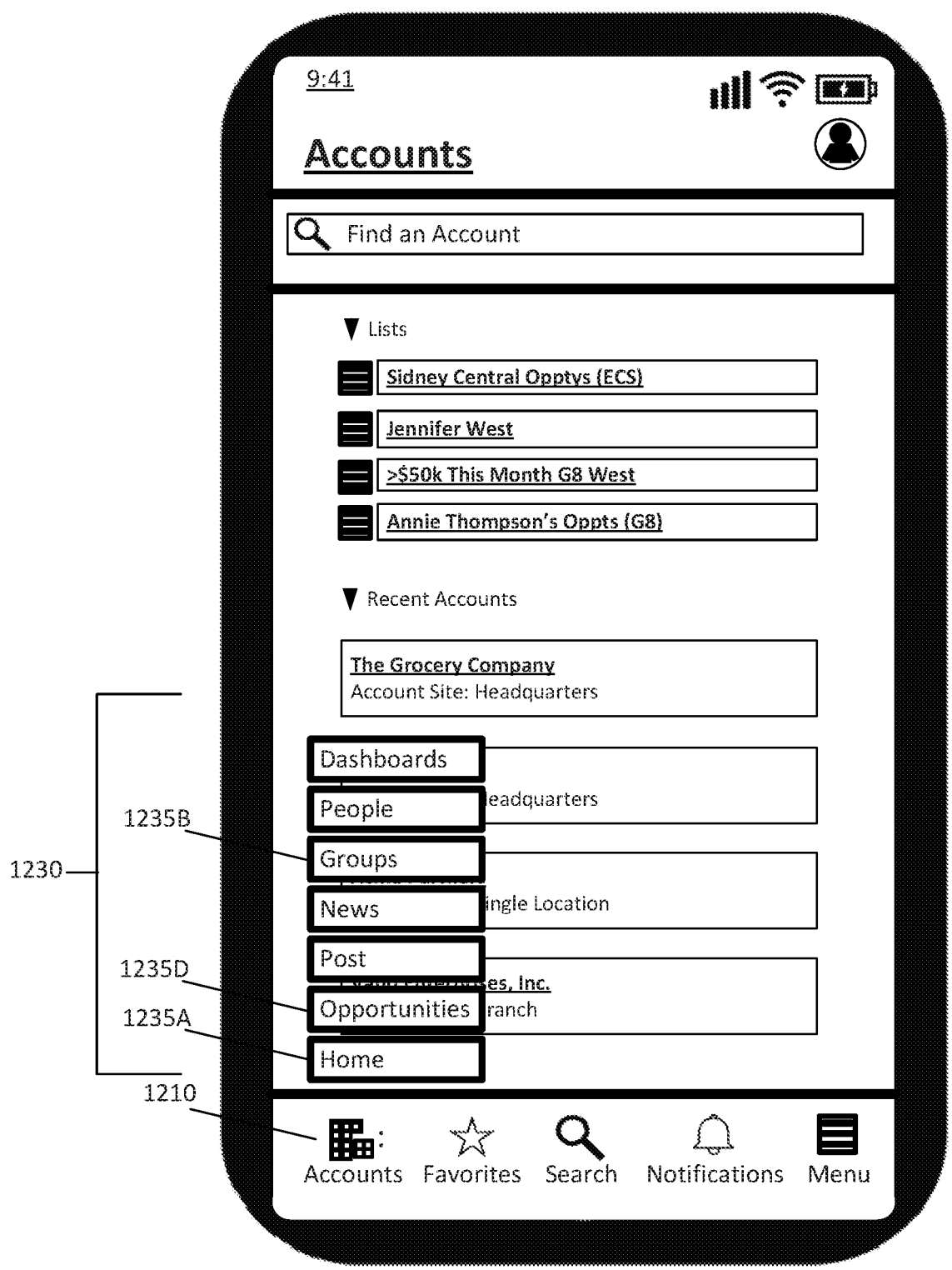
FIG. 12C depicts a block diagram of a GUI displaying mobile object movement, according to some embodiments.

FIG. 12C depicts a block diagram of a GUI 1200C displaying mobile object 1235 movement, according to some embodiments. In contrast with FIG. 10, navigation menu 1230 includes a different ordering of objects relative to navigation menu 1030. For example, the "Opportunities" object 1235D may be next to the "Home" object 1235A. This change may correspond to the arrangement of tab objects 1245 as depicted in FIG. 12B. Navigation menu 1230 may be invoked with a gesture using navigation button 1210.

The flow from FIG. 12A to FIG. 12C may illustrate the capability of unification system 110 to track object movement in the desktop device 150 environment and translate this movement to navigation menu 1230. This movement may preserve a particular desired ordering by the user and may be reflected on the user devices used by the user. In this manner, unification system 110 may preserve GUI object modifications in a two-way manner to allow for faster user navigation in both the desktop device 150 environment and mobile device 140 environment. Beyond the modification of application content, unification system 110 allow for a particular modification of GUI components in a customizable manner.

Similar to the flow described with reference to FIG. 12A to FIG. 12C, FIG. 12D-FIG. 12F may represent a flow adding an object to a list of objects.

Figure 12D:
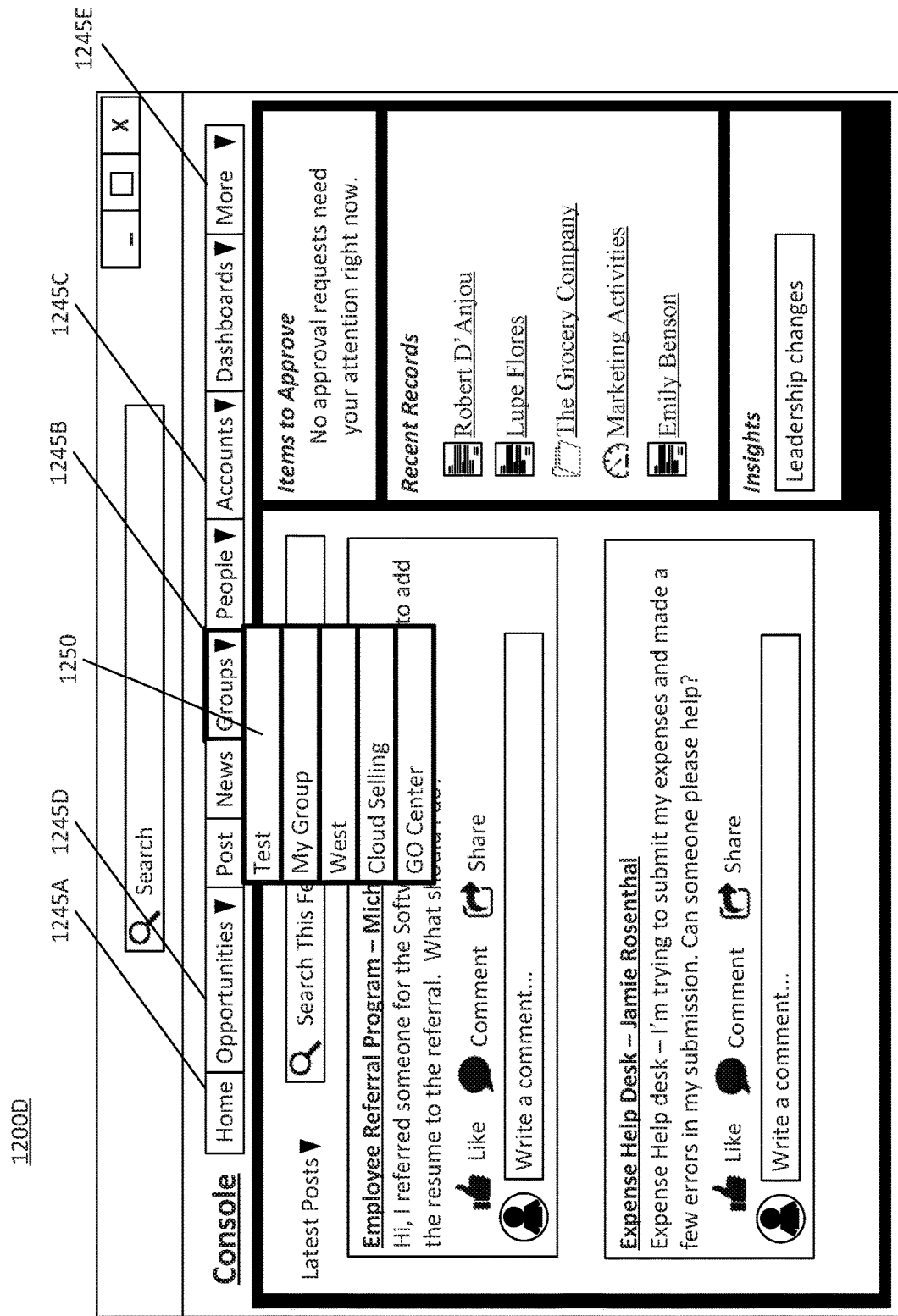
FIG. 12D depicts a block diagram of a GUI displaying a page including an expanded tab object, according to some embodiments.

FIG. 12D depicts a block diagram of a GUI 1200D displaying a page including an expanded tab object 1250, according to some embodiments. Similar to grouped and/or collapsed objects 240 as described with reference to FIG. 2C, GUI 1200D may include an expanded tab object 1250 among tab objects 1245. Expanded tab object 1250 may represent a grouped object that is now visible due to expansion of the particular tab object 1245. In an embodiment, a user may wish to remove expanded tab object 1250 from the group and use expanded tab object 1250 as a standalone object similar to tab object 1245. In this manner, a user may drag-and-drop expanded tab object 1250 into the list of tab objects 1245.

FIG. 12E depicts a block diagram of a GUI 1200E displaying a page including an added tab object 1250, according to some embodiments. In response to the drag-and-drop interaction, unification system 110 may identify that added tab object 1250 has now been added to the list of tab objects 1245. Unification system 110 may adjust and/or resize the GUI portions representing the objects to provide spacing on GUI 1200E. In the new location, a user may interact with added tab object 1250 to reach the corresponding object home page. Similarly, unification system 110 may save this configuration in the single page definition to reproduce this ordering on a mobile GUI.

Figure 12F:
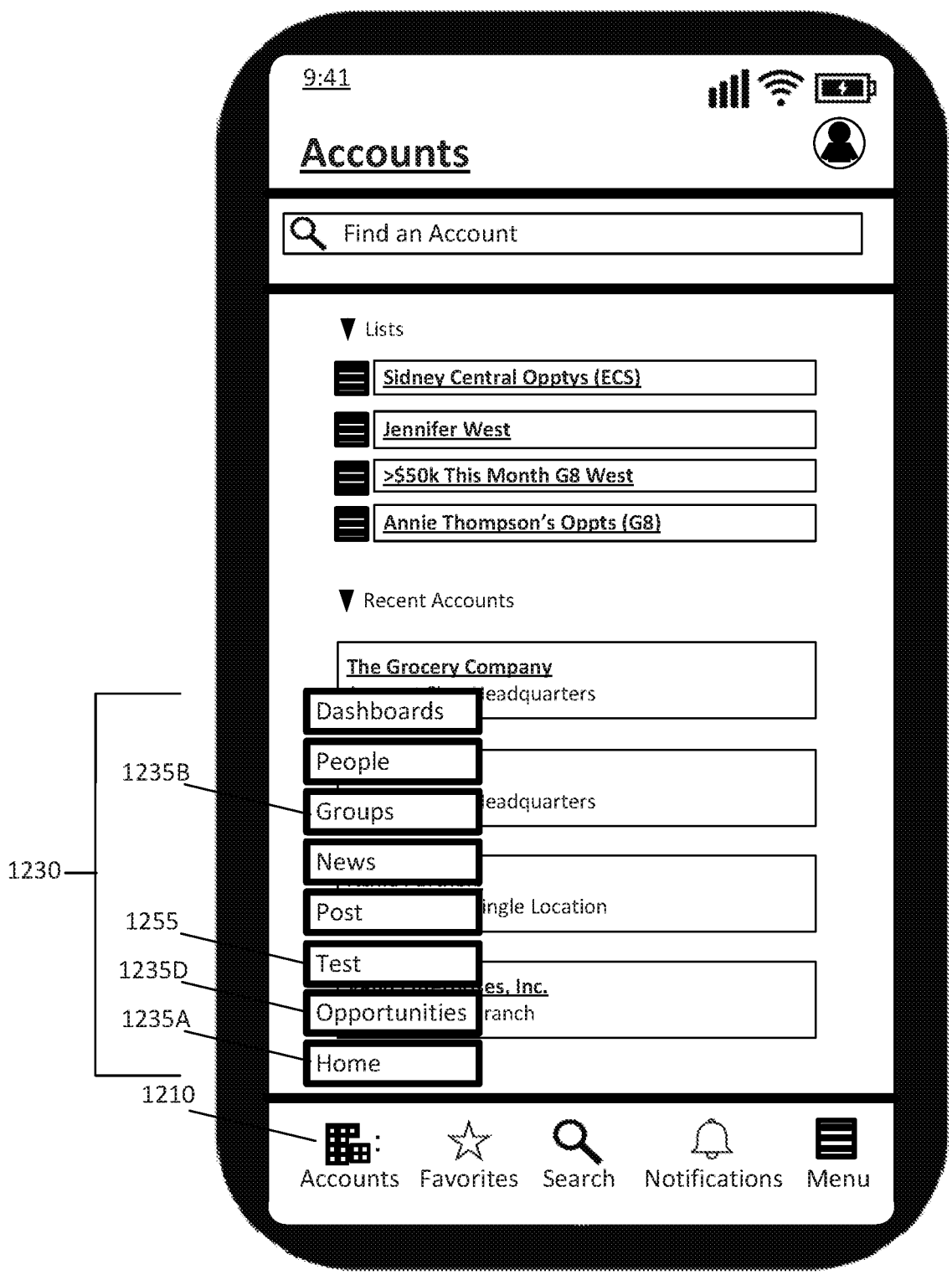
FIG. 12F depicts a block diagram of a GUI displaying an added mobile object, according to some embodiments.

FIG. 12F depicts a block diagram of a GUI 1200F displaying an added mobile object 1255, according to some embodiments. As seen in GUI 1200F, added mobile object 1255 may appear in navigation menu 1230. The ordering of navigation menu 1230 may also correspond to the ordering of tab objects 1245 with the added tab object 1250 on the desktop GUI. In this manner, unification system 110 may reproduce modified GUI views where modifications to objects have been detected from desktop device 150. Unification system 110 may modify GUIs displayed on mobile device 140 to include these GUI modifications.

While these descriptions have described the initial modification on desktop device 150, in an embodiment, the modification may be performed on mobile device 140. Unification system 110 may the translate this modification to desktop device 150 GUIs.

Additionally, unification system 110 may also apply similar techniques when an object is removed from a list. A removal of an object may not delete the underlying application data but may remove the object from a particular GUI view. If an object is removed from a list on desktop device 150, for example, unification system 110 may remove the object from the list on mobile device 140 and vice versa.

An additional aspect of this GUI modification includes the combination of administrator and user customization versus personalization. An administrator using administrator device 120 may identify particular applications accessible to a user. In an embodiment, the administrator may also specify the GUI components accessible to a user using, for example, an application builder. Layered within an administrator's customization controls, a user may personalize their own view of a desktop GUI or mobile GUI. As previously discussed, the user controls may include moving, adding, and/or removing objects. Further, a user may personalize different elements within GUI components. In this manner, unification system 110 may support both administrator and user customizations simultaneously. Using a single page definition, these configurations may be stored and/or retrieved to instantiate one or more GUIs for the user when an application is accessed on mobile device 140 and/or desktop device 150.

Figure 13:
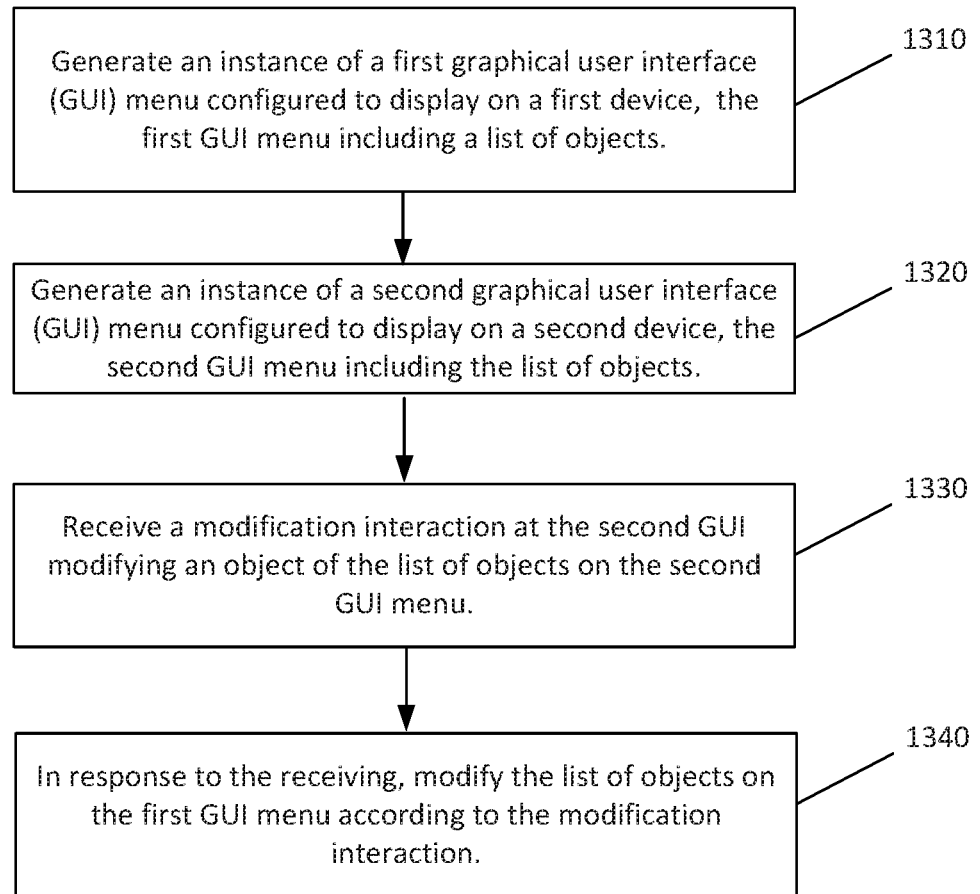
FIG. 13 depicts a flowchart illustrating a method for modifying a navigation menu, according to some embodiments.

FIG. 13 depicts a flowchart illustrating a method 1300 for modifying a navigation menu, according to some embodiments. Method 1300 shall be described with reference to FIG. 1; however, method 1300 is not limited to that example embodiment.

In an embodiment, unification system 110 may utilize method 1300 to modify a navigation menu such as navigation menu 1230. The foregoing description will describe an embodiment of the execution of method 1300 with respect to GUIs 1200A-1200F, but may be applicable to any GUIs including a navigation menu. While method 1300 is described with reference to unification system 110, method 1300 may be executed on any computing device, such as, for example, the computer system described with reference to FIG. 18 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 13, as will be understood by a person of ordinary skill in the art.

In an embodiment, at 1310, unification system 110 may generate an instance of a first GUI menu configured to display on a first device, the first GUI menu including a list of objects. The first GUI menu may be, for example, navigation menu 1230. Navigation menu 1230 may be displayed on a first device such as mobile device 140. The list of objects may be objects 1235. Using the objects, a user may navigate to different object home pages.

At 1320, unification system 110 may generate an instance of a second GUI menu configured to display on a second device, the second GUI menu including the list of objects. The second GUI menu may be, for example, the list of tab objects 1245. The list of tab objects 1245 may be displayed on a second device such as desktop device 150. Similar to the mobile scenario, a user may navigate to different object homes using tab objects 1245.

At 1330, unification system 110 may receive a modification interaction at the second GUI modifying an object of the list of objects on the second GUI menu. For example, a user at desktop device 150 may modify the list of tab objects 145. The user may change the ordering, add an object, and/or remove an object. In this case, unification system 110 may receive the modification interaction from desktop device 150. Unification system 110 may store this modification as an update to a single record representing the page.

At 1340, in response to the receiving, unification system 110 may modify the list of objects on the first GUI menu according to the modification interaction. Unification system 110 may access the record and transmit a command to mobile device 140 to modify navigation menu 1230 according to the change detected from desktop device 150. For example, unification system 110 may change the ordering of the objects 1235, remove an object 1235, and/or add an object 1235. In this case, unification system 110 may modify the list of objects so that the customization choices are preserved among the different GUIs. Unification system 110 may automatically perform method 1300 in response to detecting a modification at mobile device 140 and/or desktop device 150.

While the first device has been described as mobile device 140 and the second device has been described as desktop device 150, these could also be reversed. In an embodiment, the devices may also be other devices and/or software applications such as a tablet or Internet browsers. For example, a user could use two windows on a computer to access the application. Modifying the list of objects in a first window may result in the modification of the list of objects in the second window.

Cursor Gesture Control

As will be further described below with respect to FIG. 14A-FIG. 15, unification system 110 may also generate a cursor on a GUI display. This cursor may allow a user to manipulate a portion of the GUI without directly interacting with the portion. For example, if the GUI is displayed on mobile device 140, the user may press on the bottom half of the GUI to cause a cursor to appear on the top portion. In this manner, unification system 110 may instantiate a mobile GUI that includes accessibility elements and allows a user to access the top portion of a GUI while controlling the bottom portion of the GUI. The GUI content and/or program elements may be sourced from unification system 110. Mobile device 140 may then execute these program elements to display the corresponding GUI and/or cursor controls. In this manner, the cursor controls described herein may be applied to any program executing on a computing device and displaying a GUI.

Figure 14A:
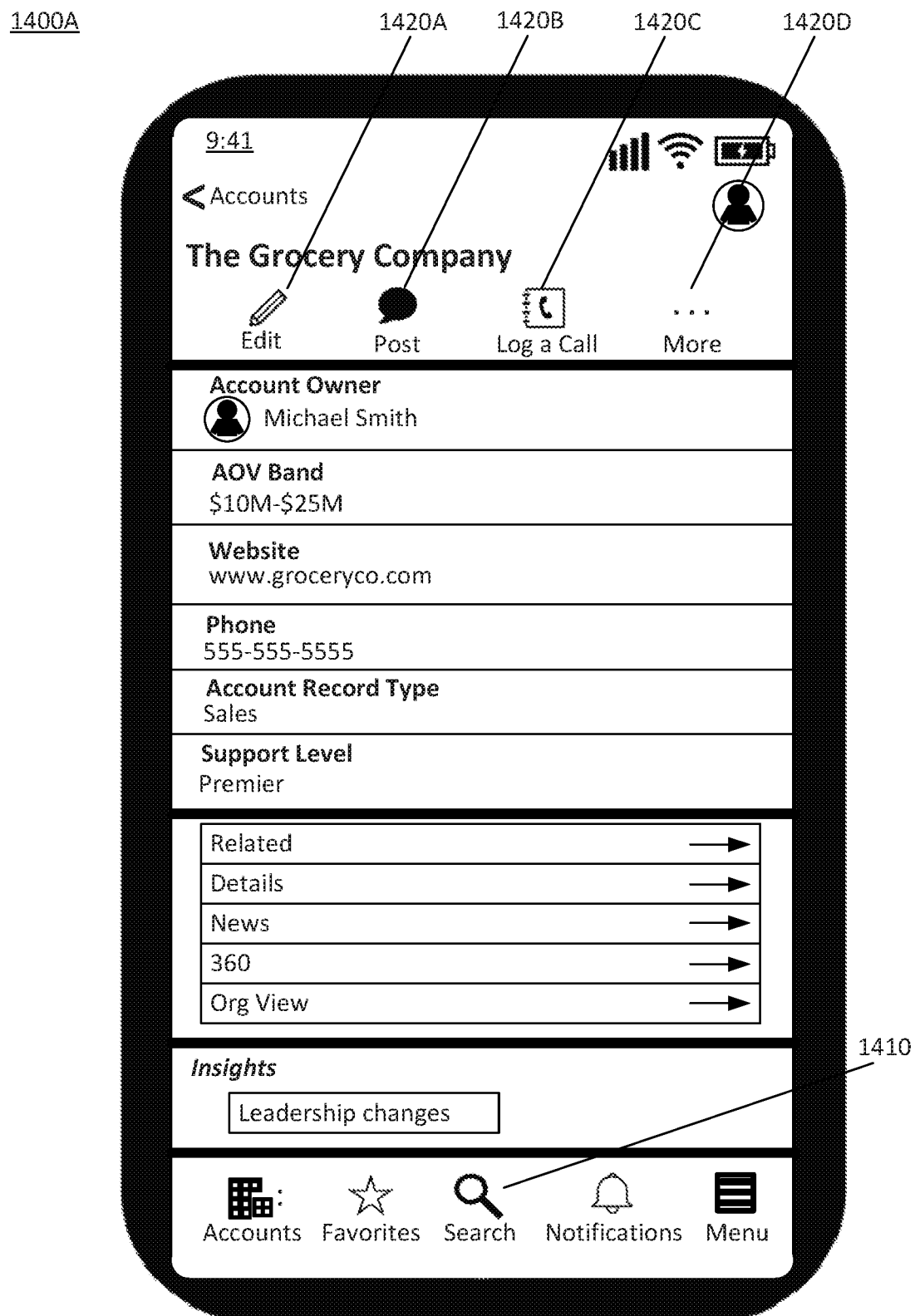
FIG. 14A depicts a block diagram of a GUI displaying a mobile page including a cursor button, according to some embodiments.

FIG. 14A depicts a block diagram of a GUI 1400A displaying a mobile page including a cursor button 1410, according to some embodiments. Cursor button 1410 occupy a space on GUI 1400A that allows a user to generate a cursor on a separate portion of GUI 1400A. In an embodiment, cursor button 1410 may occupy the same space as another button. For example, cursor button 1410 may occupy the same space as search button 314. While cursor button 1410 may occupy the same space as search button 314, accessing cursor button 1410 involve using a different gesture relative to accessing search button 314.

In an embodiment, using search button 314 may involve a short press while using cursor button 1410 may involve a long press. If GUI 1400A is displayed on mobile device 140, mobile device 140 may determine the type of interaction detected based on a timing of the press. Further, while cursor button 1410 may be depicted as occupy the space of search button 314, cursor button 1410 may occupy other spaces on GUI 1400A and invoking the particular interaction (e.g., a long press) may initialize a cursor button 1410 command.

In addition to cursor button 1410, GUI 1400A may include action buttons 1420. Action buttons 1420 may be similar to action buttons 390 described with reference to FIG. 3C. As will be explained below, using cursor button 1410 may allow a user to select action buttons 1420 from across the display screen. A user interacting with cursor button 1410 may generate a cursor that may be scrubbed across the screen to select a desired action button 1420.

Figure 14B:
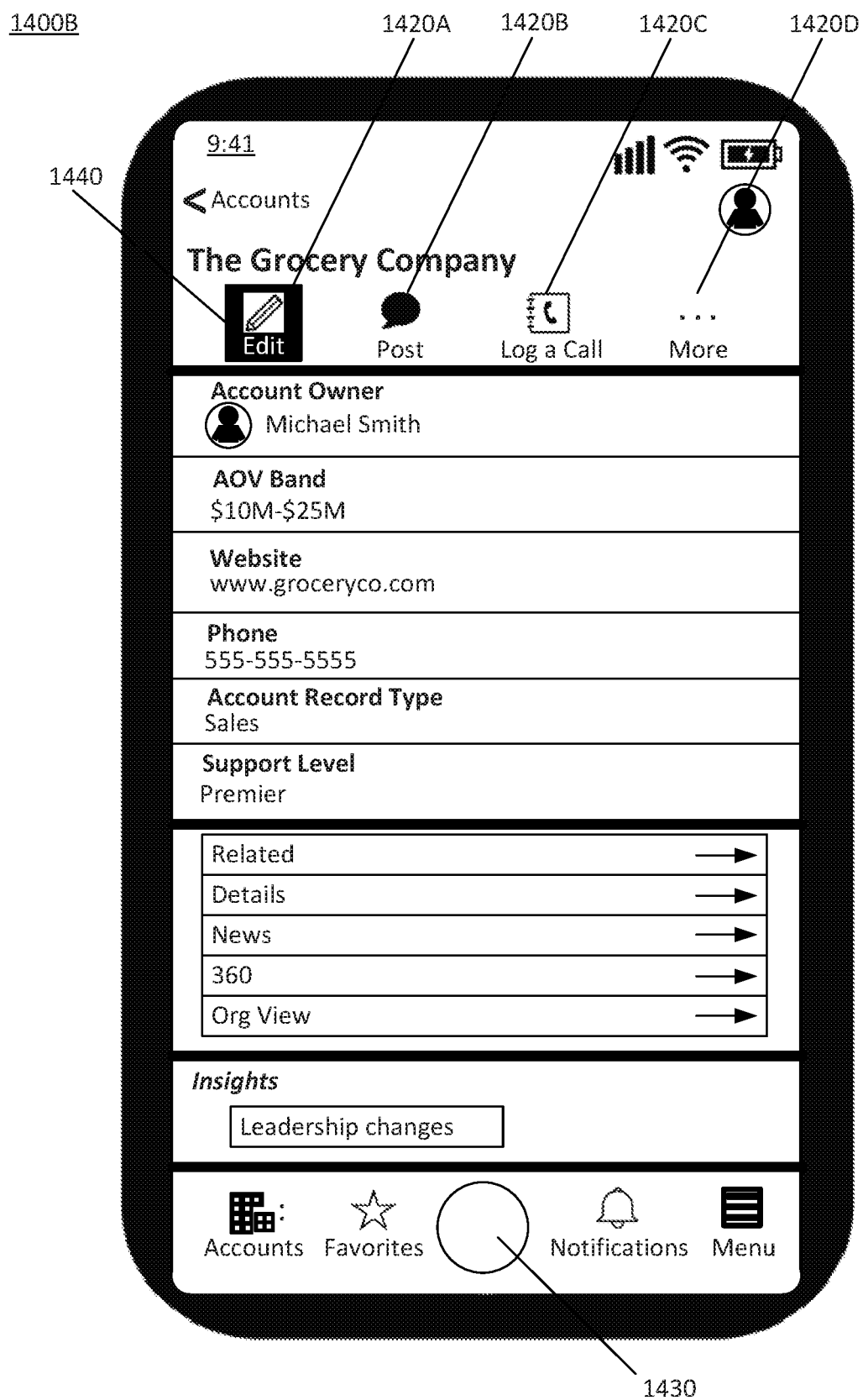
FIG. 14B depicts a block diagram of a GUI displaying a mobile page including a visible cursor, according to some embodiments.

FIG. 14B depicts a block diagram of a GUI 1400B displaying a mobile page including a visible cursor 1440, according to some embodiments. To reveal cursor 1440, a user may invoke cursor button 1410 using interaction 1430. For example, interaction 1430 may be a long press on cursor button 1410, a double tap, drawing a shape, and/or other interactions. In response to detecting the long press, mobile device 140 may display a cursor 1440. Unification system 110 may generate the mobile GUI but may allow mobile device 140 to manage the processing for the cursor button interaction.

Figure 14C:
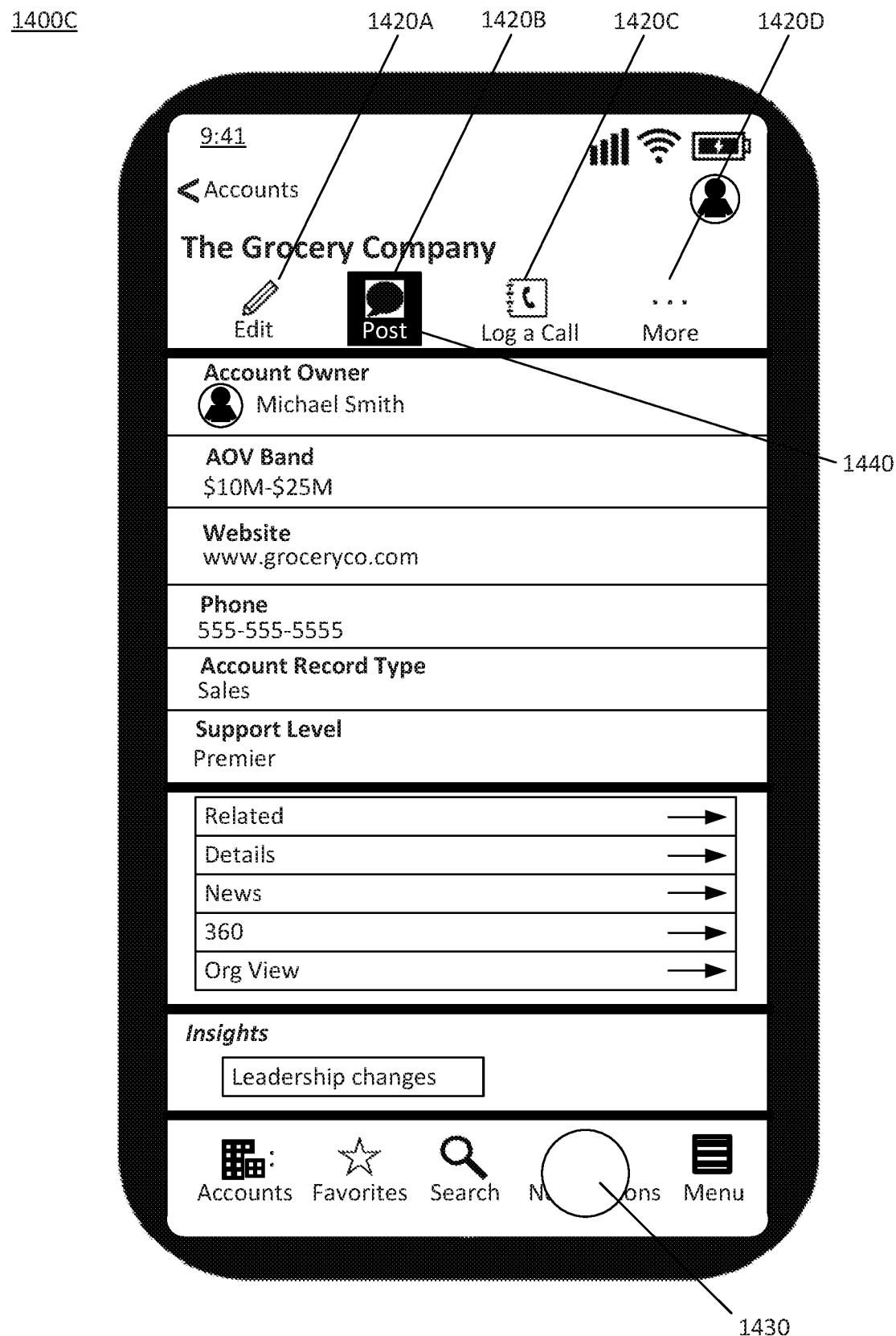
FIG. 14C depicts a block diagram of a GUI displaying a mobile page including cursor movement, according to some embodiments.

After displaying cursor 1440, a user may scrub along the bottom of the screen to move cursor 1440. For example, this motion may be seen in FIG. 14C. FIG. 14C depicts a block diagram of a GUI 1400C displaying a mobile page including cursor 1440 movement, according to some embodiments. As seen when moving from GUI 1400B to GUI 1400C, when a user moves interaction 1430 to the right, cursor 1440 may also move to the right. Cursor 1440 may move from selecting action button 1420A to selecting action button 1420B. The user may also move interaction 1430 left to move cursor 1440 to the left.

In an embodiment, this movement may correspond to a long press. That is, the user may continuously tap or hold onto the display screen to generate interaction 1430. As the user moves interaction 1430, the user may continue to press the display screen. The user may move interaction 1430 to the left or right to move cursor 1440 to the left or right respectively. Further, this interaction may reveal other action buttons 1420 such as action buttons hidden under action button 1420D. This scrolling movement for cursor 1440 may allow for increase accessibility. A user holding mobile device 140 may interact with the bottom portion of the screen while controlling actions on the top of the screen. This divided aspect of GUI manipulation may allow a user to, for example, use one hand to navigate the GUI. This navigation may increase comfort in navigation.

After generating cursor 1440, to select an application button, the user may release interaction 1430 and/or discontinue interaction 1430. For example, if interaction 1430 is a long press, releasing the press may indicate a selection of the action button 1420 currently highlighted by cursor 1440. Mobile device 140 may then generate the corresponding GUI for the selection and/or send a request to unification system 110 to instantiate the requested GUI. This selection may execute the action or action button 1420 corresponding to the cursor 1440.

As previously discussed, interaction 1430 may appear on different portions of GUI 1400B. For example, rather than pressing search button 314, cursor button 1410 may be represented by portions of the screen or GUI. For example, cursor button 1410 may be defined as the bottom half or bottom third of the screen. When mobile device 140 detects interaction 1430 that invokes cursor button 1410, mobile device 140 may display cursor 1440.

Similarly, cursor 1440 may be an object that moves in response to a movement of interaction 1430. In an embodiment, this movement may be one-directional. For example, as interaction 1430 moves left or right, cursor 1440 may also move left or right. Cursor 1440 may move along a specified track and/or may stick to icons displayed on GUI 1400B or GUI 1400C. In an embodiment, cursor 1440 may not follow a specified track and may be movable to an arbitrary location.

In some embodiments, cursor 1440 may be moved in a two-dimensional location. This movement may resemble a mouse cursor movement. Interaction 1430 may command cursor 1440 to move to different portions of the GUI and/or to interact with different GUI elements. This movement may also provide beneficial accessibility options for a user to navigate on a GUI.

Figure 15:
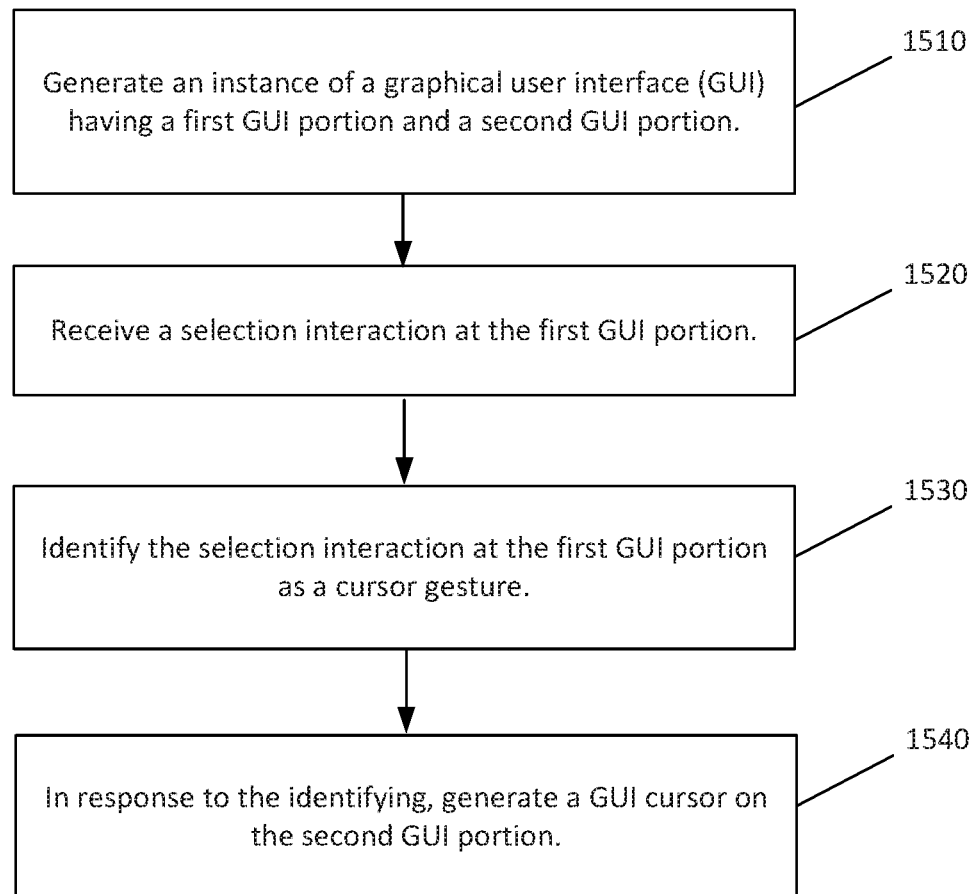
FIG. 15 depicts a flowchart illustrating a method for generating a cursor, according to some embodiments.

FIG. 15 depicts a flowchart illustrating a method 1500 for generating a cursor 1440, according to some embodiments. Method 1500 shall be described with reference to FIG. 1; however, method 1500 is not limited to that example embodiment.

In an embodiment, unification system 110 and/or mobile device 140 may utilize method 1500 to generate a GUI cursor 1440. The foregoing description will describe an embodiment of the execution of method 1500 with respect to GUIs 1400A-1400C, but may be applicable to any GUIs including cursors. While method 1500 is described with reference to unification system 110 and/or mobile device 140, method 1500 may be executed on any computing device, such as, for example, the computer system described with reference to FIG. 18 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 15, as will be understood by a person of ordinary skill in the art.

In an embodiment, at 1510, unification system 110 and/or mobile device 140 may generate an instance of a GUI having a first GUI portion and a second GUI portion. Unification system 110 may supply a command to mobile device 140 to instantiate a particular GUI. Mobile device 140 may then display the instantiated GUI on a display screen. Mobile device 140 may display, for example GUI 1400A. GUI 1400A may include a first GUI portion representing action buttons 1420 and/or a second GUI portion representing cursor button 1410.

At 1520, mobile device 140 may receive a selection interaction 1430 at the first GUI portion. At 1530, mobile device 140 may identify the selection interaction at the first GUI portion as a cursor 1440 gesture. The selection interaction 1430 may be a particular interaction invoking cursor button 1410. For example, the interaction 1430 may be a long press, or a double tap, or a particular shape drawn.

Based on programmed logic provide by unification system 110 and/or locally stored in mobile device 140, mobile device 140 may determine the selection interaction.

At 1540, in response to identifying the selection interaction 1430, mobile device 140 may generate a GUI cursor 1440 on the second GUI portion. As described above, this GUI cursor 1440 may allow a user to interact with the first GUI portion to provide controls to a second GUI portions. The user may use a scrubbing or scrolling motion to move the cursor to select different GUI buttons, such as, for example, action buttons 1420. Releasing interaction 1430 may indicate a user selection of an action button 1420 or an element of the second GUI portion. Based on the selection, mobile device 140 may transmit the selection to unification system 110 for processing and/or may handle the processing locally.

Application Framework and Application Selection

As will be further described below with respect to FIG. 16A-FIG. 17, unification system 110 may also facilitate switching between different applications and providing updated GUIs depending on the selected application. In this manner, unification system 110 may provide a framework to implement different applications and application types while maintaining a unification of the GUIs instantiated on mobile device 140 and desktop device 150. Unification system may also load different applications developed by different parties and maintain a consistent layout for each application.

Figure 16A:
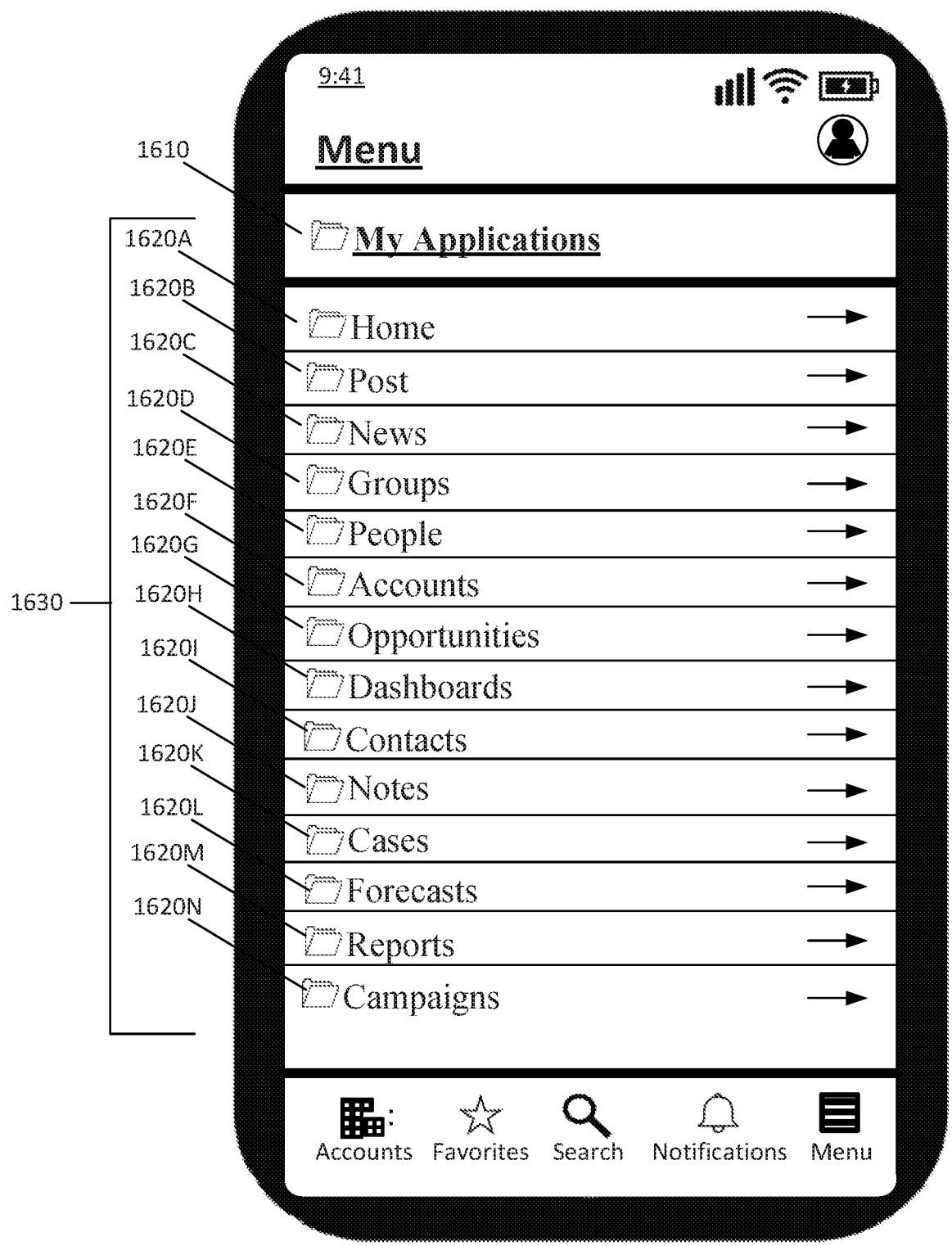
FIG. 16A depicts a block diagram of a GUI displaying a mobile application menu page, according to some embodiments.
Figure 16B:
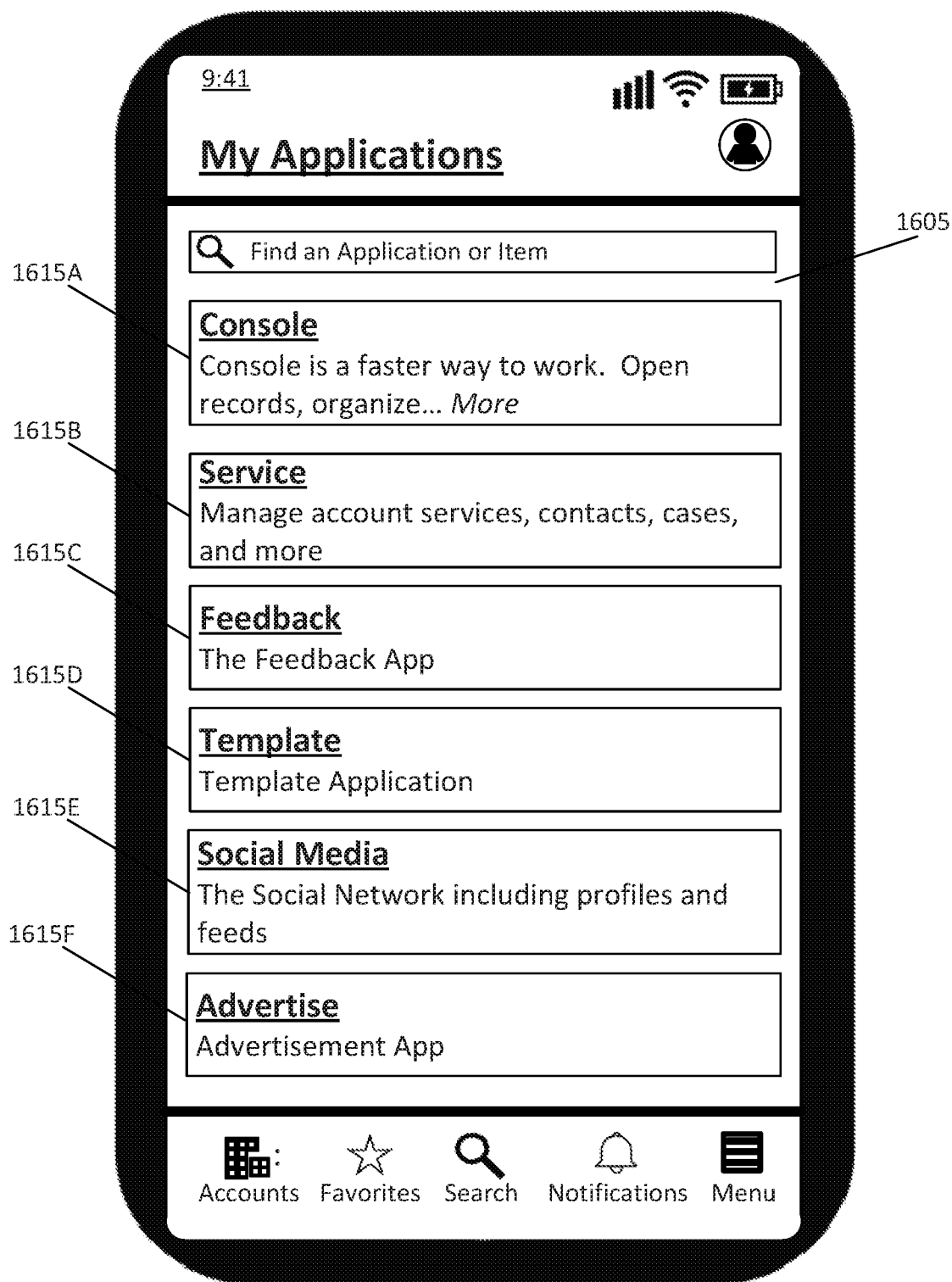
FIG. 16B depicts a block diagram of a GUI displaying a mobile application selection page, according to some embodiments.

FIG. 16A depicts a block diagram of a GUI 1600A displaying a mobile application menu page, according to some embodiments. GUI 1600A may be similar to GUI 300A as depicted in FIG. 3A. GUI 1600A may be instantiated by unification system 110 and/or may be displayed on mobile device 140.

GUI 1600A may depict a menu page displaying objects 1620 of a particular application. A user may access the menu page by selecting, for example, menu button 318 as described with reference to FIG. 3A. GUI 1600A may include application menu button 1610 which may be similar to application menu button 315. Interacting with application menu button 1610 may allow a user to select a different application. Interaction with objects 1620 may allow a user to view pages corresponding to the objects 1620. GUI 1600A may present objects 1620 as a list 1630 for ease of navigation. As described earlier with respect to FIG. 10, the GUI may include a navigation button that may reveal a navigation menu 1030 corresponding to the listed objects 1620. In an embodiment, navigation menu 1030 may be an abbreviated version of list 1630 as seen on the menu page.

List 1630 and objects 1620 may correspond to the currently selected application. As will be described with respect to FIG. 16B and as previously described with respect to FIG. 2A, a user may select a different application. This selection may alter list 1630, objects 1620, and/or navigation menu 1030.

FIG. 16B depicts a block diagram of a GUI 1600B displaying a mobile application selection page 1605, according to some embodiments. Unification system 110 may instantiate GUI 1600B to be displayed on mobile device 140 in response to receiving a selection at application menu button 1610. Listed in application selection page 1605 may be applications buttons 1615. Applications buttons 1615 may be similar to application buttons 215 as described with reference to FIG. 2A. Selecting a particular application button 1615 may allow a user to select between different available applications. In an embodiment, GUI 1600A may have corresponded to application button 1615A. Selecting a different application button, such as application button 1615B, however, may result in a different menu page and/or different corresponding objects.

As seen from these selection objects, unification system 110 may support multiple applications for users to select and/or utilize. Unification system 110 may provide a framework for supporting GUI views for cloud computing platforms and/or the applications enabled for use. In an embodiment, the cloud computing platform may utilize standard supplied applications that may be pre-programed. The cloud computing platform may also allow users or administrators to create their own applications. In an embodiment, users may be able to download applications from a third party and/or may use an application marketplace or application exchange. Users may install these applications to be used with the cloud computing platform.

In this manner, unification system 110 may support different types of applications and create a cohesive GUI experience across a desktop device 150 environment and a mobile device 140 environment. The generation of this cohesive look-and-feel across different applications, application types, and/or different application sources may allow for better scalability and customization for administrators and/or users. In this manner unification system 110 may act as or be included into a framework or container for managing different applications.

Returning to GUI 1600B, a user may decide to select application button 1615B. The application corresponding to application button 1615B may differ in type and/or source from the previously viewed application corresponding to application button 1615A. In response to the selection, mobile device 140 may transmit an indication of the selection to unification system 110. Unification system 110 may then instantiate a corresponding GUI such as GUI 1600C.

Figure 16C:
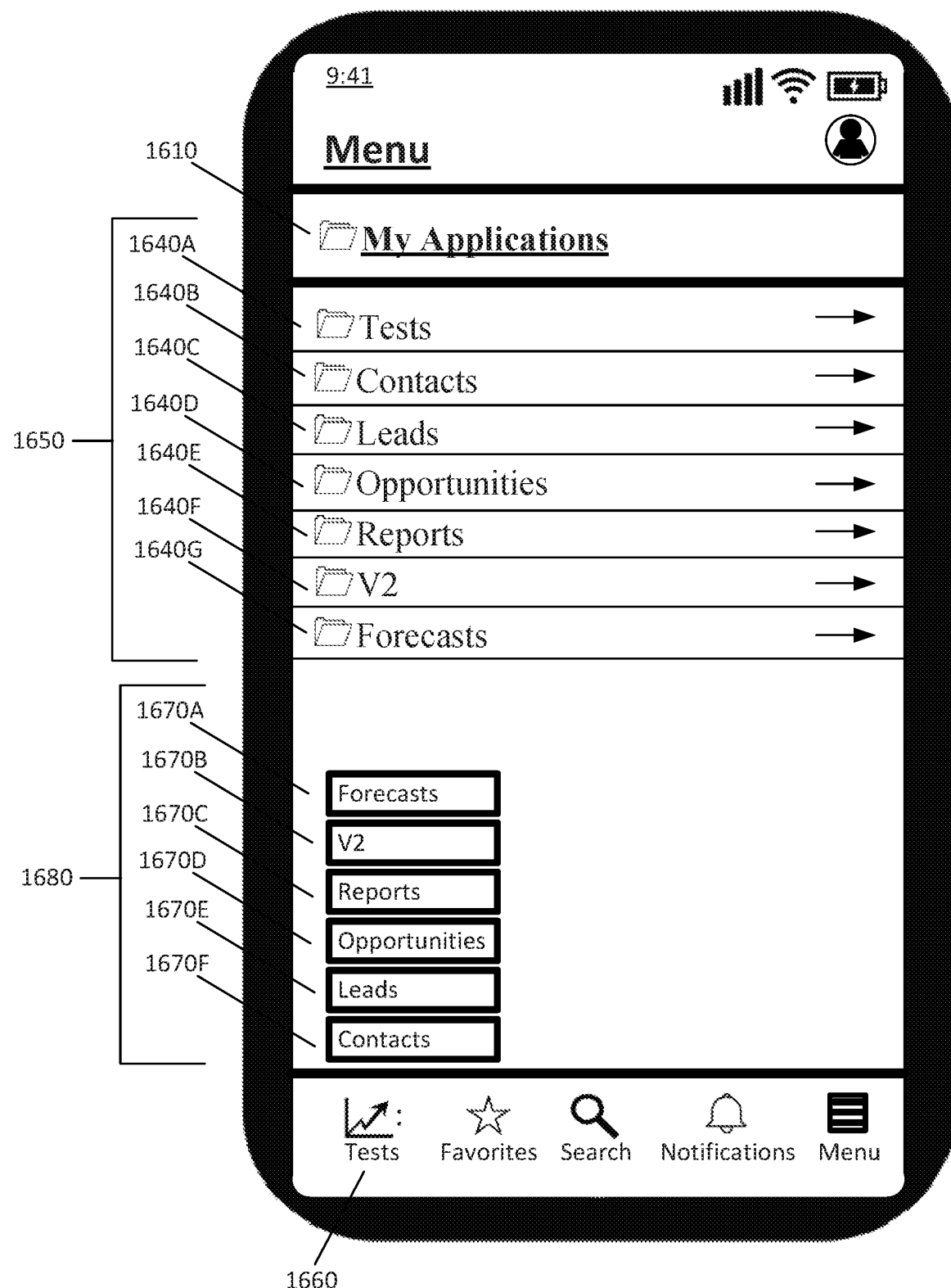
FIG. 16C depicts a block diagram of a GUI displaying an updated mobile application menu page, according to some embodiments.

FIG. 16C depicts a block diagram of a GUI 1600C displaying an updated mobile application menu page, according to some embodiments. This selection may change the available objects as well as navigation menu based on the correspondence with the application.

GUI 1600C may include application menu button 1610 similar to GUI 1600A. Interacting with application menu button 1610 may instantiate GUI 1600B and allow the user to select another application button 1615.

Because the user has selected another application, unification system 110 may instantiate the other application and provide updated objects 1640, an updated list 1650, an updated navigation menu 1680, an updated navigation button 1660, and/or updated navigation objects 1670. These updated components may be similar in function to the past objects and navigation elements; however, the updated versions may correspond to the newly selected application and application button 1615.

For example, list 1650 and objects 1640 may represent the objects of the newly selected application. In response to the selection, mobile device 140 may now support the newly selected application and allow the user to interact with the corresponding objects 1640.

Similarly, navigation menu 1680 has been updated to include navigation objects 1670 corresponding to objects 1640. Navigation menu 1680 may be updated even if it is collapsible. In this manner, when a user interacts with navigation button 1660 to reveal navigation menu 1680, the user may select from navigation objects 1670 to navigate to different portions of the newly selected application. The newly selected application corresponding to application button 1615B may include its own set of data records and/or executable programs that may differ from the application corresponding to application button 1615A. Unification system 110, however, may be able to allow a user to switch between these applications on mobile device 140 and/or on desktop device 150. In this manner, unification system 110 may act as a framework or contain and may support different applications while maintaining a look-and-feel that may be similar across the different applications.

Figure 17:
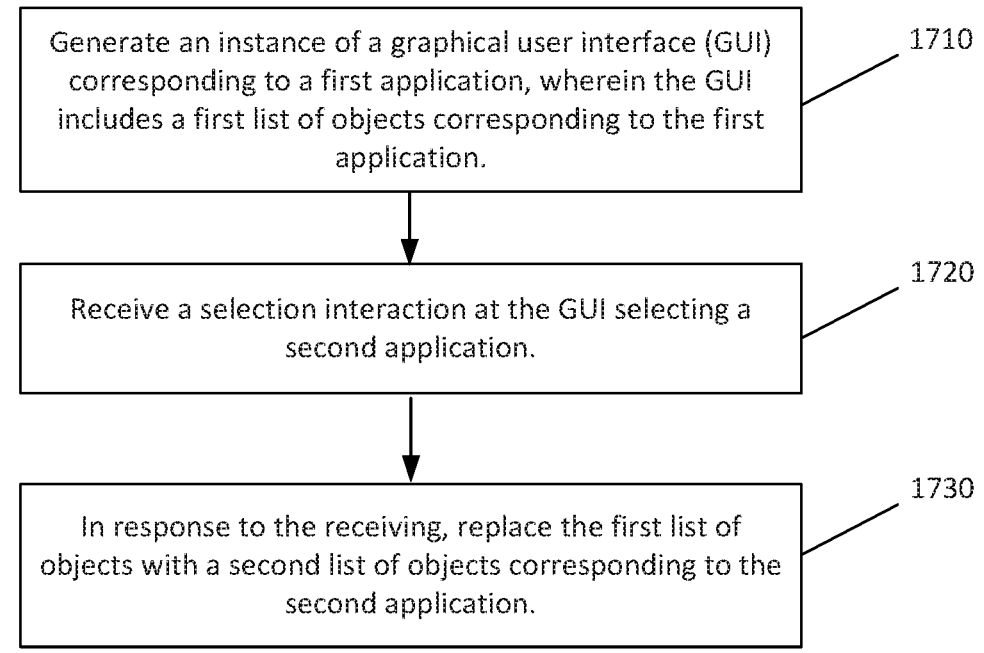
FIG. 17 depicts a flowchart illustrating a method for replacing a list of objects corresponding to an application, according to some embodiments.

FIG. 17 depicts a flowchart illustrating a method 1700 for replacing a list of objects corresponding to an application, according to some embodiments. Method 1700 shall be described with reference to FIG. 1; however, method 1700 is not limited to that example embodiment.

In an embodiment, unification system 110 may utilize method 1700 to update and/or replace a list of objects based on a selected application. The foregoing description will describe an embodiment of the execution of method 1700 with respect to GUIs 1600A-1600C, but may be applicable to any GUIs supporting multiple applications. While method 1700 is described with reference to unification system 110, method 1700 may be executed on any computing device, such as, for example, the computer system described with reference to FIG. 18 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 17, as will be understood by a person of ordinary skill in the art.

In an embodiment, at 1710, unification system 110 may generate an instance of a GUI corresponding to a first application, wherein the GUI includes a first list of objects corresponding to the first application. For example, unification system 110 may generate GUI 1600A with list 1630 of objects 1620. Objects 1620 may correspond to a particular application. While the application is selected, a user may interact with the application through various objects and/or GUI components. These interactions may manipulate records, programs, and/or commands corresponding to the application.

At 1720, unification system 110 may receive a selection interaction at the GUI selecting a second application. For example, mobile device 140 may display GUI 1600A and/or application menu button 1610. A user may select application menu button 1610. Mobile device 140 may transmit this selection to unification system 110. In response, unification system 110 may transmit a list of available applications and/or instantiate available application buttons 1615 as displayed in GUI 1600B. A user may then select an application button 1615 from selection page 1605. Mobile device 140 may process this selection and may transmit an indication of this selection to unification system 110.

At 1730, in response to receiving the selection interaction, unification system 110 may replace the first list of objects with a second list of objects corresponding to the second application. Unification system 110 may, for example, instantiate GUI 1600C. Unification system 110 may replace list 1630 with list 1650. Similarly, unification system 110 may replace objects 1620 with objects 1640. Unification system 110 may also modify the navigation menu to include an updated navigation menu 1680 with updated navigation objects 1670 and navigation button 1660. Using this GUI, a user may navigate and/or interact with different applications as supplied in the framework managed by unification system 110.

While FIG. 16A-FIG. 17 has described the different application options for mobile device 140, unification sys-tem 110 may also maintain these different applications for desktop device 150. As discussed above, modifications performed on desktop device 150 may be reproduced by unification system 110 on mobile device 140. In this manner, unification system 110 may manage different administrator customization parameters, different application customization parameters, and/or different user personalization parameters so that a particular look-and-feel may be reproduced across different user devices. In this manner, unification system 110 may aid in organizing a particular GUI layout for users for different user devices. Users may be able to more quickly navigate through different application objects and record pages using the framework and GUIs instantiated by unification system 110 across the multiple types of user devices.

Example Computer System

Figure 18:
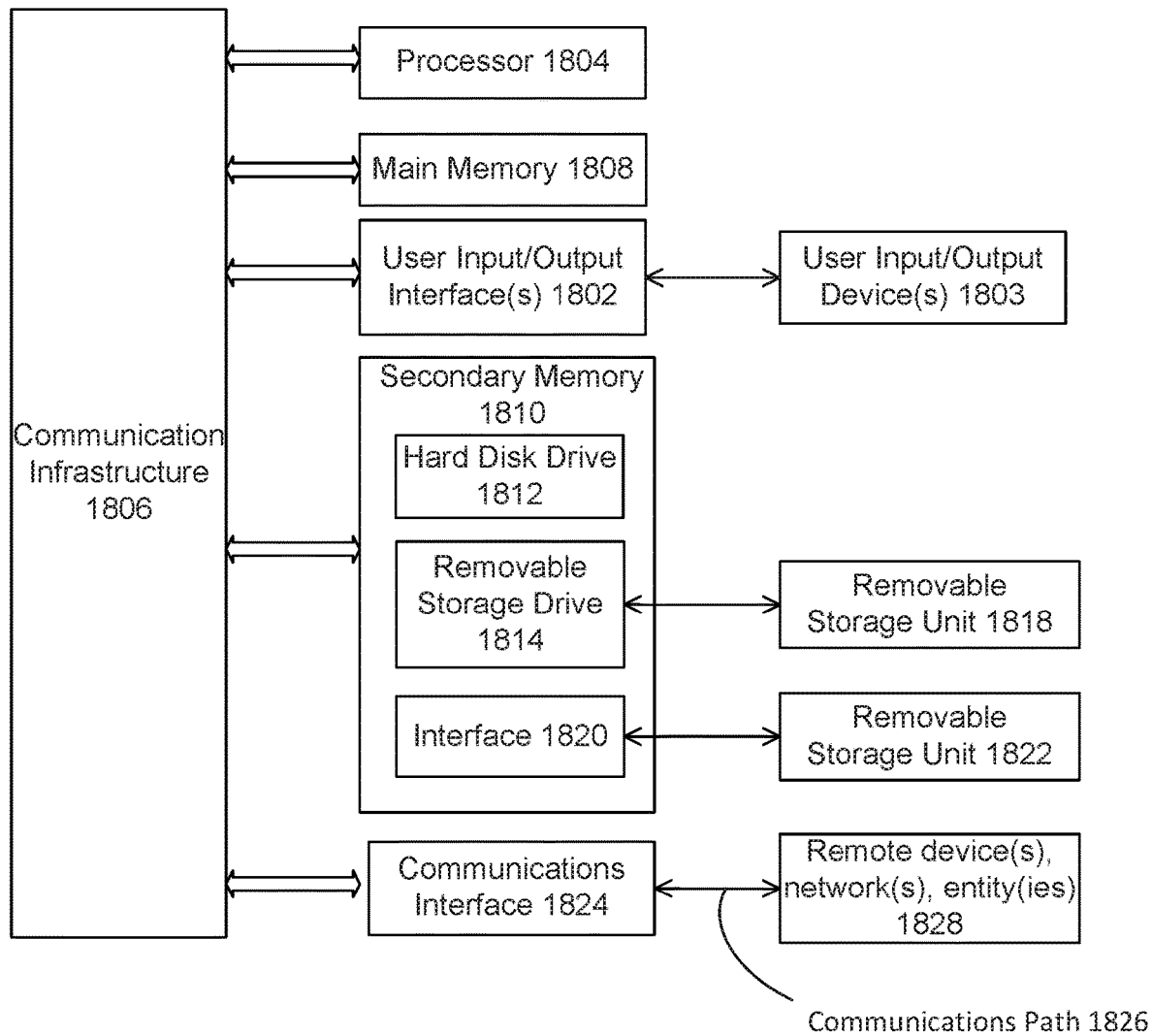
FIG. 18 depicts an example computer system useful for implementing various embodiments.

Various embodiments may be implemented, for example, using one or more well-known computer systems, such as computer system 1800 shown in FIG. 18. One or more computer systems 1800 may be used, for example, to implement any of the embodiments discussed herein, as well as combinations and sub-combinations thereof.

Computer system 1800 may include one or more processors (also called central processing units, or CPUs), such as a processor 1804. Processor 1804 may be connected to a communication infrastructure or bus 1806.

Computer system 1800 may also include user input/output device(s) 1803, such as monitors, keyboards, pointing devices, etc., which may communicate with communication infrastructure 1806 through user input/output interface(s) 1802.

One or more of processors 1804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1800 may also include a main or primary memory 1808, such as random access memory (RAM). Main memory 1808 may include one or more levels of cache. Main memory 1808 may have stored therein control logic (i.e., computer software) and/or data.

Computer system 1800 may also include one or more secondary storage devices or memory 1810. Secondary memory 1810 may include, for example, a hard disk drive 1812 and/or a removable storage device or drive 1814. Removable storage drive 1814 may be a floppy disk drive, a magnetic tape drive, a compact disk drive, an optical storage device, tape backup device, and/or any other storage device/drive.

Removable storage drive 1814 may interact with a removable storage unit 1818. Removable storage unit 1818 may include a computer usable or readable storage device having stored thereon computer software (control logic) and/or data. Removable storage unit 1818 may be a floppy disk, magnetic tape, compact disk, DVD, optical storage disk, and/any other computer data storage device. Removable storage drive 1814 may read from and/or write to removable storage unit 1818.

Secondary memory 1810 may include other means, devices, components, instrumentalities or other approaches for allowing computer programs and/or other instructions and/or data to be accessed by computer system 1800. Such means, devices, components, instrumentalities or other approaches may include, for example, a removable storage unit 1822 and an interface 1820. Examples of the removable storage unit 1822 and the interface 1820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1800 may further include a communication or network interface 1824. Communication interface 1824 may enable computer system 1800 to communicate and interact with any combination of external devices, external networks, external entities, etc. (individually and collectively referenced by reference number 1828). For example, communication interface 1824 may allow computer system 1800 to communicate with external or remote devices 1828 over communications path 1826, which may be wired and/or wireless (or a combination thereof), and which may include any combination of LANs, WANs, the Internet, etc. Control logic and/or data may be transmitted to and from computer system 1800 via communication path 1826.

Computer system 1800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 1800, main memory 1808, secondary memory 1810, and removable storage units 1818 and 1822, as well as tangible articles of manufacture embodying any combination of the foregoing. Such control logic, when executed by one or more data processing devices (such as computer system 1800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 18. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:
1. A computer-implemented method, comprising:
receiving, by a unification system executing on at least one processor, a first access request for an application page from a first device, wherein the application page is associated with a page definition specifying a plurality of objects and a display ordering for the plurality of objects;

generating, by the unification system, a first graphical user interface (GUI) configured to be displayed on the first device based on the page definition for the application page, the first GUI comprising:
- a first GUI menu including the plurality of objects in the display ordering; and
- a navigation menu button corresponding to an object home page,
- wherein the first GUI menu is a navigation menu configured to be displayed on the first device in response to a first type of interaction with the navigation menu button, and
- wherein the object home page is configured to be displayed on the first device in response to a second type of interaction with the navigation menu button;

receiving, by the unification system, a second access request for the application page from a second device;

generating, by the unification system, a second GUI configured to be displayed on the second device based on the page definition for the application page, the second GUI comprising a second GUI menu including the plurality of objects in the display ordering, wherein the first device and the second device have different screen sizes;

receiving, by the unification system, a modification interaction at the second GUI menu that rearranges the plurality of objects on the second GUI menu;

storing, by the unification system, an updated display ordering based on the modification interaction in the page definition for the application page; and transmitting, by the unification system and in response to receiving the modification interaction, a command configured to rearrange the plurality of objects on the first GUI menu according to the updated display ordering.

2. The computer-implemented method of claim 1, wherein the modification interaction also adds a new object to the plurality of objects on the second GUI menu, and wherein the command is further configured to add the new object to the plurality of objects on the first GUI menu.

3. The computer-implemented method of claim 1, wherein the plurality of objects is represented by one or more icons on the first GUI menu and the plurality of objects is represented by one or more tabs on the second GUI menu.

4. The computer-implemented method of claim 1, wherein the first type of interaction is a long press and the second type of interaction is a short press.

5. The computer-implemented method of claim 1, further comprising:
receiving a selection of an object from the navigation menu; and
in response to receiving the selection of the object from the navigation menu, replacing the navigation menu button with an icon representing the selected object from the first GUI menu and displaying a home page associated with the selected object on the first device.

6. A system, comprising:
a memory; and
at least one processor coupled to the memory and configured to:
receive a first access request for an application page from a first device, wherein the application page is associated with a page definition specifying a plurality of objects and a display ordering for the plurality of objects;

generate a first graphical user interface (GUI) configured to be displayed on the first device based on the page definition for the application page, the first GUI comprising:
- a first GUI menu including the plurality of objects in the display ordering; and
- a navigation menu button corresponding to an object home page,
- wherein the first GUI menu is a navigation menu configured to be displayed on the first device in response to a first type of interaction with the navigation menu button, and
- wherein the object home page is configured to be displayed on the first device in response to a second type of interaction with the navigation menu button;

receive a second access request for the application page from a second device;

generate a second GUI configured to be displayed on the second device based on the page definition for the application page, the second GUI comprising a second GUI menu including the plurality of objects in the display ordering, wherein the first device and the second device have different screen sizes;

receive a modification interaction at the second GUI menu modifying that rearranges the plurality of objects on the second GUI menu;

store an updated display ordering based on the modification interaction in the page definition for the application page; and transmit, in response to receiving the modification interaction, a command configured to rearrange the plurality of objects on the first GUI menu according to the updated display ordering.

7. The system of claim 6, wherein the modification interaction also adds a new object to the plurality of objects on the second GUI menu, and wherein the command is further configured to add the new object to the plurality of objects on the first GUI menu.

8. The system of claim 6, wherein the plurality of objects is represented by one or more icons on the first GUI menu and the plurality of objects is represented by one or more tabs on the second GUI menu.

9. The system of claim 6, wherein the first type of interaction is a long press and the second type of interaction is a short press.

10. The system of claim 6, wherein the at least one processor is further configured to:
receive a selection of an object from the navigation menu; and
in response to receiving the selection of the object from the navigation menu, replace the navigation menu button with an icon representing the selected object from the first GUI menu and display a home page associated with the selected object on the first device.

11. A non-transitory computer-readable device having instructions stored thereon that, when executed by at least one computing device, cause the at least one computing device to perform operations comprising:
receiving a first access request for an application page from a first device, wherein the application page is associated with a page definition specifying a plurality of objects and a display ordering for the plurality of objects;

generating a first graphical user interface (GUI) configured to be displayed on the first device based on the page definition for the application page, the first GUI comprising:
    a first GUI menu including the plurality of objects in the display ordering; and
    a navigation menu button corresponding to an object home page,
    wherein the first GUI menu is a navigation menu configured to be displayed on the first device in response to a first type of interaction with the navigation menu button, and
    wherein the object home page is configured to be displayed on the first device in response to a second type of interaction with the navigation menu button;

receiving a second access request for the application page from a second device;

generating a second GUI configured to be displayed on the second device based on the page definition for the application page, the second GUI comprising a second GUI menu including the plurality of objects in the display ordering, wherein the first device and the second device have different screen sizes;

receiving a modification interaction at the second GUI menu that rearranges the plurality of objects on the second GUI menu;

storing an updated display ordering based on the modification interaction in the page definition for the application page; and transmitting, in response to receiving the modification interaction, a command configured to rearrange the plurality of objects on the first GUI menu according to the updated display ordering.

12. The non-transitory computer-readable device of claim 11, wherein the modification interaction also adds a new object to the plurality of objects on the second GUI menu, and wherein the command is further configured to add the new object to the plurality of objects on the first GUI menu.

13. The non-transitory computer-readable device of claim 11, wherein the plurality of objects is represented by one or more icons on the first GUI menu and the plurality of objects is represented by one or more tabs on the second GUI menu.

14. The non-transitory computer-readable device of claim 11, wherein the first type of interaction is a long press and the second type of interaction is a short press.

15. The non-transitory computer-readable device of claim 11, wherein the operation further comprise:
    receiving a selection of an object from the navigation menu; and
    in response to receiving the selection of the object from the navigation menu, replacing the navigation menu button with an icon representing the selected object from the first GUI menu and displaying a home page associated with the selected object on the first device.

\* \* \* \* \*

UNITED STATES PATENT AND TRADEMARK OFFICE
CERTIFICATE OF CORRECTION

Page 1 of 1

PATENT NO. : 11,036,360 B2
APPLICATION NO. : 16/221093
DATED : June 15, 2021
INVENTOR(S) : Daniel McCall et al.

It is certified that error appears in the above-identified patent and that said Letters Patent is hereby corrected as shown below:

In the Claims

Claim 6, Column 38, Line 28, "menu modifying that rearranges the plurality of" should read --menu that rearranges the plurality of--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*